(12) United States Patent
Babaei

(10) Patent No.: US 12,009,928 B2
(45) Date of Patent: *Jun. 11, 2024

(54) URLLC IN UNLICENSED BANDS

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,296

(22) Filed: Mar. 14, 2023

(65) Prior Publication Data

US 2023/0239079 A1    Jul. 27, 2023

Related U.S. Application Data

(63) Continuation of application No. 17/384,718, filed on Jul. 24, 2021, now Pat. No. 11,637,658, which is a
(Continued)

(51) Int. Cl.
| | | |
|---|---|---|
| *H04W 4/00* | (2018.01) | |
| *H04L 1/1812* | (2023.01) | |
| *H04W 72/23* | (2023.01) | |
| *H04W 72/56* | (2023.01) | |
| *H04W 74/08* | (2009.01) | |
| *H04W 74/0808* | (2024.01) | |

(52) U.S. Cl.
CPC .......... *H04L 1/1812* (2013.01); *H04W 72/23* (2023.01); *H04W 72/56* (2023.01); *H04W 74/0808* (2013.01)

(58) Field of Classification Search
CPC ... H04W 28/04; H04W 72/04; H04W 72/042; H04W 88/08; H04W 72/56; H04W 72/23; H04W 74/0808; H04L 5/0007; H04L 1/1812
USPC .......................................................... 370/329
See application file for complete search history.

(56) References Cited

U.S. PATENT DOCUMENTS

| | | |
|---|---|---|
| 8,423,856 B2 | 4/2013 | Cai |
| 8,488,549 B2 | 7/2013 | Yang et al. |

(Continued)

FOREIGN PATENT DOCUMENTS

WO    2021214709 A1    10/2021

OTHER PUBLICATIONS

3GPP TS 38.211 V16.0.0 (Dec. 2019); Technical Specification; 3rd Generation Partnership Project; Technical Specification Group Radio Access Network; NR; Physical channels and modulation; (Release 16).

(Continued)

*Primary Examiner* — Peter G Solinsky
*Assistant Examiner* — Sanjay K Dewan
(74) *Attorney, Agent, or Firm* — Alireza Babaei

(57) ABSTRACT

A wireless device may receive a first TB associated with a first priority and a second TB associated with a second priority. The wireless device may transmit, via an unlicensed cell and based on an LBT procedure, a first feedback associated with the first TB and a second feedback associated with the second TB. The LBT procedure may be based on an LBT parameter that is based on at least one of the first priority and the second priority.

20 Claims, 36 Drawing Sheets

Related U.S. Application Data continuation of application No. 17/150,932, filed on Jan. 15, 2021, now Pat. No. 11,108,505.

(60) Provisional application No. 62/961,614, filed on Jan. 15, 2020.

(56) References Cited

U.S. PATENT DOCUMENTS

| | | | |
|---|---|---|---|
| 2010/0172313 | A1 | 7/2010 | Ho et al. |
| 2015/0365880 | A1 | 12/2015 | Malladi et al. |
| 2016/0128037 | A1 | 5/2016 | Park et al. |
| 2017/0099678 | A1 | 4/2017 | Dinan |
| 2017/0196020 | A1 | 7/2017 | Mukherjee et al. |
| 2018/0249484 | A1 | 8/2018 | Kim et al. |
| 2018/0368183 | A1 | 12/2018 | Andersson et al. |
| 2018/0376490 | A1 | 12/2018 | Lunttila et al. |
| 2019/0149213 | A1 | 5/2019 | Zhou et al. |
| 2019/0150196 | A1 | 5/2019 | Koorapaty et al. |
| 2019/0159251 | A1* | 5/2019 | Li ............................. H04L 1/18 |
| 2019/0313436 | A1* | 10/2019 | Lee ....................... H04L 5/0051 |
| 2019/0313454 | A1 | 10/2019 | Pu et al. |
| 2019/0363773 | A1 | 11/2019 | Yarramalli et al. |
| 2019/0373636 | A1 | 12/2019 | Yaramalli et al. |
| 2020/0053571 | A1 | 2/2020 | Tsai et al. |
| 2020/0100294 | A1 | 3/2020 | Chen et al. |
| 2020/0136763 | A1 | 4/2020 | Lee et al. |
| 2020/0244403 | A1 | 7/2020 | Talarico et al. |
| 2020/0252167 | A1 | 8/2020 | Kwak et al. |
| 2020/0260486 | A1 | 8/2020 | Zhou et al. |
| 2020/0322097 | A1 | 10/2020 | Hsieh et al. |
| 2021/0014874 | A1 | 1/2021 | Deogun et al. |
| 2021/0195639 | A1 | 6/2021 | Kim et al. |
| 2021/0298075 | A1 | 9/2021 | Talarico et al. |
| 2022/0103304 | A1 | 3/2022 | Elshafie et al. |

OTHER PUBLICATIONS

3GPP TS 38.212 V16.0.0 (Dec. 2019); Technical Specification; 3rd Generation Partnership Project; Technical Specification Group Radio Access Network; NR; Multiplexing and channel coding; (Release 16).

3GPP TS 38.213 V16.0.0 (Dec. 2019); Technical Specification; 3rd Generation Partnership Project; Technical Specification Group Radio Access Network; NR; Physical layer procedures for control; (Release 16).

3GPP TS 38.214 V16.0.0 (Dec. 2019); Technical Specification; 3rd Generation Partnership Project; Technical Specification Group Radio Access Network; NR; Physical layer procedures for data; (Release 16).

3GPP TS 38.300 V16.0.0 (Dec. 2019); Technical Specification; 3rd Generation Partnership Project; Technical Specification Group Radio Access Network; NR; NR and NG-RAN Overall Description; Stage 2; (Release 16).

3GPP TS 38.321 V15.8.0 (Dec. 2019); Technical Specification; 3rd Generation Partnership Project; Technical Specification Group Radio Access Network; NR; Medium Access Control (MAC) protocol specification; (Release 15).

3GPP TS 38.331 V15.8.0 (Dec. 2019); Technical Specification; 3rd Generation Partnership Project; Technical Specification Group Radio Access Network; NR; Radio Resource Control (RRC); Protocol specification; (Release 15 ).

3GPP TSG RAN WG1 Meeting #98; R1-1908052; Prague, Czech Republic, Aug. 26-30, 2019; Agenda Item: 7.2.6.2; Source: Huawei, HiSilicon; Title: UCI enhancements for URLLC; Document for: Discussion and Decision.

3GPP TSG RAN WG1 #98; R1-1908159; Prague, CZ, Aug. 26-30, 2019; Source: vivo; Title: UCI enhancements for URLLC; Agenda Item: 7.2.6.2; Document for: Discussion and Decision.

3GPP TSG RAN WG1 #98; R1-1908236; Prague, CZ, Aug. 26-30, 2019; Source: ZTE; Title: UL control enhancements for NR URLLC; Agenda item: 7.2.6.2; Document for: Discussion and Decision.

3GPP TSG RAN WG1 #98; R1-1908280; Prague, Czech Republic, Aug. 26-30, 2019; Agenda Item: 7.2.6.2; Source: NEC; Title: UCI enhancements for NR URLLC; Document for: Discussion/ Decision.

3GPP TSG RAN WG1 #98; R1-1908319; Prague, Czech, Aug. 26-30, 2019; Agenda Item: 7.2.6.2; Source: Fujitsu Title: UCI enhancements for URLLC; Document for: Discussion.

3GPP TSG RAN WG1 Meeting #98; R1-1908409; Prague, Czech, Aug. 26-30, 2019; Agenda Item: 7.2.6.2; Source: MediaTek Inc.; Title: Multiple HARQ procedures and intra-UE UCI prioritization; Document for: Discussion and Decision.

3GPP TSG RAN WG1 #98; R1-1908437; Prague, CZ, Aug. 26-30, 2019; Agenda item: 7.2.6.2; Source: Nokia, Nokia Shanghai Bell; Title: On UCI Enhancements for NR URLLC; Document for: Discussion and Decision.

3GPP TSG RAN WG1 #98; R1-1908491; Prague, Czech Republic, Aug. 26-30, 2019; Agenda item: 7.2.6.2; Source: Samsung; Title: UL Control for URLLC; Document for: Discussion and Decision.

3GPP TSG RAN WG1 #98; R1-1908542; Prague, Czech Republic, Aug. 26-30, 2019; Agenda Item: 7.2.6.2; Source: LG Electronics; Title: UCI enhancements for NR URLLC; Document for: Discussion and decision.

3GPP TSG RAN WG1 Meeting #98; R1-1908595; Prague, CZ, Aug. 26-30, 2019; Source: CATT; Title: UL control enhancements for URLLC; Agenda Item: 7.2.6.2; Document for: Discussion and Decision.

3GPP TSG RAN WG1 #98; R1-1908646; Prague, CZ, Aug. 26-30, 2019; Source: Intel Corporation; Title: UCI enhancements for eURLLC; Agenda item: 7.2.6.2; Document for: Discussion and Decision.

3GPP TSG RAN WG1 #98; R1-1908668; Prague, CZ, Aug. 26-30, 2019; Source: OPPO; Title: UCI enhancements for URLLC; Agenda Item: 7.2.6.2; Document for: Discussion and Decision.

3GPP TSG RAN WG1 #98; R1-1908778; Prague, CZ, Aug. 26-30, 2019; Agenda Item: 7.2.6.2; Source: Sony; Title: UCI Enhancements for URLLC; Document for: Discussion / decision.

3GPP TSG RAN WG1 #98; R1-1908799; Prague, CZ, Aug. 26-30, 2019; Source: Panasonic; Title: Discussion on UCI enhancement for URLLC; Agenda Item: 7.2.6.2; Document for: Discussion.

3GPP TSG RAN WG1 #98; R1-1908813; Prague, CZ, Aug. 26-30, 2019; Source: ETRI; Title: UCI enhancements; Agenda Item: 7.2.6.2 UCI enhancements; Document for: Discussion.

3GPP TSG RAN WG1 #98; R1-1908867; Prague, CZ, Aug. 26-30, 2019; Agenda item: 7.2.6.2; Source: CMCC; Title: Discussion on UCI enhancements for URLLC; Document for: Discussion and Decision.

3GPP TSG RAN WG1 #98; R1-1908883; Prague, CZ, Aug. 26-30, 2019; Agenda item: 7.2.6.2; Source: China Telecom; Title: UCI enhancements for URLLC; Document for: Discussion.

3GPP TSG-RAN WG1 Meeting #98; R1-1908931; Prague, Czech Republic, Aug. 26-30, 2019; Source: Asia Pacific Telecom; Title: UCI enhancements for NR URLLC; Agenda item: 7.2.6.2; Document for: Discussion and Decision.

3GPP TSG RAN WG1 Meeting #98; R1-1908955; Prague, CZ, Aug. 26-30, 2019; Agenda item: 7.2.6.2; Source: Spreadtrum Communications; Title: Discussion on UCI enhancements for URLLC; Document for: Discussion and decision.

3GPP TSG-RAN WG1 #98; R1-1909055; Prague, Czech Republic, Aug. 26-30, 2019; Source: Apple Inc.; Title: On UCI enhancements for NR URLLC; Agenda item: 7.2.6.2; Document for: Discussion and Decision.

3GPP TSG RAN WG1 #98; R1-1909065; Prague, CZ, Aug. 26-30, 2019; Agenda Item: 7.2.6.2; Source: InterDigital Inc.; Title: UCI Enhancements for eURLLC; Document for: Discussion and Decision.

3GPP TSG RAN WG1 #98; R1-1909100; Prague, CZ, Aug. 26-30, 2019; Source: Sharp; Title: UCI enhancements for URLLC; Agenda Item: 7.2.6.2; Document for: Discussion and Decision.

3GPP TSG RAN WG1 Meeting #98; R1-1909153; Prague, CZ, Aug. 26-30, 2019; Agenda item: 7.2.6.2; Source: Motorola Mobility, Lenovo; Title: UCI enhancement and intra-UE prioritization for URLLC; Document for: Discussion.

(56) References Cited

OTHER PUBLICATIONS

3GPP TSG RAN WG1 #98; R1-1909194; Prague, CZ, Aug. 26-30, 2019; Source: NTT Docomo, Inc.; Title: UCI enhancements for URLLC; Agenda Item: 7.2.6.2; Document for: Discussion and Decision.
3GPP TSG RAN WG1 Meeting #98; R1-1909351; Prague, Czech, Aug. 26-30, 2019; Source : CAICT; Title: UCI enhancements for URLLC; Agenda Item : 7.2.6.2; Document for : Discussion / Decision.
3GPP TSG-RAN WG1 #98; R1-1909575; Aug. 26-30, 2019; Prague, Czech Republic; Agenda item: 7.2.6.2; Source: Qualcomm Incorporated; Title: UCI Enhancements for eURLLC; Document for: Discussion/Decision.
3GPP TSG RAN WG1 Meeting #98; R1-1908122; Prague, Czech Republic, Aug. 26-30, 2019; Agenda Item: 7.2.6.2; Source: Ericsson; Title: UCI Enhancements for NR URLLC; Document for: Discussion, Decision.
3GPP TSG RAN WG1#98; R1-1909848; Prague, CZ, Aug. 26-30, 2019; Source: OPPO; Title: Offline summary#3 on UCI enhancements for URLLC; Agenda Item: 7.2.6.2; Document for: Discussion and Decision.
3GPP TSG-RAN WG Meeting #86; RP-192544; Sitges, Spain, Dec. 9-12, 2019; Vivo; Views on NR URLLC/IIOT enhancements in Rel-17.
3GPP TSG RAN meeting #86; RP-192553; Sitges, Spain, Dec. 9-12, 2019; Status Report to TSG; Agenda item: 9.4.5.
3GPP TSG-RAN#86; RP-192657; Sitges, Spain, Dec. 9-12, 2019; Source: Nokia, Nokia Shanghai Bell (Moderator); Title: Email discussions summary for enhanced IIoT/URLLC for Release 17; Agenda Item: 9.1.2.
3GPP TSG RAN Meeting #86; RP-192698; Sitges, Spain, Dec. 9-12, 2019; Agenda Item: 9.1.1; Source: Apple; Title: R17 NR URLLC enhancements; Document for: Discussion/Decision.
3GPP TSG RAN Meeting #86; RP-192758; Sitges, Spain, Dec. 9-12, 2019; Agenda Item: 9.1.1; Source: OPPO; Title: Rel-17 work scope on URLLC and IIoT enhancements; Document for: Discussion.
3GPP TSG-RAN Meeting #86 Tdoc; RP-192800; Sitges, Spain, Dec. 9-13, 2019; Agenda Item: 9.1.1; Source: Ericsson; Title: Views for the WID on enhanced IIoT and URLLC support; Document for: Discussion, Decision.
3GPP TSG RAN#86; RP-192835; Sitges, Spain, Dec. 9-12, 2019; Title: Views on IIoT-URLLC_Enhancement; Priorities for R17; Source: TCL Communication; Agenda: 9.1.1; Document for: Discussion.
3GPP TSG RAN Meeting #86; RP-193233; Sitges, Spain, Dec. 9-12, 2019; Source: Nokia, Nokia Shanghai Bell; Title: New WID on enhanced Industrial Internet of Things (IoT) and URLLC support; Document for: Approval; Agenda Item: 9.1.2.

* cited by examiner

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

For p = 3, 4, $T_{ulmcot,p}$ =10ms if the higher layer parameter absenceOfAnyOtherTechnology-r14 or absenceOfAnyOtherTechnology-r16 may be provided , otherwise, $T_{ulmcot,p}$ =6ms.

When $T_{ulmcot,p}$ =6ms it may be increased to 8 ms by inserting one or more gaps. The minimum duration of a gap may be 100 μs. The maximum duration before including any such gap may be 6 ms.

FIG. 16

URLLC IN UNLICENSED BANDS

CROSS-REFERENCE TO RELATED APPLICATIONS

This application is a continuation of U.S. patent application Ser. No. 17/384,718, filed Jul. 24, 2021, which is a continuation of U.S. patent application Ser. No. 17/150,932, filed Jan. 15, 2021, which claims the benefit of U.S. Provisional Application No. 62/961,614, filed Jan. 15, 2020, which is hereby incorporated by reference in its entirety.

BRIEF DESCRIPTION OF THE DRAWINGS

FIG. 16 shows example channel access parameters for channel access procedures in accordance with several of various embodiments of the present disclosure.

DETAILED DESCRIPTION

The exemplary embodiments of the disclosed technology enable operation of a wireless device and/or one or more base stations in unlicensed spectrum. The exemplary disclosed embodiments may be implemented in the technical field of wireless communication systems. More particularly, the embodiment of the disclosed technology may enable ultra-reliable low-latency communications (URLLC) in unlicensed bands.

Figure 1A:
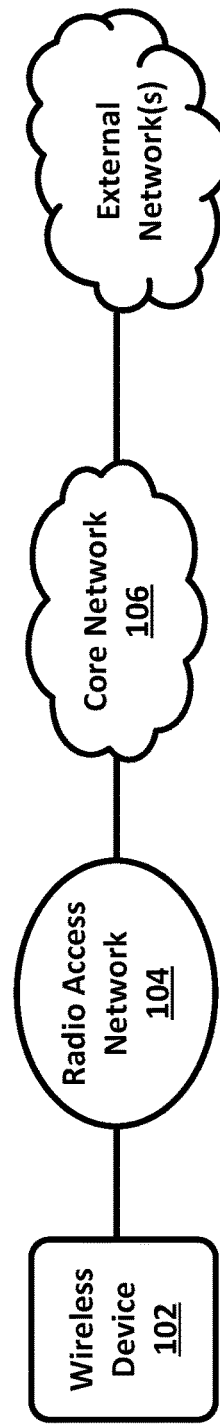
FIG. 1A and FIG. 1B show examples of mobile communications systems in accordance with several of various embodiments of the present disclosure.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably. FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
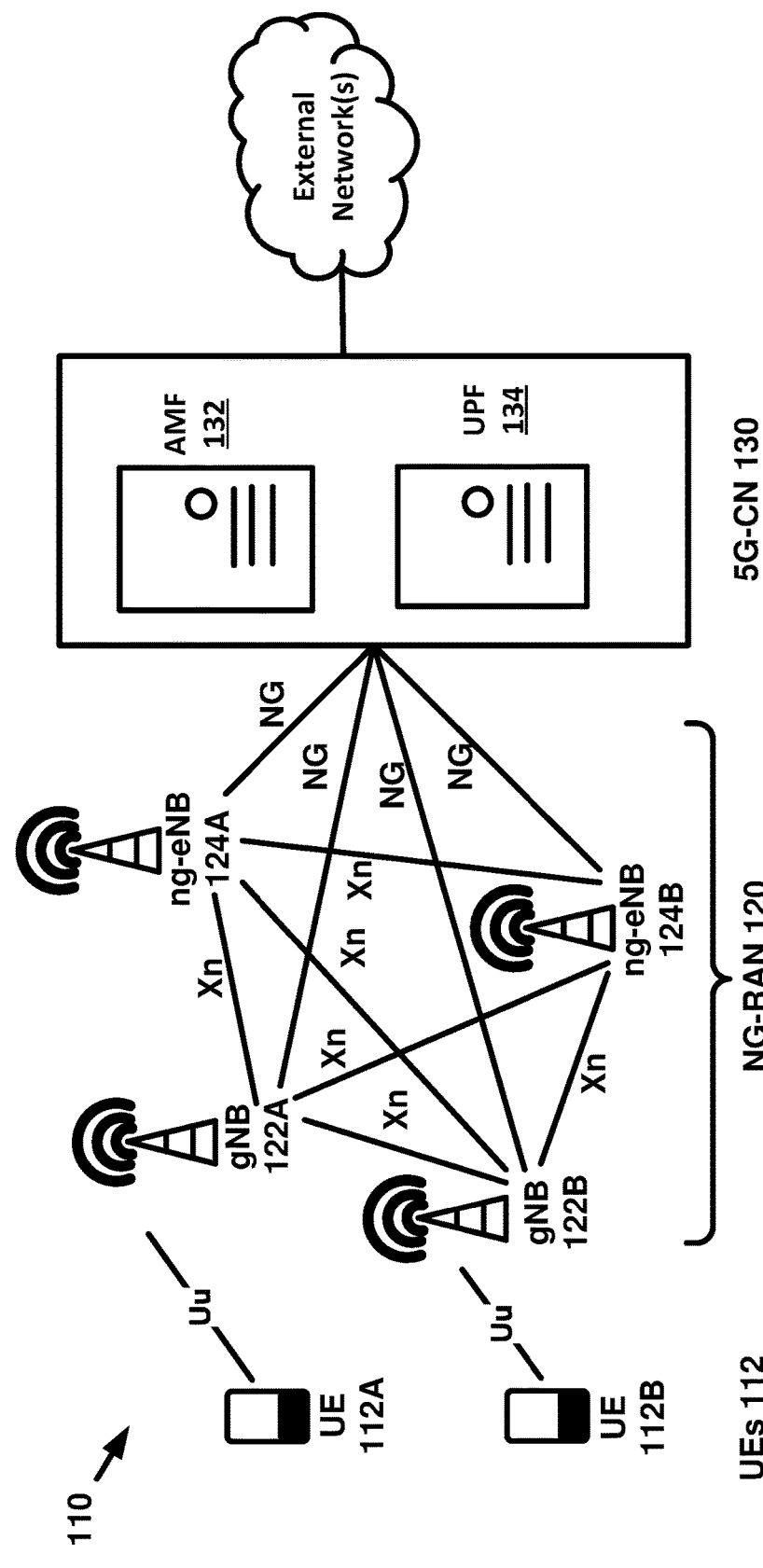

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNB s (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
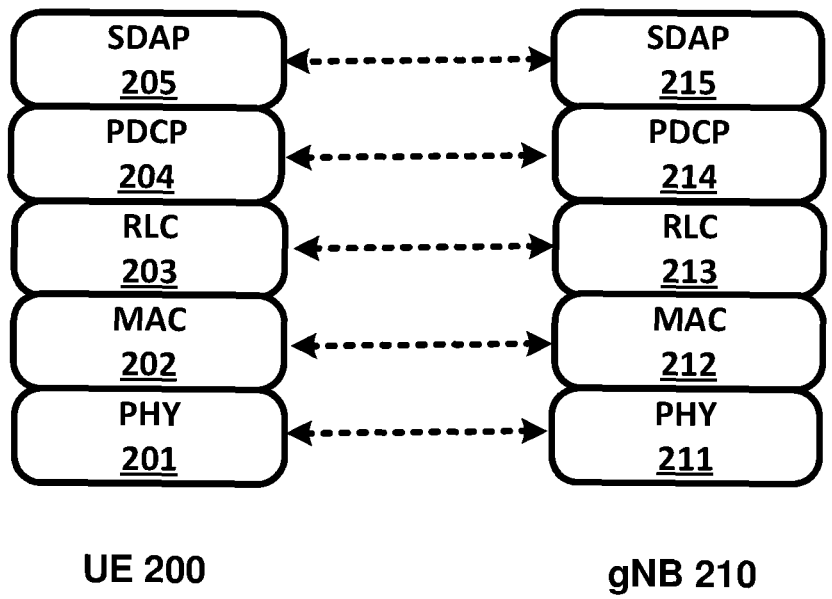
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
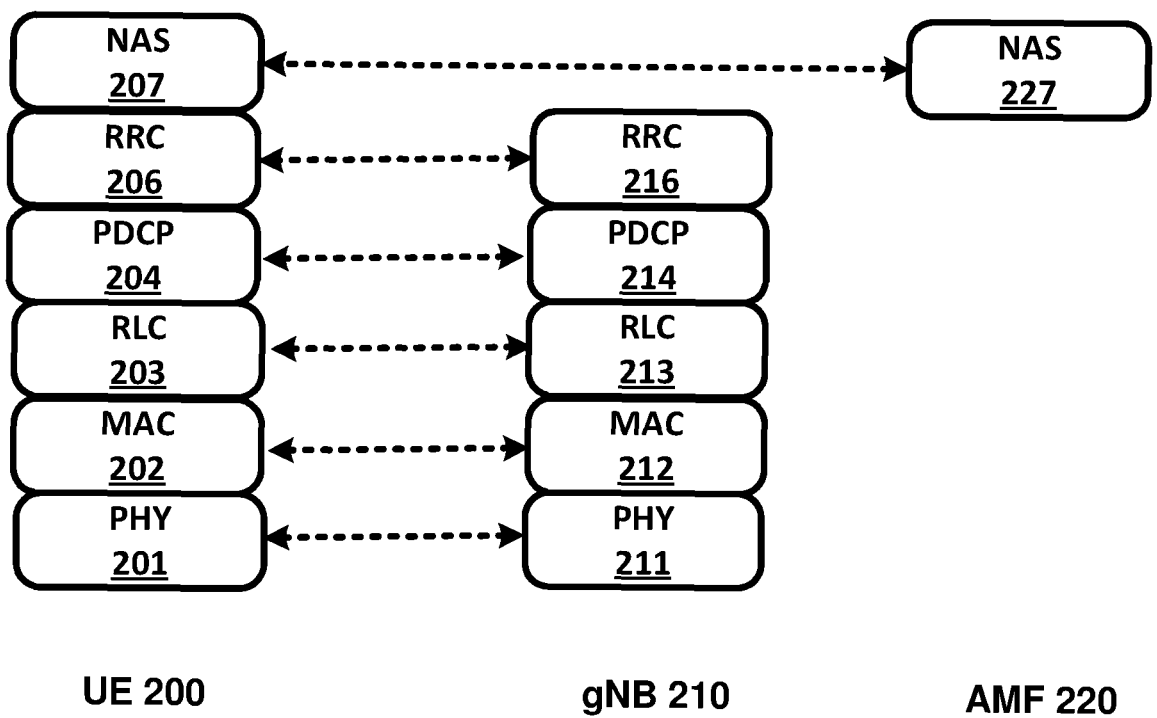

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to as RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
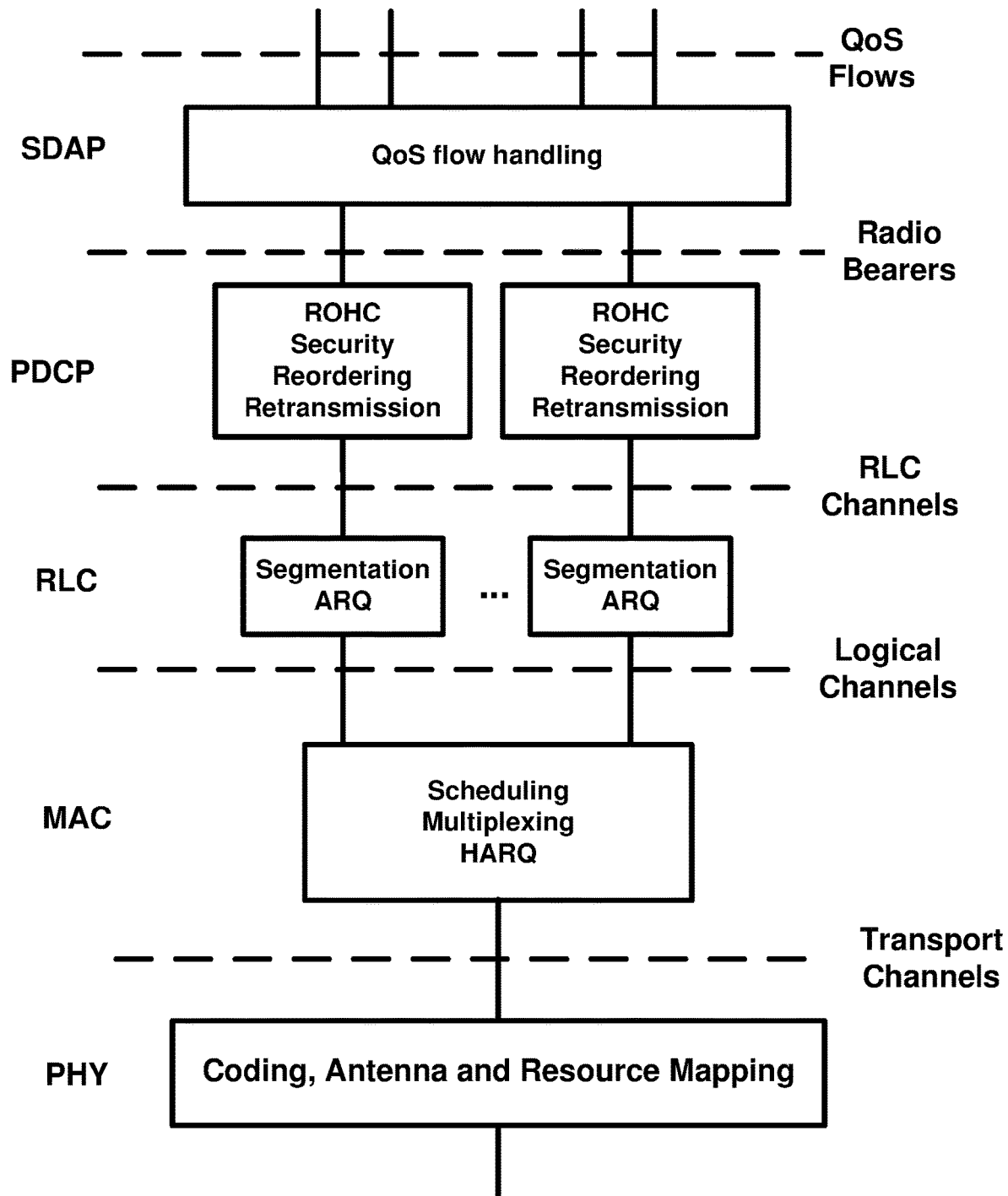
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
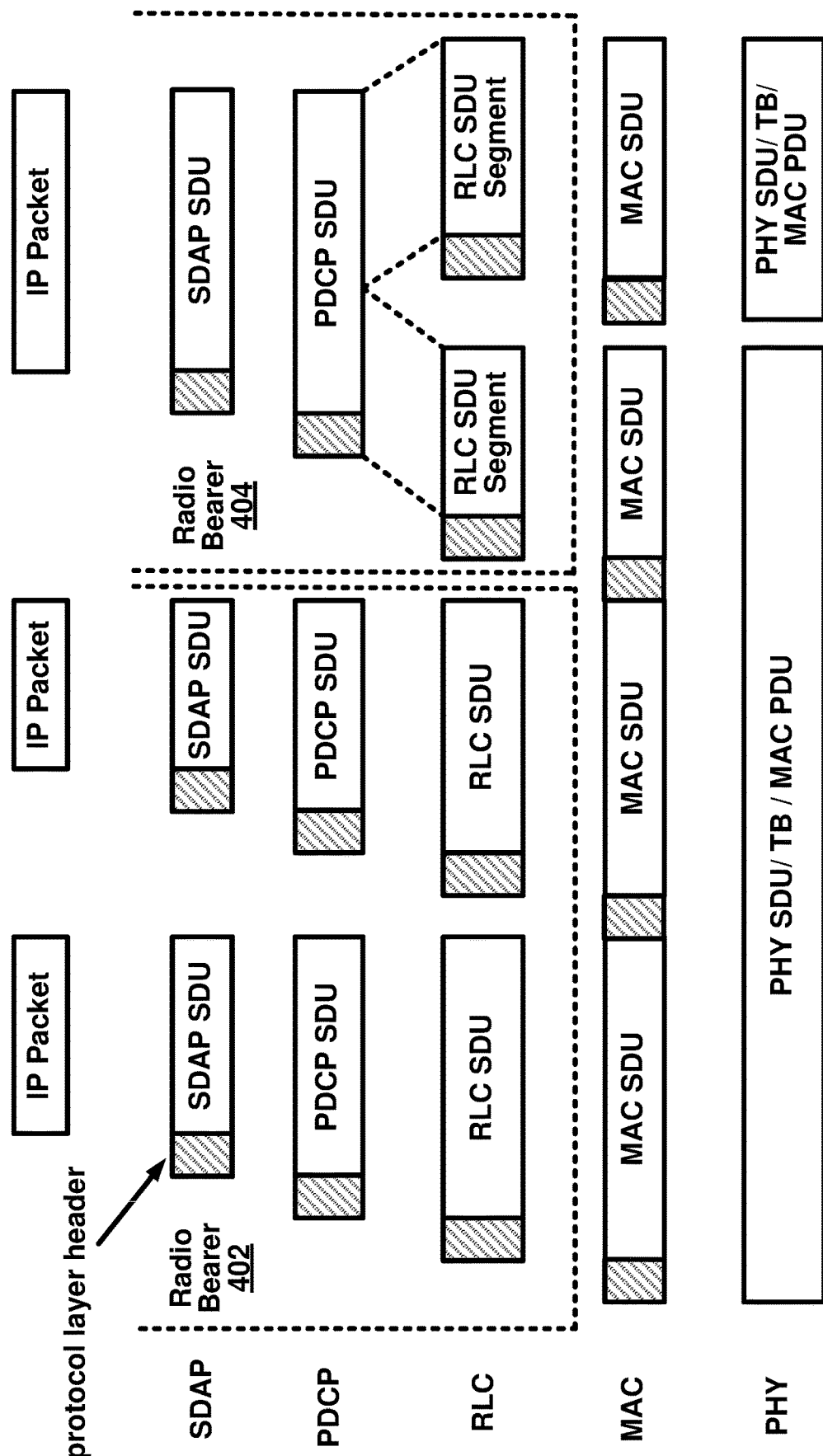
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
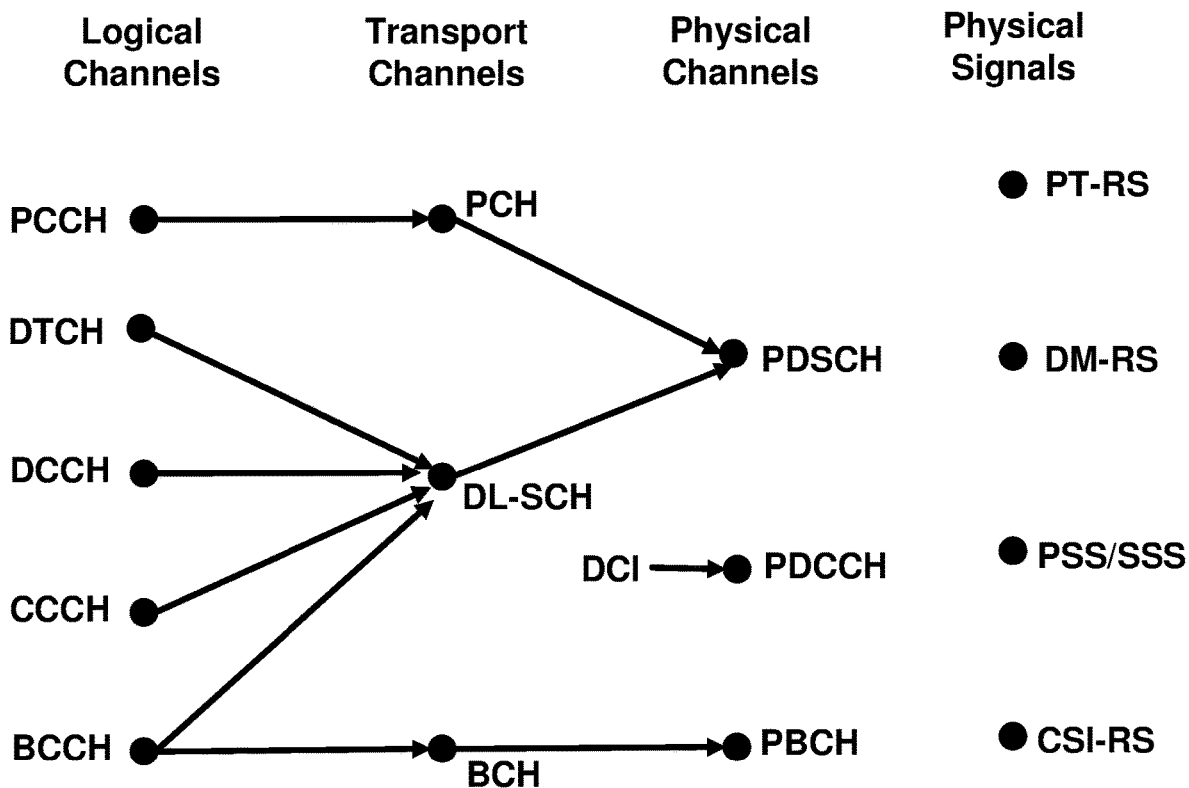
FIG. 5A shows example mapping of channels between layers of the protocol stack and different physical signals in downlink in accordance with several of various embodiments of the present disclosure.
Figure 5B:
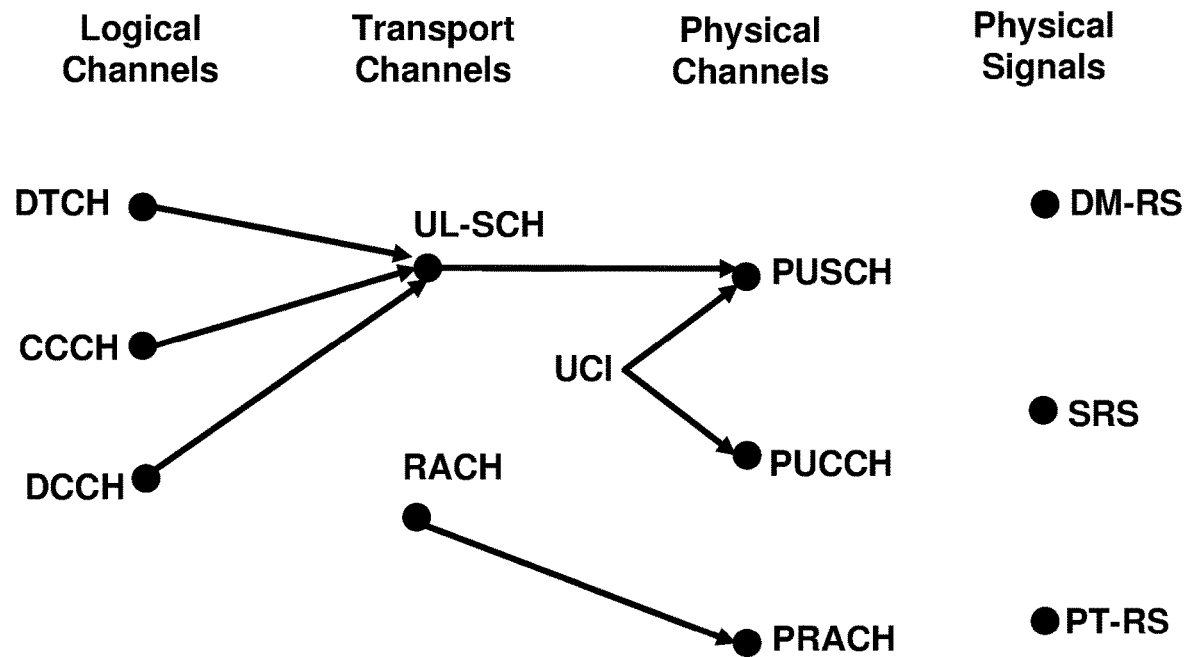
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
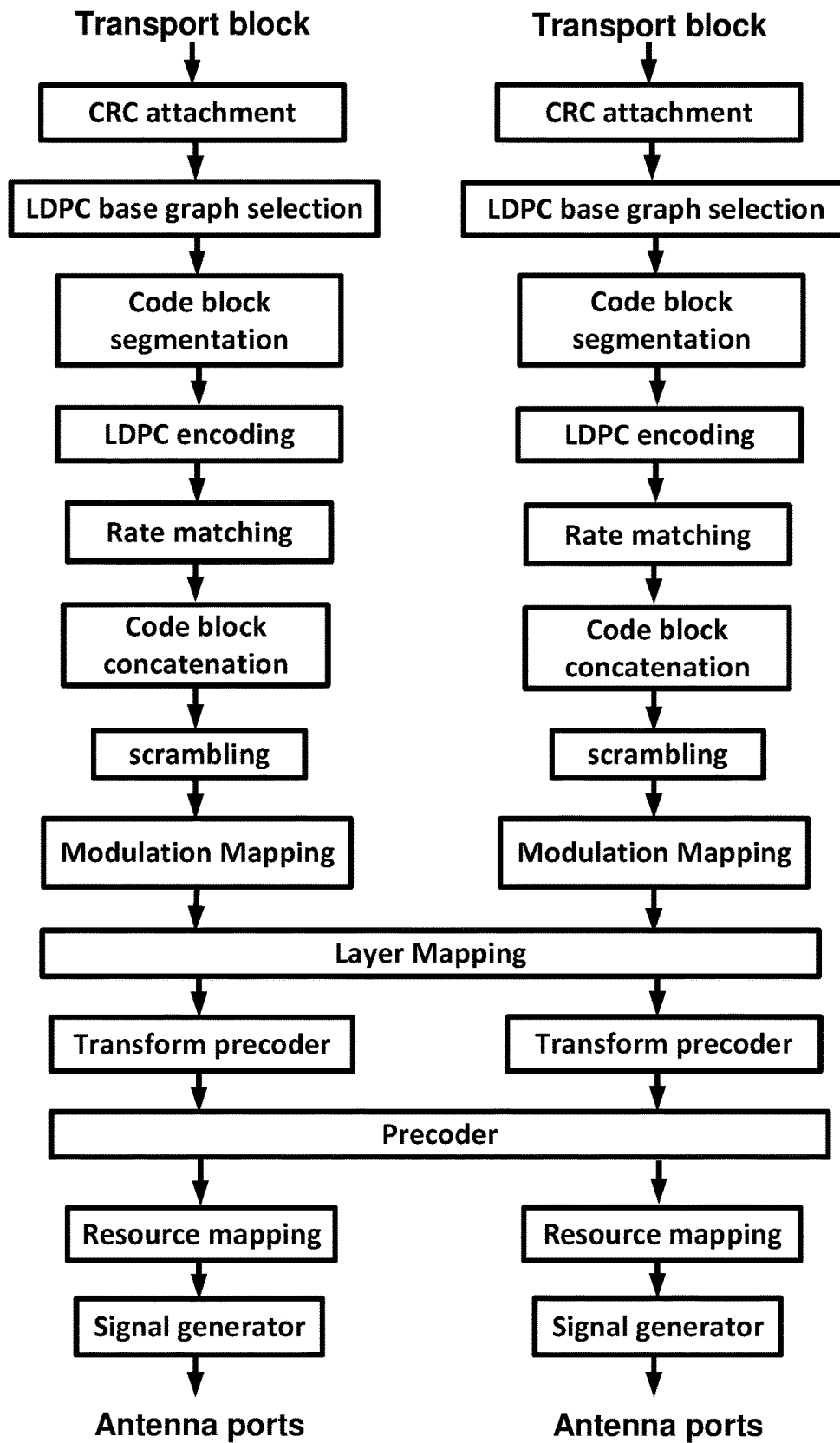
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
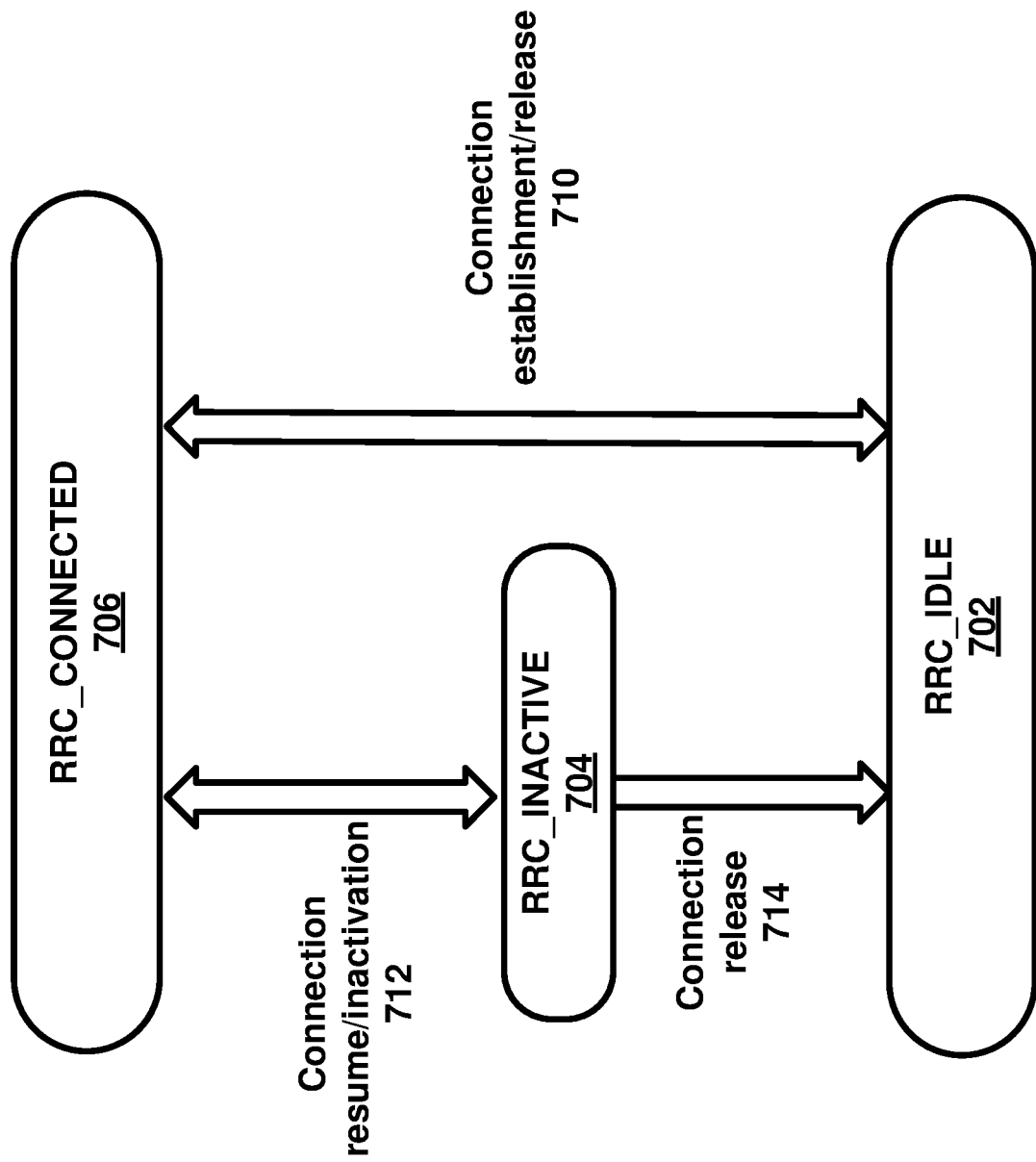
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu=0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g. the μ value).

Figure 8:
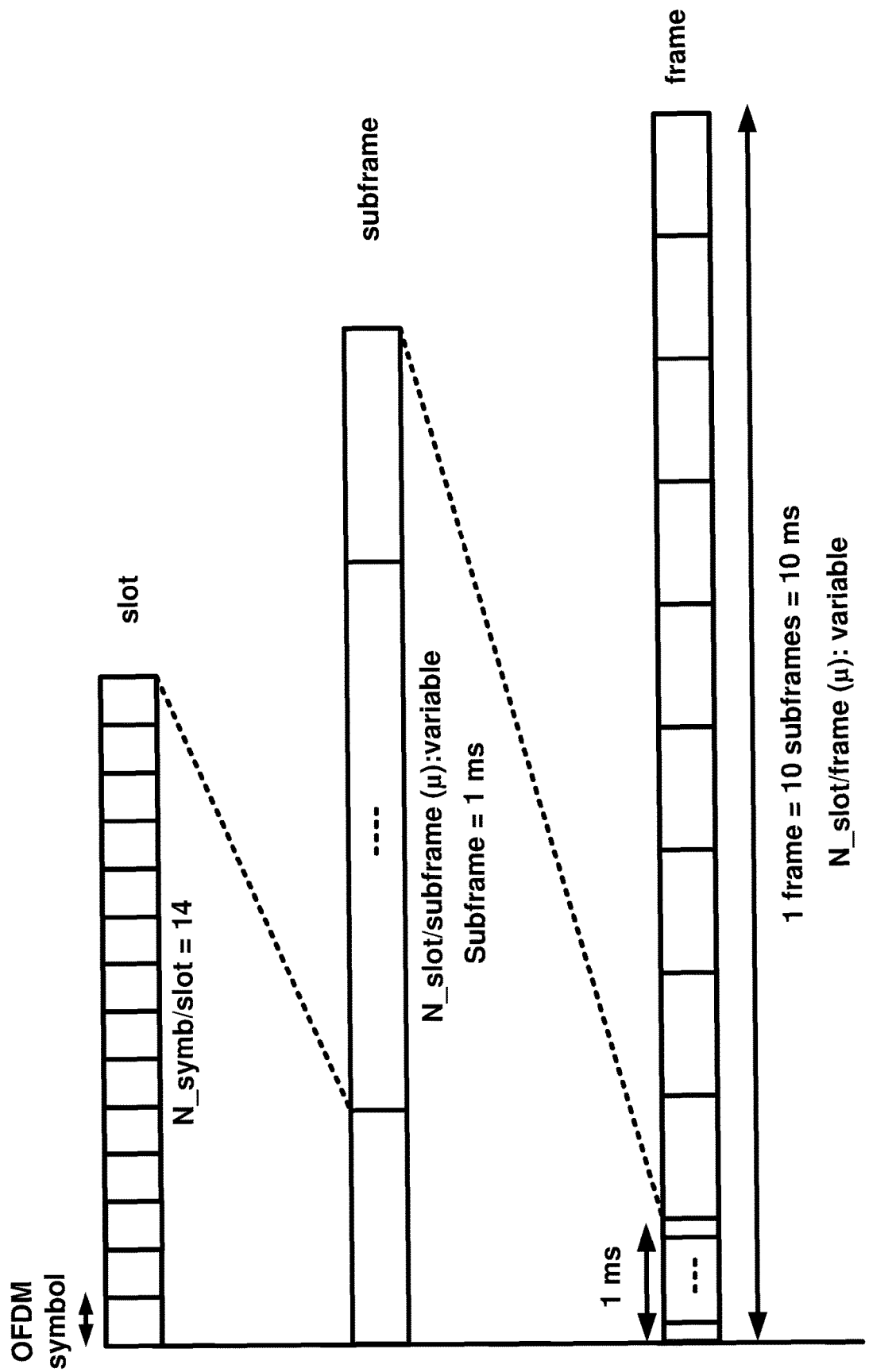
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a sub function of μ and may generally expressed as $N_{slot}^{subframe,\mu}$ and the number of symbols per subframe may be expressed as $NN_{slot}^{subframe,\mu} = N_{symb}^{slot} NN_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
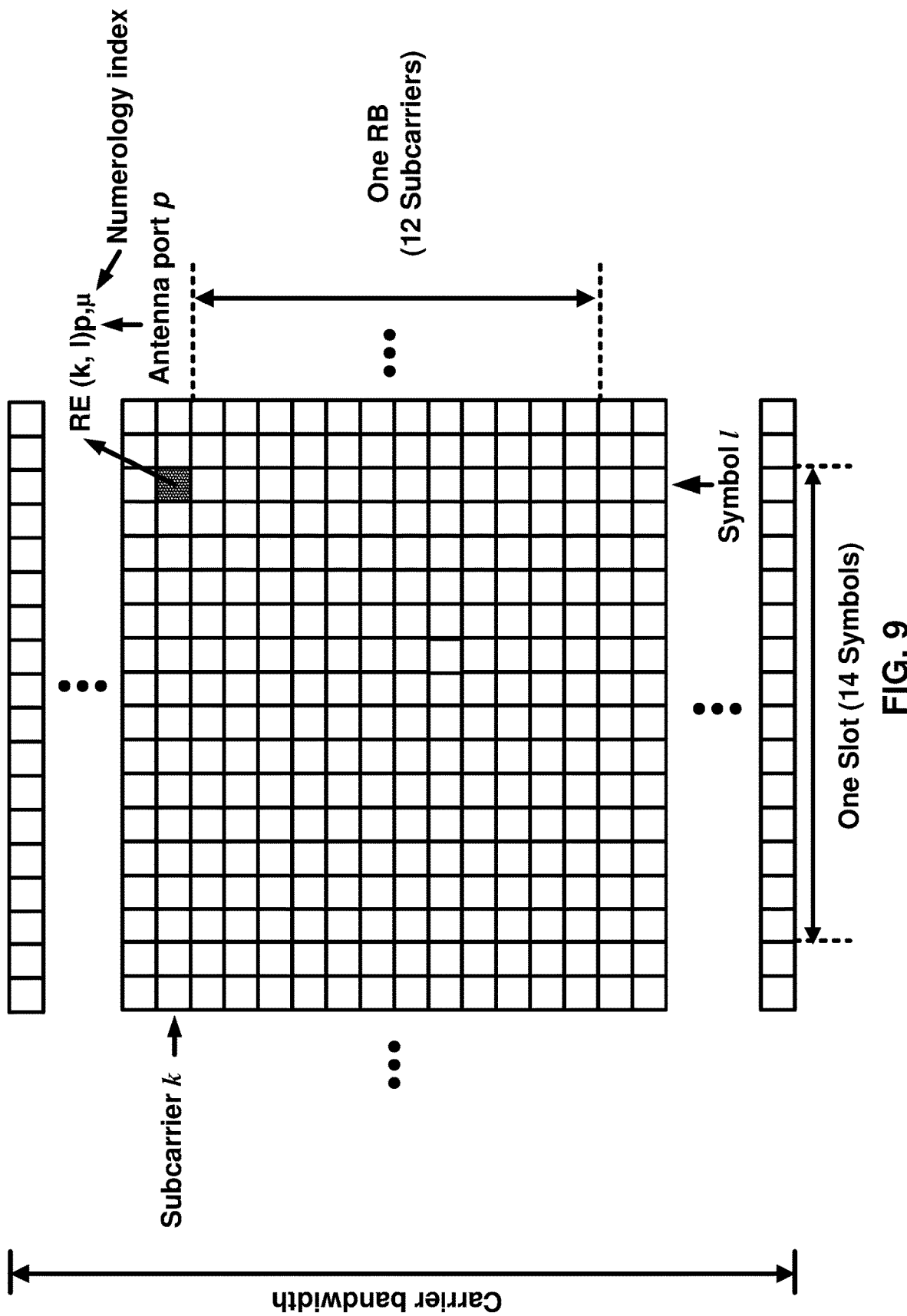
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., $\mu=0$), a resource block may be 180 KHz and for a subcarrier spacing of 30 KHz (e.g., $\mu=1$), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
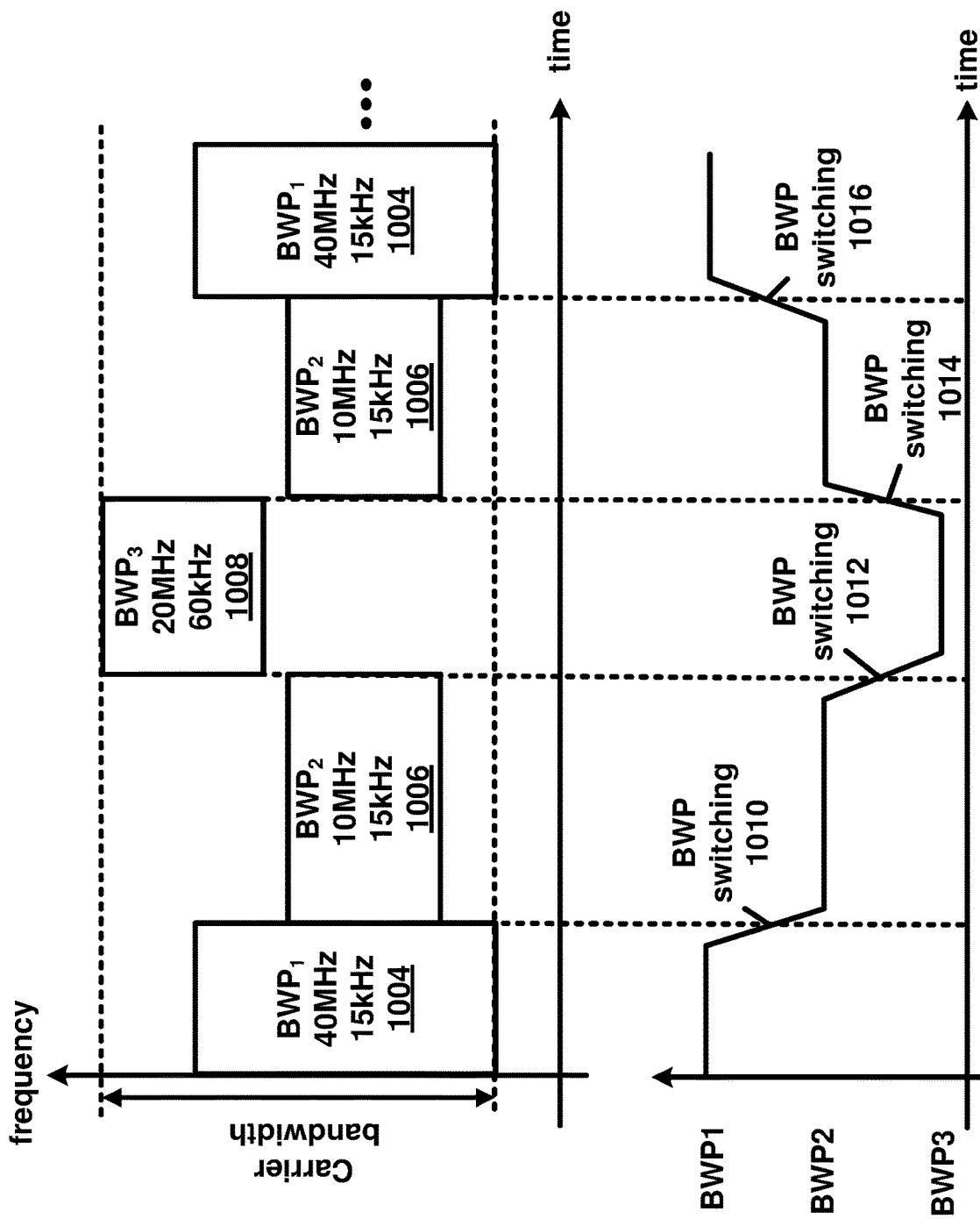
FIG. 10 shows example adaptation and switching of bandwidth parts in accordance with several of various embodiments of the present disclosure.

FIG. 10 shows an example of bandwidth part adaptation and switching. In this example, three BWPs (BWP1 1004, BWP2 1006 and BWP3 1008) are configured for a UE on a carrier bandwidth. The BWP1 is configured with a bandwidth of 40 MHz and a numerology with subcarrier spacing of 15 KHz, the BWP2 is configured with a bandwidth of 10 MHz and a numerology with subcarrier spacing of 15 KHz and the BWP3 is configured with a bandwidth of 20 MHz and a subcarrier spacing of 60 KHz. The wireless device may switch from a first BWP (e.g., BWP1) to a second BWP (e.g., BWP2). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
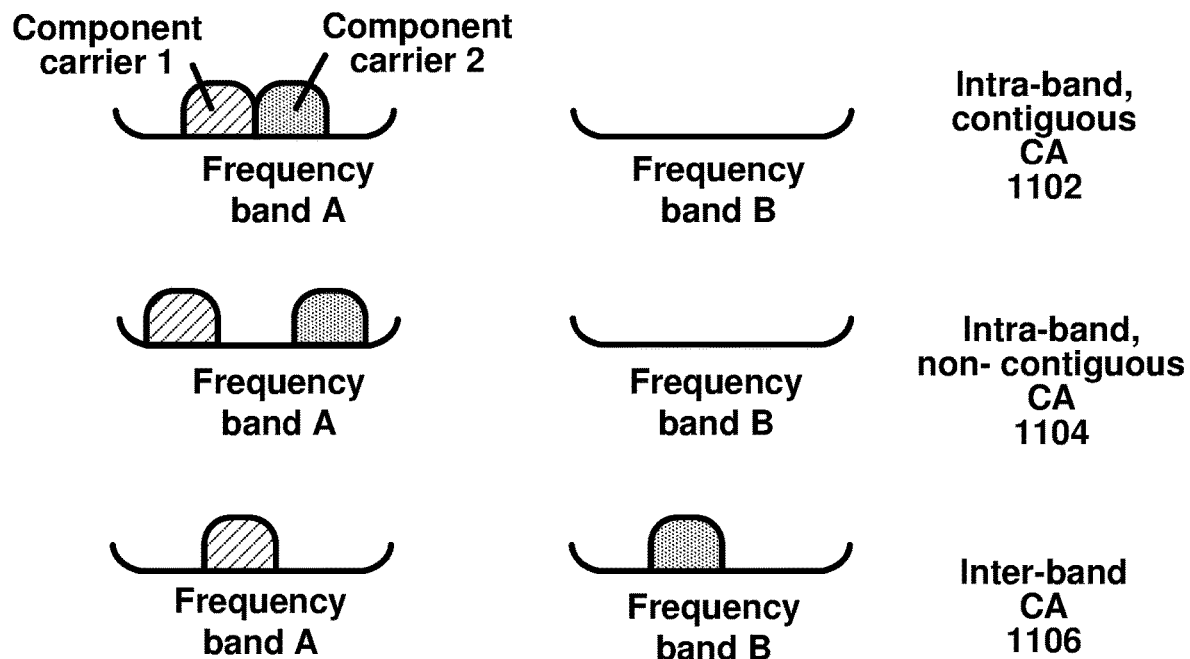
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
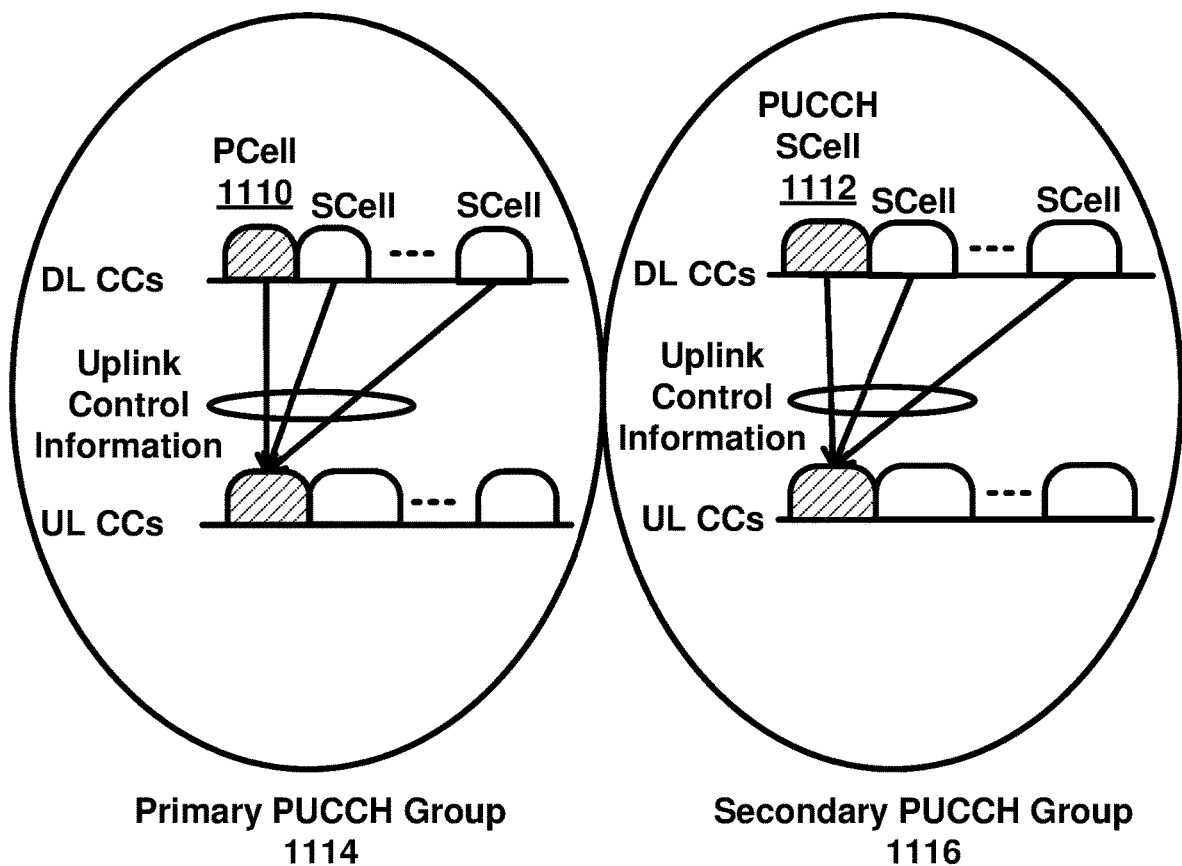
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
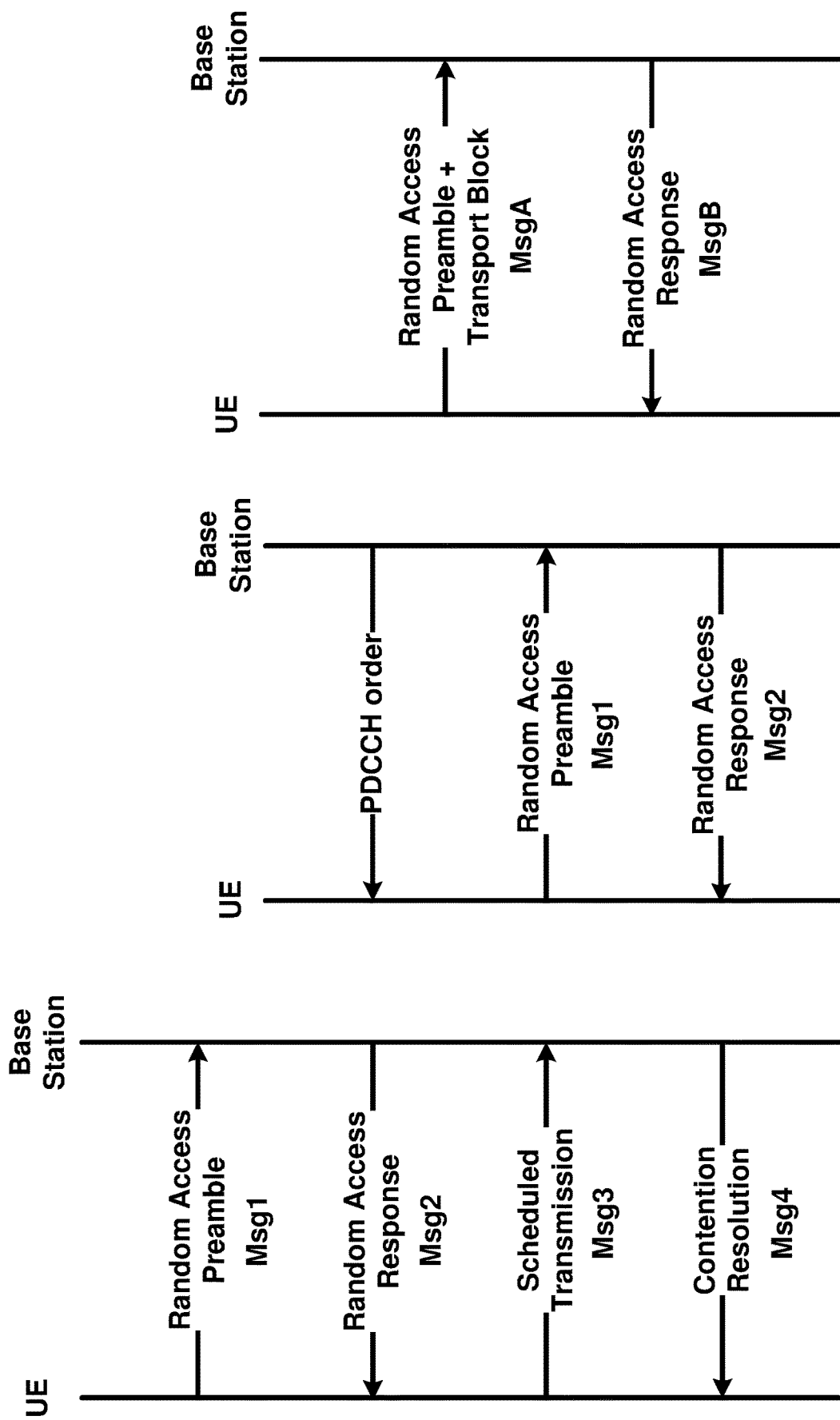
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SS s), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
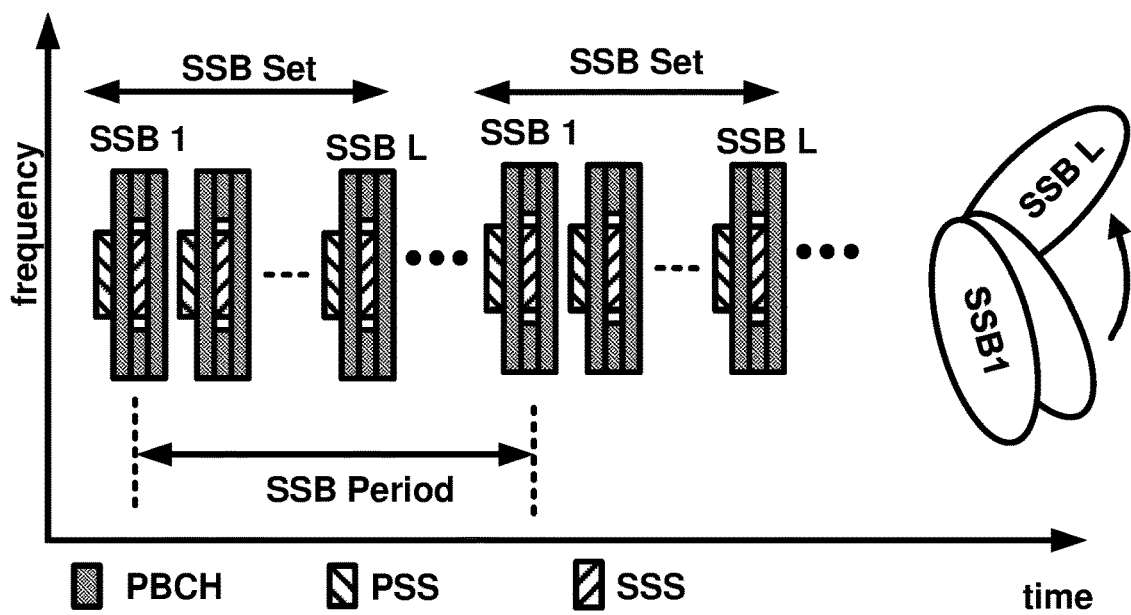
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RS s configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RS s are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RS s) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RS s) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RS s of wireless devices scheduled on overlapping frequency domain resources.

Figure 13B:
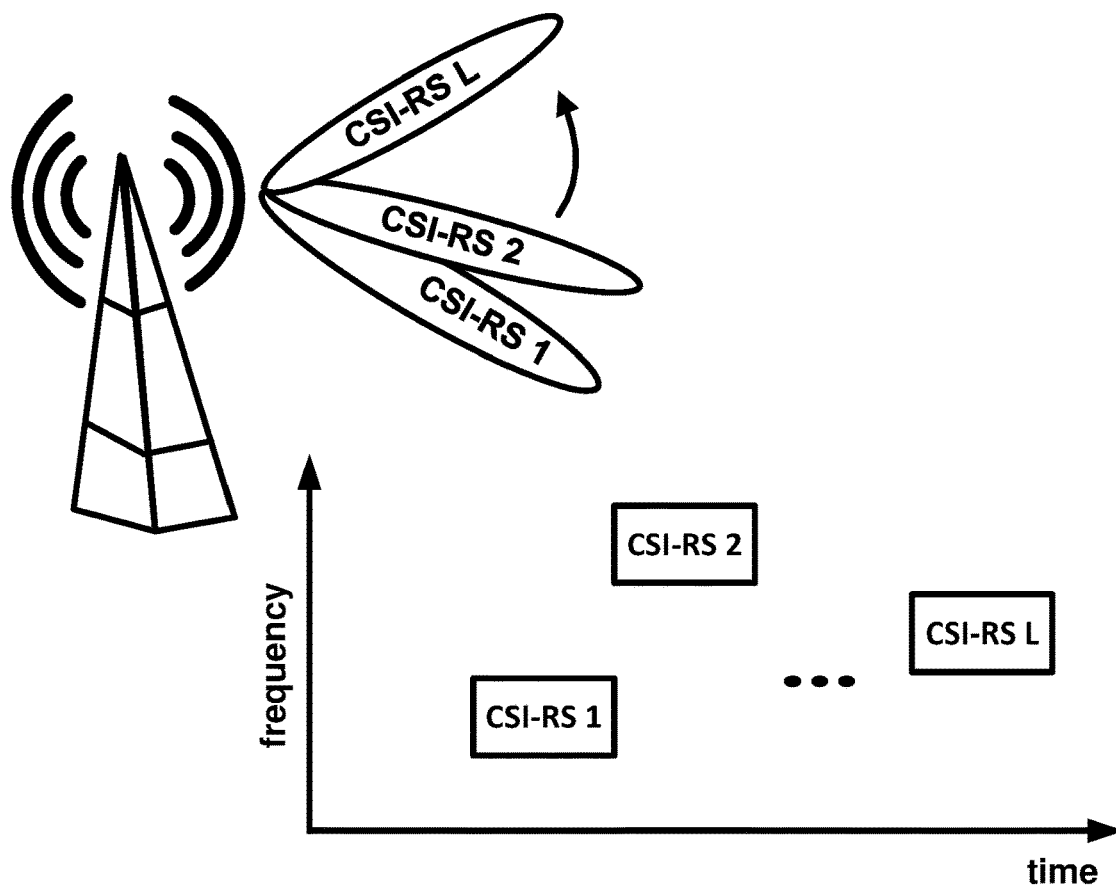
FIG. 13B shows example time and frequency structure of CSI-RS s and their association with beams in accordance with several of various embodiments of the present disclosure.

FIG. 13B shows example time and frequency structure of CSI-RS s and their association with beams in accordance with several of various embodiments of the present disclosure. A beam of the L beams shown in FIG. 13B may be associated with a corresponding CSI-RS resource. The base station may transmit the CSI-RS s using the configured CSI-RS resources and a UE may measure the CSI-RS s (e.g., received signal received power (RSRP) of the CSI-RS s) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
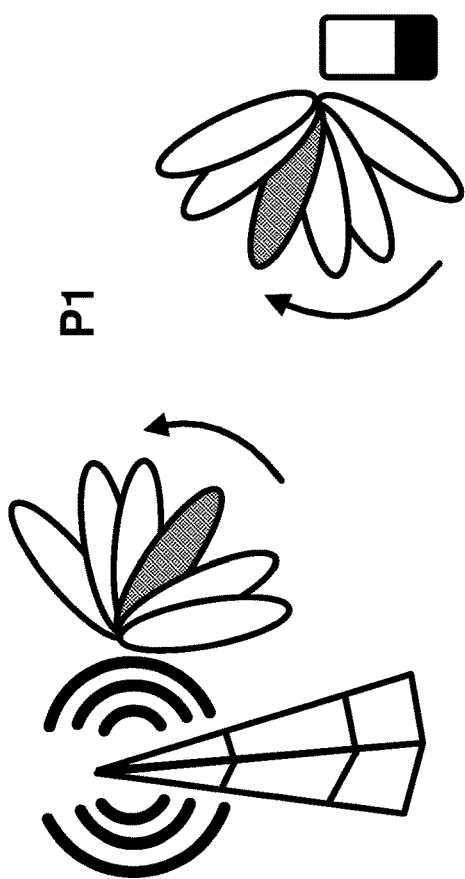
FIG. 14A, FIG. 14B and FIG. 14C show example beam management processes in accordance with several of various embodiments of the present disclosure.
Figure 14C:
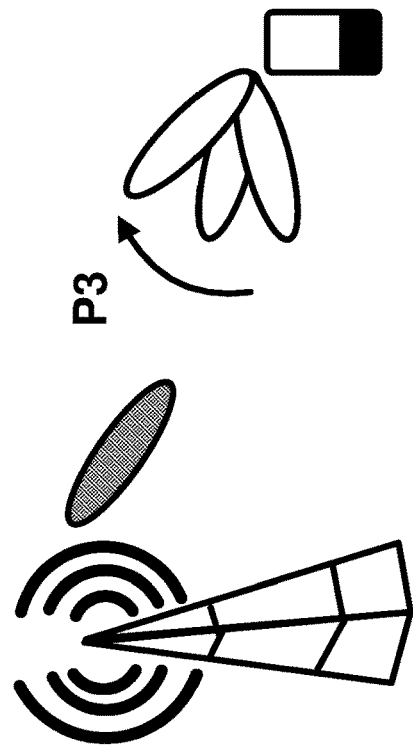
Figure 14B:
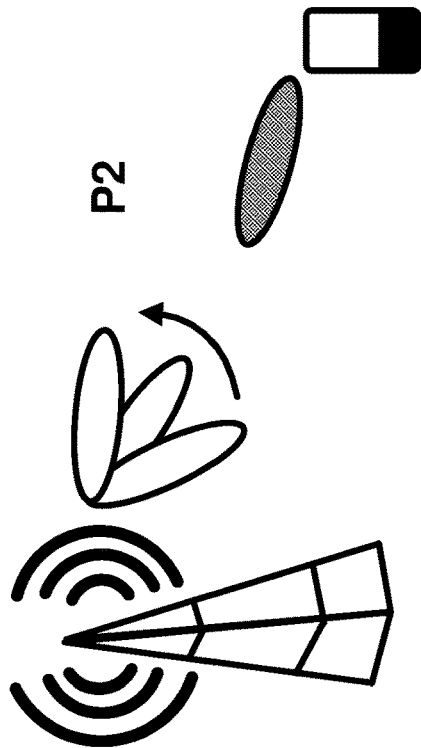

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The p2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
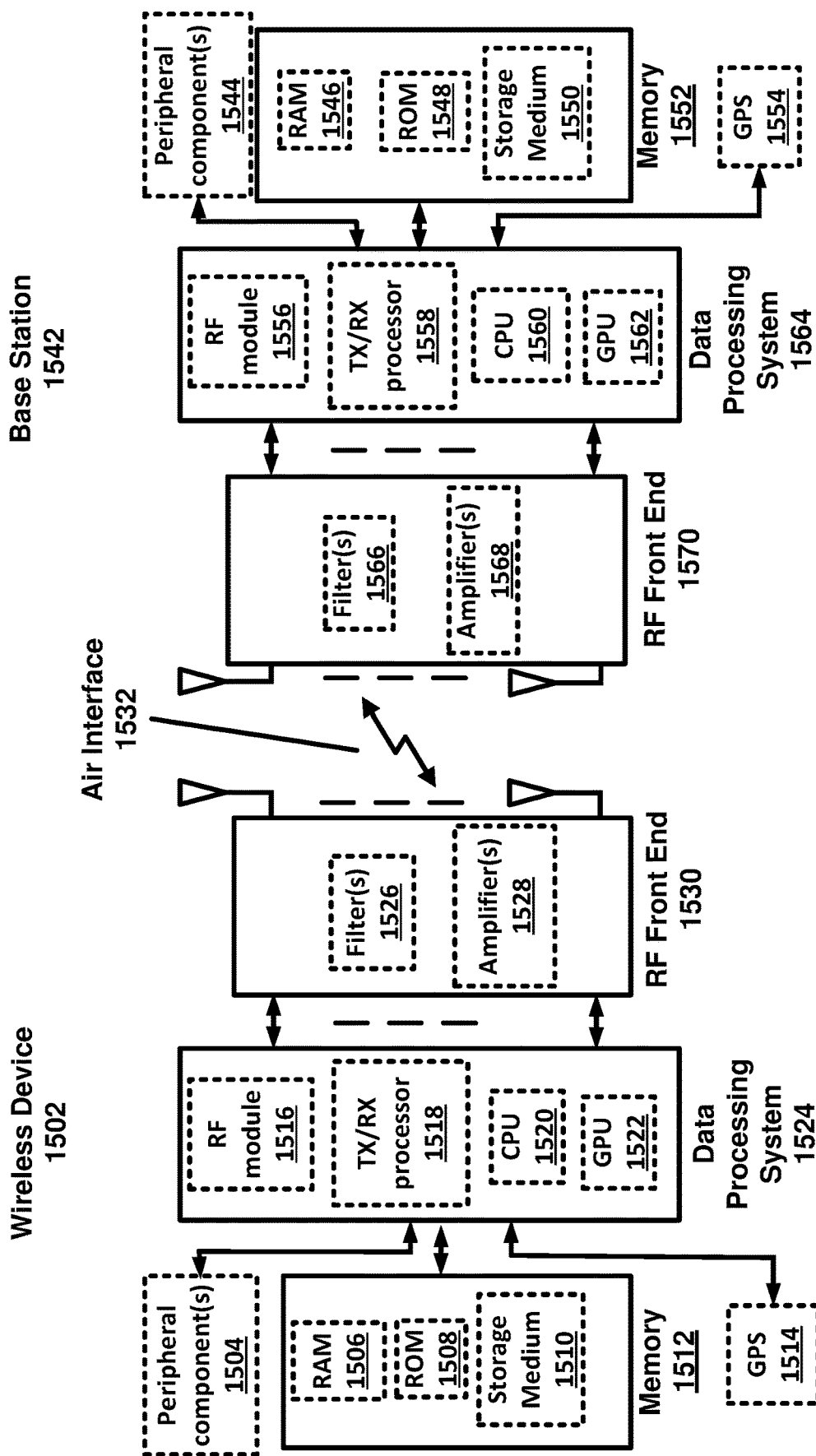
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System1524 at the wireless device 1502 and Data Processing System1564 at the base station 1542), Memory (e.g., Memory 1512 at the wireless device 1502 and Memory 1542 at the base station1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System1524 and/or the Data Processing System1564. One or more processes described in the present disclosure may be implemented by the Data Processing System1524 and/or the Data Processing System1564. A Data Processing System may include an RF module (RF module 1516 at the Data Processing System1524 and RF module 1556 at the Data Processing System1564) and/or a TX/RX processor (e.g., TX/RX processor 1518 at the Data Processing System1524 and TX/RX processor 1558 at the Data Processing System1566) and/or a central processing unit (CPU) (e.g., CPU 1520 at the Data Processing System1524 and CPU 1560 at the Data Processing System1564) and/or a graphical processing unit (GPU) (e.g., GPU 1522 at the Data Processing System1524 and GPU 1562 at the Data Processing System1564).

The Memory 1512 may have interfaces with the Data Processing System 1524 and the Memory 1552 may have interfaces with Data Processing System1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System1524 and Data Processing System1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System1524 and/or the Data Processing System1564 may be connected to other components such as a GPS module 1514 and a GPS module 1554, respectively, wherein the GPS module 1514 and a GPS module 1554 may enable delivery of location information of the wireless device 1502 to the Data Processing System1524 and location information of the base station 1542 to the Data Processing System1564. One or more other peripheral components (e.g., Peripheral Component(s) 1504 or Peripheral Component(s) 1544) may be configured and connected to the data Processing System1524 and data Processing System1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

The amount of licensed spectrum available for an operator to meet the demands may not be sufficient and obtaining licensed spectrum may be costly. Unlicensed spectrum is freely available subject to a set of rules, for example rules on maximum transmission power. Since the unlicensed spectrum is freely available, the interference situation may be more unpredictable compared to licensed spectrum. Achieving quality-of-service may be more challenging in unlicensed spectrum. WLANs and Bluetooth are examples of communication systems exploiting unlicensed spectrum in the lower-frequency range, e.g., 2.4 GHz or 5 GHz.

Some of the frequency bands used by an NR communications system may be unlicensed (e.g., in lower and/or higher frequency bands). Different deployment scenarios may be used in example embodiments. Example deployment scenarios include: carrier aggregation between licensed band NR (for example for PCell) and unlicensed band NR (NR-U) (for example for SCell), wherein NR-U SCell may have both DL and UL or may be DL-only; dual connectivity between licensed band LTE (e.g., PCell) and NR-U (e.g., PSCell); standalone NR-U, wherein PCell and SCell may be both in unlicensed bands; an NR cell with DL in unlicensed band and UL in licensed band; and dual connectivity between licensed band NR (e.g., PCell) and NR-U (e.g., PSCell).

In an example, the licensed spectrum may be used to provide wide-area coverage and quality-of-service guarantees, with unlicensed spectrum used as a local-area complement to increase user data rates and overall capacity without compromising on overall coverage, availability, and reliability. This may be referred to as License-Assisted Access (LAA).

In an example, to enable fair sharing of unlicensed spectra with other operators and/or systems (e.g., Wi-Fi), several mechanisms may be used in example embodiments. Example mechanisms may include dynamic frequency selection (DFS), where a network node may search and find a part of the unlicensed spectrum with low load. Example embodiments may employ listen-before-talk (LBT) based on example channel access procedures, where the transmitter ensures there are no ongoing transmissions on the carrier frequency prior to transmitting.

In an example, a channel may refer to a carrier or a part of a carrier comprising a contiguous set of resource blocks (RBs) on which a channel access procedure is performed in shared spectrum.

In an example, a channel access procedure may be a procedure based on sensing that evaluates the availability of a channel for performing transmissions. The basic unit for sensing may be a sensing slot with a duration $T_{sl}$=9 us. The sensing slot duration $T_{sl}$ may be considered to be idle if an eNB/gNB or a UE senses the channel during the sensing slot duration and determines that the detected power for at least 4 us within the sensing slot duration is less than energy detection threshold $X_{Thresh}$. Otherwise, the sensing slot duration $T_{sl}$ may be considered to be busy.

In an example, a channel occupancy may refer to transmission(s) on channel(s) by eNB/gNB/UE(s) after performing the corresponding channel access procedures.

In an example, a Channel Occupancy Time may refer to the total time for which eNB/gNB/UE and eNB/gNB/UE(s) sharing the channel occupancy perform transmission(s) on a channel after an eNB/gNB/UE performs the corresponding channel access procedures. For determining a Channel Occupancy Time, if a transmission gap is less than or equal to 25 us, the gap duration may be counted in the channel occupancy time. A channel occupancy time may be shared for transmission between an eNB/gNB and the corresponding UE(s).

In an example, a DL transmission burst may be defined as a set of transmissions from an eNB/gNB without any gaps greater than 16 us. Transmissions from an eNB/gNB separated by a gap of more than 16 us may be considered as separate DL transmission bursts. An eNB/gNB may transmit transmission(s) after a gap within a DL transmission burst without sensing the corresponding channel(s) for availability.

In an example, a UL transmission burst may be defined as a set of transmissions from a UE without gaps greater than 16 us. Transmissions from a UE separated by a gap of more than 16 us may be considered as separate UL transmission bursts. A UE may transmit transmission(s) after a gap within a UL transmission burst without sensing the corresponding channel(s) for availability.

In an example, a discovery burst may refer to a DL transmission burst including a set of signal(s) and/or channel(s) confined within a window and associated with a duty cycle. The discovery burst may be any of the following:

Transmission(s) initiated by an eNB that includes a primary synchronization signal (PSS), secondary synchronization signal (SSS) and cell-specific reference signal(s)(CRS) and may include non-zero power CSI reference signals (CSI-RS).

Transmission(s) initiated by a gNB that includes at least an SS/PBCH block consisting of a primary synchronization signal (PSS), secondary synchronization signal (SSS), physical broadcast channel (PBCH) with associated demodulation reference signal (DM-RS) and may also include CORESET for PDCCH scheduling PDSCH with SIB1, and PDSCH carrying SIB1 and/or non-zero power CSI reference signals (CSI-RS).

In an example, a UE performing transmission(s) on LAA Scell(s), an eNB scheduling or configuring UL transmission(s) for a UE performing transmission(s) on LAA Scell(s), and a UE performing transmission(s) on channel(s) and a gNB scheduling or configuring UL transmission(s) for a UE performing transmissions on channel(s) may perform procedures for the UE to access the channel(s) on which the transmission(s) are performed.

In an example, transmissions from a UE may be considered as separate UL transmissions, irrespective of having a gap between transmissions or not, and $X_{Thresh}$ for sensing may be adjusted.

In an example, a UE may perform channel access procedures unless a higher layer parameter is provided and configured as semi-static.

In an example, a UE may access a channel on which UL transmission(s) are performed according to one of Type 1 or Type 2 UL channel access procedures.

In an example, if an UL grant scheduling a PUSCH transmission indicates Type 1 channel access procedures, the UE may use Type 1 channel access procedures for transmitting transmissions including the PUSCH transmission.

In an example, a UE may use Type 1 channel access procedures for transmitting transmissions including the autonomous PUSCH transmission on configured UL resources.

In an example, if a UL grant scheduling a PUSCH transmission indicates Type 2 channel access procedures, the UE may use Type 2 channel access procedures for transmitting transmissions including the PUSCH transmission.

In an example, a UE may use Type 1 channel access procedures for transmitting SRS transmissions not including a PUSCH transmission. UL channel access priority class p=1 in FIG. 16 may be used for SRS transmissions not including a PUSCH.

In an example, if a UE is scheduled by an eNB/gNB to transmit PUSCH and SRS in contiguous transmissions without any gaps in between, and if the UE cannot access the channel for PUSCH transmission, the UE may attempt to make SRS transmission according to uplink channel access procedures for SRS transmission.

In an example, a UE may use Type 1 channel access procedures for PUCCH transmissions. If a DL grant scheduling a PUCCH transmission indicates Type 2 channel access procedures, the UE may use Type 2 channel access procedures.

In an example, when a UE uses Type 1 channel access procedures for PUCCH transmissions or PUSCH only transmissions without UL-SCH, the UE may use UL channel access priority class p=1 in FIG. 16.

In an example, a UE may use Type 1 channel access procedure for transmissions related to random access procedure that initiate a channel occupancy with UL channel access priority class p=1 in FIG. 16.

In an example, the total duration of autonomous uplink transmission(s) obtained by the channel access procedure in this subclause, including the following DL transmission if the UE sets 'COT sharing indication' in AUL-UCI to '1' in a subframe within the autonomous uplink transmission(s), may not exceed $T_{ulm\_cot,p}$, where $T_{ulm\_cot,p}$ is given in FIG. 16.

In an example, if a UE detects 'UL duration and offset' field in a DCI format (e.g., DCI Format 1C), the following may be applicable:

If the UL duration and offset' field indicates an 'UL offset' l and an 'UL duration' d for subframe n, then the scheduled UE may use channel access procedures Type 2 for transmissions in subframes n+l+i where i=0, 1, . . . d−1, irrespective of the channel access Type signalled in the UL grant for those subframes, if the end of UE transmission occurs in or before subframe n+l+d−1.

If the 'UL duration and offset' field indicates an 'UL offset' l and an 'UL duration' d for subframe n and the 'COT sharing indication for AUL' field is set to '1', then a UE configured with autonomous UL may use channel access procedures Type 2 for autonomous UL transmissions assuming any priority class in subframes n+l+i where i=0, 1, . . . d−1, if the end of UE autonomous UL transmission occurs in or before subframe n+l+d−1 and the autonomous UL transmission between n+l and n+l+d−1 may be contiguous.

If the 'UL duration and offset' field indicates an 'UL offset' l and an 'UL duration' d for subframe n and the 'COT sharing indication for AUL' field is set to '0', then a UE configured with autonomous UL may not transmit autonomous UL in subframes n+l+i where i=0, 1, . . . d−1.

In an example, if a UE determines the duration in time domain and the location in frequency domain of a remaining channel occupancy initiated by the gNB from a DCI format 2_0, the followings may be applicable: the UE may switch from Type 1 channel access procedures to Type 2A channel access procedures for its corresponding UL transmissions within the determined duration in time and location in frequency domain of the remaining channel occupancy. In this case, if the UL transmissions are PUSCH transmissions on configured resources, the UE may assume any priority class for the channel occupancy that shares with the gNB.

In an example, for contiguous UL transmission(s), the following may be applicable:

If a UE is scheduled to transmit a set of UL transmissions including PUSCH using a UL grant, and if the UE cannot access the channel for a transmission in the set prior to the last transmission, the UE may attempt to transmit the next transmission according to the channel access type indicated in the UL grant.

If a UE is scheduled to transmit a set of consecutive UL transmissions without gaps including PUSCH using one or more UL grant(s) and the UE transmits one of the scheduled UL transmissions in the set after accessing the channel according to one of Type 1 or Type 2 UL channel access procedures, the UE may continue transmission of the remaining UL transmissions in the set, if any.

A UE may not be expected to be indicated with different channel access types for any consecutive UL transmissions without gaps in between the transmissions.

In an example, for UL transmission(s) with multiple starting positions scheduled by eNB, the following may be applicable:

If a UE is scheduled by an eNB to transmit transmissions including PUSCH Mode 1 using the Type 1 channel access procedure indicated in DCI, and if the UE cannot access the channel for a transmission according to the PUSCH starting position indicated in the DCI, the UE may attempt to make a transmission at symbol 7 in the same subframe according to Type 1 channel access procedure. There may be no limit on the number of attempts the UE can make using Type 1 channel access procedure.

If a UE is scheduled by an eNB to transmit transmissions including PUSCH Mode 1 using the Type 2 channel access procedure indicated in DCI, and if the UE cannot access the channel for a transmission according to the PUSCH starting position indicated in the DCI, the UE may attempt to make a transmission at symbol 7 in the same subframe and according to Type 2 channel access procedure. The number of attempts the UE may make within the consecutively scheduled subframes including the transmission is limited to w+1, where w is the number of consecutively scheduled subframes using Type 2 channel access procedure.

In an example, for contiguous UL transmissions(s) including a transmission pause, the following are applicable:

If a UE is scheduled to transmit a set of consecutive UL transmissions without gaps using one or more UL grant(s), and if the UE has stopped transmitting during or before one of these UL transmissions in the set and prior to the last UL transmission in the set, and if the channel is sensed by the UE to be continuously idle after the UE has stopped transmitting, the UE may transmit a later UL transmission in the set using Type 2 channel access procedure.

If a channel sensed by a UE is not continuously idle after the UE has stopped transmitting, the UE may transmit a later UL transmission in the set using Type 1 channel access procedure with the UL channel access priority class indicated in the DCI corresponding to the UL transmission.

In an example, for UL transmission(s) following autonomous UL transmission(s), the following may be applicable:

If a UE is scheduled by an eNB to transmit on channel $c_i$ by a UL grant received on channel $c_j$, $i \neq j$, and if the UE is transmitting using autonomous UL on channel $c_i$, the UE may terminate the ongoing PUSCH transmissions using the autonomous UL at least one subframe before the UL transmission according to the received UL grant.

If a UE is scheduled by a UL grant received from an eNB on a channel to transmit a PUSCH transmission(s) starting from subframe n on the same channel using Type 1 channel access procedure and if at least for the first scheduled subframe occupies $N_{RB}^{UL}$ resource blocks and the indicated TUSCH starting position is OFDM symbol zero, and if the UE starts autonomous UL transmissions before subframe n using Type 1 channel access procedure on the same channel, the UE may transmit UL transmission(s) according to the received UL grant from subframe n without a gap, if the priority class value of the performed channel access procedure is larger than or equal to priority class value indicated in the UL grant, and the autonomous UL transmission in the subframe preceding subframe n may end at the last OFDM symbol of the subframe regardless of the higher layer parameter endingSymbolAUL. The sum of the lengths of the autonomous UL transmission(s) and the scheduled UL transmission(s) may not exceed the maximum channel occupancy time corresponding to the priority class value used to perform the autonomous uplink channel access procedure. Otherwise, the UE may terminate the ongoing autonomous UL transmission at least one subframe before the start of the UL transmission according to the received UL grant on the same channel.

In an example, if a UE receives a DCI indicating a UL grant scheduling a PUSCH transmission using Type 1 channel access procedures or indicating a DL grant scheduling a PUCCH transmission using Type 1 channel access procedures, and if the UE has an ongoing Type 1 channel access procedures before the PUSCH or PUCCH transmission starting time:

If the UL channel access priority class value $p_1$ used for the ongoing Type 1 channel access procedures is same or larger than the UL channel access priority class value $p_2$ indicated in the DCI, the UE may transmit the PUSCH transmission in response to the UL grant by accessing the channel by using the ongoing Type 1 channel access procedure.

if the UL channel access priority class value $p_1$ used for the ongoing Type 1 channel access procedure is smaller than the UL channel access priority class value $p_2$ indicated in the DCI, the UE may terminate the ongoing channel access procedure.

The UE may transmit the PUCCH transmission in response to the DL grant by accessing the channel by using the ongoing Type 1 channel access procedures.

In an example, an eNB/gNB may indicate Type 2 channel access procedures in the DCI of a UL grant or DL grant scheduling transmission(s) including PUSCH or PUCCH on a channel, respectively, as follows:

The eNB/gNB may indicate Type 2 channel access procedures in the DCI if the eNB/gNB has transmitted on the channel according to the channel access procedures, or The eNB may indicate using the 'UL duration and offset' field that the UE may perform a Type 2 channel access procedure for transmissions(s) including PUSCH on a channel in a subframe n when the eNB has transmitted on the channel according to the channel access procedure, or The eNB may indicate using the 'UL duration and offset' field and 'COT sharing indication for AUL' field that a UE configured with autonomous UL may perform a Type 2 channel access procedure for autonomous UL transmissions(s) including PUSCH on a channel in subframe n when the eNB has transmitted on the channel according to the channel access procedure and acquired the channel using the largest priority class value and the eNB transmission includes PDSCH, or The eNB/gNB may schedule UL transmissions on a channel, that follow a transmission by the eNB/gNB on that channel with Type 2A channel access procedures for the UL transmissions if the UL transmissions occur within the time interval starting at $t_0$ and ending at $t_0+T_{CO}$, where $T_{CO}=T_{m\ cot,p}+T_g$, $t_0$ is the time instant when the eNB/gNB has started transmission, $T_{m\ cot,\ p}$ value is determined by the eNB/gNB, $T_g$ is the total duration of all gaps of duration greater than 25 us that occur between the DL transmission of the eNB/gNB and UL transmissions scheduled by the eNB/gNB, and between any two UL transmissions scheduled by the eNB/gNB starting from $t_0$.

In an example, the eNB/gNB may schedule UL transmissions between $t_0$ and $t_0+T_{CO}$ without gaps between consecutive UL transmissions if they can be scheduled contiguously. For a UL transmission on a channel that follows a transmission by the eNB/gNB on that channel using Type 2A channel access procedures, the UE may use Type 2A channel access procedure for the UL transmission.

If the eNB/gNB indicates Type 2 channel access procedure for the UE in the DCI, the eNB/gNB may indicate the channel access priority class used to obtain access to the channel in the DCI.

For indicating a Type 2 channel access procedure, if the gap is at least 25 us, or equal to 16 us, or up to 16 us, the gNB may indicate Type 2A, or Type 2B, or Type 2C UL channel procedures, respectively.

In an example, UE may transmit the transmission using Type 1 channel access procedure after first sensing the channel to be idle during the slot durations of a defer duration $T_d$; and after the counter N is zero in step 4. The counter N may be adjusted by sensing the channel for additional slot duration(s) according to the steps described below.

1) set $N=N_{init}$, where $N_{init}$ is a random number uniformly distributed between 0 and $CW_p$, and go to step 4;
2) if N>0 and the UE chooses to decrement the counter, set N=N−1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

In an example, if a UE has not transmitted a UL transmission on a channel on which UL transmission(s) are performed after step 4 in the procedure above, the UE may transmit a transmission on the channel, if the channel is sensed to be idle at least in a sensing slot duration $T_{sl}$ when the UE is ready to transmit the transmission and if the channel has been sensed to be idle during all the slot durations of a defer duration $T_d$ immediately before the transmission. If the channel has not been sensed to be idle in a sensing slot duration $T_{sl}$ when the UE first senses the channel after it is ready to transmit, or if the channel has not been sensed to be idle during any of the sensing slot durations of a defer duration $T_d$ immediately before the intended transmission, the UE may proceed to step 1 after sensing the channel to be idle during the slot durations of a defer duration $T_d$.

In an example, the defer duration $T_d$ may comprise a duration $T_f=16$ us immediately followed by $m_p$ consecutive slot durations where each slot duration is $T_{sl}=9$ us, and $T_f$ may include an idle slot duration $T_{sl}$ at start of $T_f$. In an example, $CW_{min,p} \leq CW_p \leq CW_{max,p}$ may be the contention window. In an example, $CW_{min,p}$ and $CW_{max,p}$ may be chosen before step 1 of the procedure above. In an example, $m_p$, $CW_{min,p}$, and $CW_{max,p}$ may be based on a channel access priority class p that may be signaled to the UE.

In an example, for Type 2 UL channel access procedure, the time duration spanned by the sensing slots that are sensed to be idle before a UL transmission(s) may be deterministic.

In an example, if a UE is indicated to perform Type 2A UL channel access procedures, the UE may use Type 2A UL channel access procedures for a UL transmission. The UE may transmit the transmission immediately after sensing the channel to be idle for at least a sensing interval $T_{short\_ul}=25$ us. $T_{short\_ul}$ may comprise a duration $T_f=16$ us immediately followed by one slot sensing slot and $T_f$ may include a sensing slot at start of $T_f$. The channel may be considered to be idle for $T_{short\_ul}$ if both sensing slots of $T_{short\_ul}$ are sensed to be idle.

In an example, if a UE is indicated to perform Type 2B UL channel access procedures, the UE may use Type 2B UL channel access procedure for a UL transmission. The UE may transmit the transmission immediately after sensing the channel to be idle within a duration of $T_f=16$ us. $T_f$ may include a sensing slot that occurs within the last 9 us of $T_f$. The channel may be considered to be idle within the duration $T_f$ if the channel is sensed to be idle for total of at least 5 us with at least 4 us of sensing occurring in the sensing slot.

In an example, if a UE is indicated to perform Type 2C UL channel access procedures for a UL transmission, the UE may not sense the channel before the transmission. The duration of the corresponding UL transmission may be at most 584 us.

In an example, if a UE transmits transmissions using Type 1 channel access procedures that are associated with channel access priority class p on a channel, the UE may maintain the contention window value $CW_p$ and may adjust $CW_p$ for those transmissions before step 1 of the procedure.

In an example, if the absence of any other technology sharing a channel can be guaranteed on a long-term basis (e.g. by level of regulation) and if a gNB provides UE(s) with higher layer parameters ChannelAccessMode-r16='semistatic' by SIB1 or dedicated configuration, a periodic channel occupancy may be initiated every $T_x$ within every two consecutive radio frames, starting from the even indexed radio frame at $x \cdot T_x$ with a maximum channel occupancy time $T_y=0.95T_x$, where $T_x$=Period in ms, is a higher layer parameter provided and $$x \in \left\{ 0, 1, \ldots, \frac{20}{T_x} - 1 \right\}.$$

In an example, when a gNB or UE performs sensing for evaluating a channel availability, the sensing may be performed at least during a sensing slot duration $T_{sl}=9$ us.

In an example, a channel occupancy initiated by a gNB and shared with UE(s) may satisfy the following:

The gNB may transmit a DL transmission burst(s) starting at the beginning of the channel occupancy time immediately after sensing the channel to be idle for at least a sensing slot duration $T_{sl}=9$ us. If the channel is sensed to be busy, the gNB may not perform any transmission during the current channel occupancy time.

The gNB may transmit a DL transmission burst(s) within the channel occupancy time immediately after sensing the channel to be idle for at least a sensing slot duration $T_{sl}=9$ us if the gap between the DL transmission burst(s) and any previous transmission burst is more than 16 us.

The gNB may transmit DL transmission burst(s) after UL transmission burst(s) within the channel occupancy time without sensing the channel if the gap between the DL and UL transmission bursts is at most 16 us.

In an example, a UE may transmit UL transmission burst(s) after DL transmission burst(s) within the channel occupancy time as follows:

If the gap between the UL and DL transmission bursts is at most 16 us, the UE may transmit UL transmission burst(s) after a DL transmission burst(s) within the channel occupancy time without sensing the channel.

If the gap between the UL and DL transmission bursts is more than 16 us, the UE may transmit UL transmission burst(s) after a DL transmission burst(s) within the channel occupancy time after sensing the channel to be idle for at least a sensing slot duration $T_{sl}=9$ us before transmission.

The gNB and UEs may not transmit any transmissions in a set of consecutive symbols for a duration of at least $T_z=\max(0.05T_x, 100 \text{ us})$ before the start of the next channel occupancy time.

In an example embodiment, a wireless device (e.g., a MAC entity of the wireless device) may employ one or more processes to handle the uplink LBT failures for uplink transmissions, such as uplink transmissions for one or more uplink channels (e.g., PUSCH, PUCCH and/or PRACH) and/or one or more signals (e.g., SRS). In an example, the wireless device may detect/determine consistent uplink LBT failures to detect/determine uplink LBT problems. A MAC entity of the wireless device may receive notifications of uplink LBT failures from the physical layer to detect consistent uplink LBT failures.

In an example, detection/determination of consistent uplink LBT failures may be based on a counter and/or timer. A value of the counter may be incremented based on detecting an uplink LBT failure. In an example, a threshold may be configured and a consistent uplink LBT failure may be determined based on the counter reaching the threshold. A consistent uplink LBT failure event may be triggered based on the uplink LBT failure counter reaching the threshold value. In an example, a timer may be started based on detecting a consistent uplink LBT failure and the value of the counter may be reset (e.g., reset to zero) based on an expiry of the timer. The wireless device may receive configuration parameters indicating the threshold value for the counter (e.g., a Max Count value) and a value of the timer. In an example, the threshold for the counter and/or the timer value may be configured per BWP and/or per cell. In an example, the threshold may be reset (e.g., reset to zero) based on the reconfiguration (e.g., in response to receiving an RRC reconfiguration message) of one or more parameters of the consistent uplink failure detection such as the threshold and/or timer value.

The wireless device may determine consistent LBT failure (e.g., for a cell and/or a BWP of the cell and/or an LBT sub-band of the BWP of the cell). The wireless device may indicate the consistent LBT failure (e.g., for a cell and/or a BWP of the cell and/or an LBT sub-band of the BWP of the cell) to the base station. The cell for which the wireless device may indicate consistent LBT failure may be a secondary cell or a primary cell (e.g., PCell or PSCell). In an example, the wireless device may autonomously take a recovery action. In an example, the wireless device may receive a command from the base station in response to indication of the consistent LBT failure to the base station. The recovery action may include switching the BWP and/or performing a random access process (e.g., in the new BWP after switching). In an example, the wireless device may stop one or more timers (e.g., BWP inactivity timer) based on the detecting/determining the consistent LBT failure.

In an example, the determining/detecting of the consistent uplink LBT failure on a cell/BWP may be based on a plurality of uplink transmissions (e.g., via one or more uplink channels and/or one or more uplink signals) on the cell/BWP. In an example, the determining/detecting of the consistent uplink LBT failure may be independent of uplink transmission type. The LBT failures for different uplink transmissions may be used to determine the consistent uplink LBT failure regardless of the uplink transmission types (e.g., PUSCH, PUCCH, etc.). The consistent uplink LBT failure mechanism may have the same recovery mechanism for all uplink LBT failures regardless of the uplink transmission type.

In an example, based on detecting/determining/declaring consistent uplink LBT failures on PCell or PSCell, the wireless device may switch a current active BWP (of PCell or PSCell) to a second BWP (of PCell or PSCell). The wireless device may initiate a random access process in the second BWP based on the second BWP being configured with random access resources. The wireless device may perform radio link failure (RLF) recovery based on the consistent uplink LBT failure being detected on the PCell and consistent uplink LBT failure being detected on N possible BWPs of the PCell. In an example, based on detecting/determining consistent uplink LBT failures on a PSCell and after detecting a consistent uplink LBT failure on N BWPs of the PSCell, the wireless device may indicate a failure to a master base station via a secondary cell group (SCG) failure information procedure. In an example, N may be the number of configured BWPs with configured random access resources. In an example, after detecting consistent uplink LBT failure on PCell or PSCell, the wireless device may determine which BWP to switch if N is larger than one. The value of N may be configurable (e.g., via RRC) or may be pre-determined/pre-configured.

In an example, based on detecting/determining consistent uplink LBT failures on a cell (e.g., a SCell or PCell), the wireless device may indicate the consistent LBT failure on the cell to the base station based on an LBT failure indication MAC CE. The MAC CE may report consistent uplink LBT failure on one or more Cells. The MAC CE format may support multiple entries to indicate the Cells which have already declared consistent uplink LBT failures. In an example, the LBT failure indication MAC CE may indicate/include cell index(es) where uplink LBT failure occurs. In an example, the format of the LBT failure indication MAC CE may be a bitmap to indicate whether corresponding serving cell has declared consistent uplink LBT failure or not.

The LBT failure indication MAC CE may be transmitted on a different serving cell than a SCell which has consistent UL LBT problem. In an example, the LBT failure indication MAC CE may indicate consistent uplink LBT failures on one or more cells and the wireless device may transmit the LBT failure indication MAC CE based on an uplink grant on a cell other than the one or more cells. The MAC CE for uplink LBT failure indication may have higher priority than data but lower priority than a beam failure recovery (BFR) MAC CE.

The wireless device may trigger scheduling request if there is no available uplink resource for transmitting the MAC CE for a SCell uplink LBT failure indication. The wireless device may receive configuration parameters of a SR configuration associated with uplink LBT failure indication. The configuration parameters may comprise an identifier indicating that the SR is associated with uplink LBT failure indication. In an example, when a SR configuration associated with uplink LBT failure indication is not configured for the wireless device and no resource is available for transmitting the MAC CE for indicating SCell uplink LBT failure, the wireless device may start a random access process.

In an example, when a SR for uplink LBT failure indication is triggered and the wireless device has an overlapping SR PUCCH resource with the SCell LBT failure SR PUCCH resource, the wireless device may select the SCell LBT failure SR PUCCH resource for transmission.

In an example, the wireless device may cancel the consistent LTB failure for a serving cell (or BWP(s)) (e.g., may not consider the cell as having consistent LBT failure) based on the wireless device successfully transmitting an LBT failure MAC CE indicating the serving cell.

In an example, when consistent UL LBT failure is declared on SpCell, the wireless device may trigger MAC CE to indicate where failure happened. The MAC CE may be sent on the BWP that the wireless device switched to during the random access process.

In an example, different LBT failures, irrespective of channel, channel access priority class, and LBT type, may be considered equivalent for the consistent UL LBT failure detection procedure at a MAC entity of a wireless device.

In an example, upon switching to a new BWP after detecting consistent LBT failures on a BWP of the PCell/PSCell, the wireless device may increment a counter (e.g., a BWP switching counter). The BWP switching counter may be used by the wireless device to initiate a radio link failure process based on the BWP switching counter reaching a value (e.g., N). The wireless device may reset the BWP switching counter when the random access process on a BWP of the PCell/PSCell being successfully completed.

In an example, in response to the BWP switching due to consistent uplink LBT failure on PCell/PSCell, the wireless device may indicate the consistent uplink LBT failure via dedicated uplink resource (e.g. PRACH). For example, the PRACH resources used for indication of consistent uplink LBT failure may be dedicated to consistent uplink LBT failure indication In an example, the uplink LBT failure information reported by the UE may include one or more BWP indexes of BWPs with consistent uplink LBT failures, one or more cell indexes of one or more cells with consistent uplink LBT failures and/or one or more measurement results (e.g., RSRP/RSRQ/RSSI/CO) of the serving/neighbor cells.

In an example, the wireless device may perform an LBT for an uplink transmission comprising the uplink failure indication MAC CE based on a highest priority channel access priority class (e.g., lowest number channel access priority).

In an example, the wireless device may reset the uplink LBT counter for a cell/BWP based on expiry of an uplink LBT timer and/or based on receiving one or more messages indicating reconfiguration of uplink LBT configuration parameters for detecting consistent LBT failures and/or based on transmitting an uplink channel or uplink signal on the cell/BWP in response to successful uplink LBT. In an example, successful uplink LBT for the cell/BWP may indicate that the cell/BWP no longer has consistent LBT failures.

In an example, in response to BWP switching caused by detection of consistent uplink LBT failures on SpCell, a MAC entity may stop an ongoing random access procedure and may initiate a new random access procedure.

In an example, based on switching BWP due to detecting/declaring consistent LBT failure on a BWP of PCell or PSCell, the wireless device may initiate a random access process and may not perform other transmissions (e.g., may not resume suspended configured grants transmissions).

In an example, a wireless device may autonomously deactivate a configured grant for Sell(s) experiencing a consistent UL LBT failure.

In an example, based on detecting/declaring consistent uplink LBT failure for a cell/BWP, ongoing transmissions (e.g., PUSCH transmission, SRS transmission, PUCCH transmission, RACH transmission, etc.) on active BWP of a SCell with consistent uplink LBT failure may be suspended.

In an example, based on detecting/declaring consistent uplink LBT failure for a cell/BWP, type 2 configured grants on the cell/BWP may be cleared. In an example, based on detecting/declaring consistent uplink LBT failure for a cell/BWP, type 1 configured grants on the cell/BWP may be suspended. In an example, based on detecting/declaring consistent uplink LBT failure for a BWP, BWP inactivity for a downlink BWP associated with the BWP may be stopped.

In an example, based on switching BWP due to detecting/declaring consistent LBT failure on a BWP of PCell or PSCell, a counter for detection of consistent uplink LBT failure of the BWP may be reset and/or a timer for consistent uplink LBT failure detection of the BWP may be stopped.

In an example, based on an uplink transmission failure due to LBT, a physical layer of a wireless device may send LBT failure indication to a MAC entity of the wireless device. The MAC entity of the wireless device may, based on receiving an LBT failure indication, start an lbt-FailureDetectionTimer and increment an LBT_COUNTER. Based on the lbt-FailureDetectionTimer expiring, the LBT_COUNTER may be reset. Based on LBT_COUNTER reaching a configured threshold value before the lbt-FailureDetectionTimer expiring, the wireless device may trigger a consistent uplink LBT failure event. In an example, a "failureType" in SCG failure information may indicate consistent uplink LBT failures.

Figure 17:
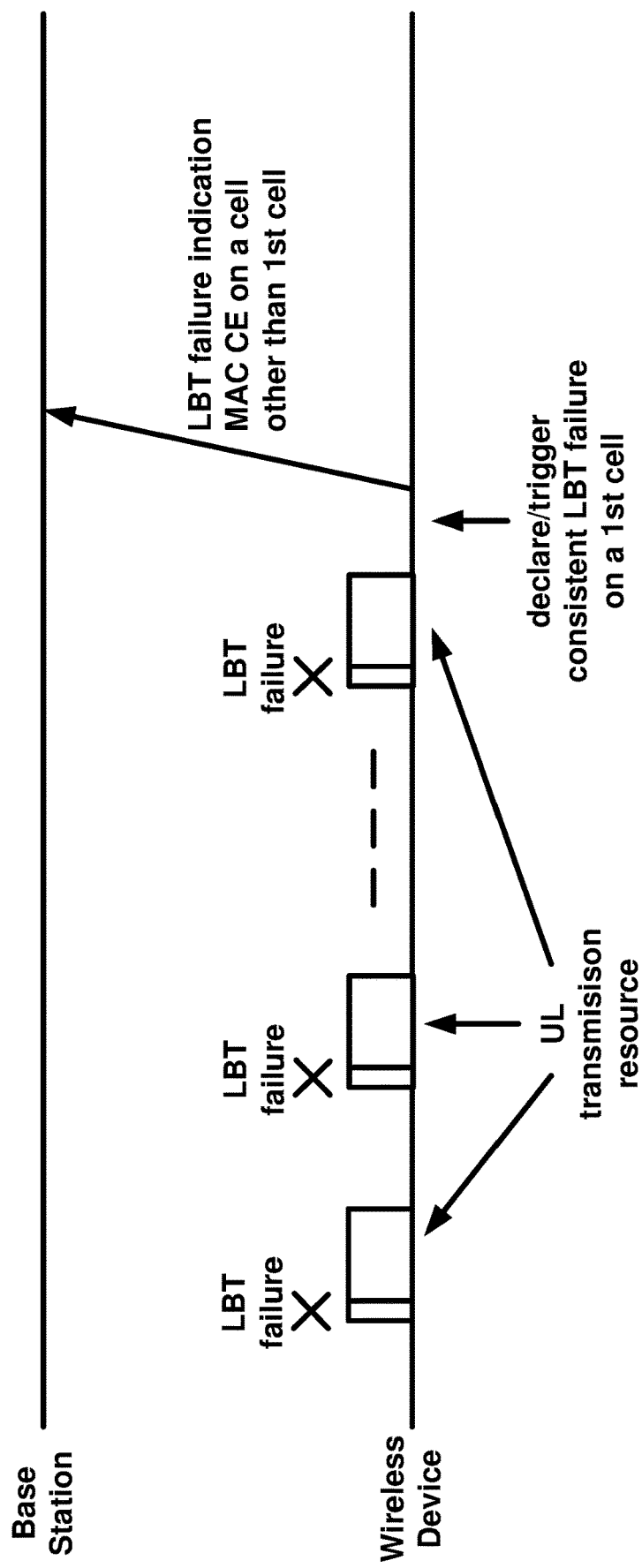
FIG. 17 shows example LBT failure indication in accordance with several of various embodiments of the present disclosure.

In an example as shown in FIG. 17, a wireless device may determine consistent LBT failures on a cell and/or a BWP of a cell and/or an LBT subband of a BWP of a cell. The determination of consistent LBT failures on the cell/BWP/LBT subband may be based on counting a number of uplink LBT failures for uplink transmissions on the cell/BWP/LBT subband. The uplink transmission may be via an uplink channel (e.g., PUSCH, PUCCH, PRACH) or an uplink signal (e.g., SRS). For example, the wireless device may increment a counter based on determining/detecting an uplink LBT failure for an uplink transmission and may declare/trigger a consistent LBT failure indication based on the counter reaching a first value. The first value for the counter may be configurable (e.g., by RRC). The wireless device may receive configuration parameters comprising a first parameter indicating the first value. For example, a MAC entity of the wireless device may determine an LBT failure based on an indication of the LBT failure for the uplink transmission from the physical layer of the wireless device. The wireless device may start a timer based on receiving an LBT failure indication and may reset the LBT counter (e.g., reset to zero) based on the timer expiring. The wireless device may transmit an LBT failures indication MAC CE based on the triggering/declaring/determining a consistent LBT failure for a first cell/BWP/LBT subband. The LBT failures indication MAC CE may indicate consistent LBT failure on the first cell (and/or first BWP or first LBT subband of the first cell) and one or more other cells/BWPs/LB subbands that have consistent LBT failures.

Figure 18:
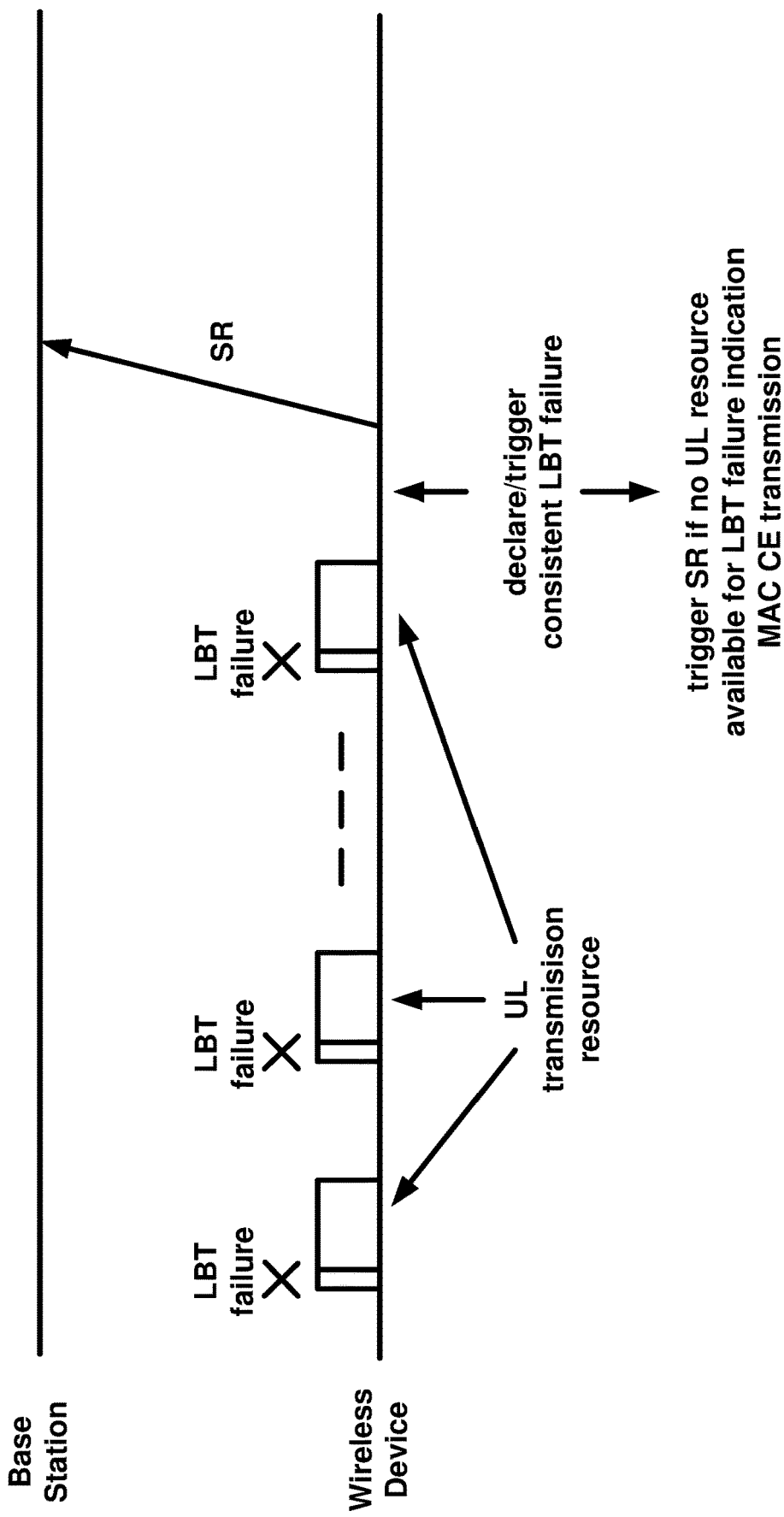
FIG. 18 shows example LBT failure indication in accordance with several of various embodiments of the present disclosure.

In an example as shown in FIG. 18, the wireless device may declare/trigger consistent LBT failures on a cell/BWP/LBT subband based on a consistent LBT failure determination described earlier. The wireless device may determine that no uplink resource is available for transmission of an LBT failure indication MAC CE. Based on no uplink resource being available for transmission of the LBT failure indication MAC CE, the wireless device may trigger a scheduling request. The wireless device may transmit a scheduling request signal based on a scheduling request configuration. The scheduling request configuration may be for transmission of scheduling request signals related to uplink LBT failure recovery.

In an example, the configuration parameters of the scheduling request configuration (e.g., a scheduling request identifier and/or other parameters) may indicate that the scheduling request configuration is for consistent LBT failure recovery. The scheduling request configuration may indicate resources comprising a first resource for transmission of the scheduling request signal.

In an example, a bandwidth part (BWP) of a cell in unlicensed bands may comprise one or more LBT subbands (LBT bandwidths). An LBT subband/bandwidth may be a unit of bandwidth wherein an LBT procedure is performed.

In an example, an IE PhysicalCellGroupConfig may be used to configure cell-group specific L1 parameters. A parameter PDSCH HARQ-ACK codebook may have either semi-static or dynamic values and may be applicable to both CA and non-CA operation.

In an example, a wireless device may construct at least two HARQ-ACK codebooks. The wireless device may construct the at least two HARQ feedback codebooks simultaneously constructed. The at least two HARQ feedback codebooks may be for different traffic/service types for the wireless device and/or for different priorities.

In an example, for supporting multiple PUCCHs for HARQ-ACK within a slot, simultaneous HARQ-ACK codebooks for different service types may be supported. For example, sub-slot-based HARQ-ACK feedback procedure and/or PDSCH grouping may be supported.

In an example, when at least two HARQ-ACK codebooks are simultaneously constructed for supporting different service/traffic types and/or priorities for a wireless device, a HARQ-ACK codebook may be identified based on some PHY indications/properties.

In an example, for supporting multiple PUCCHs for HARQ-ACK within a slot for constructing HARQ-ACK codebook, a wireless device may use a sub-slot-based HARQ-ACK feedback procedure. An uplink slot may comprise a number of sub-slots. In an example, no more than one transmitted PUCCH carrying HARQ-ACKs may start in a sub-slot. The PDSCH transmission may not be subject to sub-slot restrictions (if any). The HARQ-codebook construction may be applied in unit of sub-slot for Type II and/or Type I HARQ-ACK codebook. In an example, the number or length of UL sub-slots in a slot may be UE-specifically semi-statically configured. There may be a limit of number of PUCCH transmissions carrying HARQ-ACKs in a slot.

In an example, for supporting multiple PUCCHs for HARQ-ACK within a slot for constructing HARQ-ACK codebook, the PDSCH to HARQ feedback timing may be defined in unit of sub-slot.

In an example, when at least two HARQ-ACK codebooks are simultaneously constructed for supporting different service types for a UE, for both Type I (if supported) and Type II HARQ-ACK codebooks (if supported), and for dynamically scheduled PDSCH, the PHY identification for identifying a HARQ-ACK codebook may be based on one or more of: DCI format, RNTI, explicit indication in DCI and CORESET/search space.

In an example, for sub-slot-based HARQ-ACK feedback procedure, PDSCH to HARQ feedback timing may be the number of sub-slots from the sub-slot containing the end of PDSCH to the sub-slot containing the start of PUCCH. In an example, UL numerology may be used to define the sub-slot grid for PDSCH-to-sub-slot association.

In an example, for sub-slot-based HARQ-ACK feedback procedure, the starting symbol of a PUCCH resource may be defined with respect to the first symbol of sub-slot. For a given sub-slot configuration, a UE may be configured with PUCCH resource set(s). In an example, same PUCCH resource sets may be configured for different sub-slots within a slot. In an example, different PUCCH resource sets may be configured for different sub-slots within a slot.

In an example, when at least two HARQ-ACK codebooks are simultaneously constructed for supporting different service types for a wireless device, at least the following parameters in PUCCH configuration may be separately configured for different HARQ-ACK codebooks: K1 (PDSCH to HARQ feedback timing) granularity, K1 set, PUCCH resource set and MaxCoderate.

In an example, when at least two HARQ-ACK codebooks are simultaneously constructed for supporting different service types for a wireless device, some parameters in PUCCH configuration related to HARQ-ACK feedback may be separately configured for different HARQ-ACK codebooks.

In an example, at least one sub-slot configuration for PUCCH may be UE-specifically configured to a UE.

In an example, a wireless device may be configured and/or support at least following two sub-slot configurations for PUCCH: "2-symbol*7" and "7-symbol*2". In an example, the wireless device may support other configurable sub-slot configurations, e.g., 4, 14 sub-slots in a slot. In an example, a single configuration for PUCCH resource may be applicable for all the sub-slots in a slot. In an example, PUCCH resource configuration may be different for different sub-slots. In an example, a PUCCH resource across sub-slot boundary may be supported.

In an example, when at least two HARQ-ACK codebooks are simultaneously constructed for supporting different service/traffic types for a UE, at least the following may be separately configured for different HARQ-ACK codebooks: PUCCH-SpatialRelationInfo, sub-slot configuration (e.g., for the sub-slot-based HARQ-ACK codebook)

In an example, when at least two HARQ-ACK codebooks are simultaneously constructed for supporting different service types for a UE, one or more of the following may be used for the PHY identification for identifying a HARQ-ACK codebook: RNTI and/or by explicit indication in DCI (for dynamically scheduled PDSCH), by SPS PDSCH configurations e.g., explicit indicator, periodicity, PDSCH duration and/or by DCI activating the SPS PDSCH (for SPS PDSCH). In an example, the PHY identification of HARQ-ACK codebook may also be used to determine the priority of the HARQ-ACK codebook for collision handling.

In an example, when at least two HARQ-ACK codebooks are simultaneously constructed for supporting different service types for a UE, the PHY identification of HARQ-ACK codebook may also be used to determine the priority of the HARQ-ACK codebook for collision handling.

In an example, when at least two HARQ-ACK codebooks are simultaneously constructed for supporting different service/traffic types for a UE, one or more of the following may be used for identifying a HARQ-ACK codebook in case of SPS PDSCH: by SPS PDSCH configurations, by the DCI activating the SPS PDSCH, by the CORESET where the activating DCI is received.

In an example, a wireless device may support 2-level priority of HARQ-ACK for dynamically scheduled PDSCH and SPS PDSCH and ACK for SPS PDSCH release.

In an example, an explicit indication (e.g., an RRC parameter) in an SPS PDSCH configuration may provide mapping to corresponding HARQ-ACK codebook for SPS PDSCH and ACK for SPS PDSCH release.

In an example, a DCI indicating a DL SPS activation may overwrite the RRC configured indication.

In an example, the wireless device may expect that the DCI indicating the DL SPS activation indicates the same HARQ-ACK codebook as the RRC parameter in the SPS PDSCH configuration.

In an example, when at least two HARQ-ACK codebooks are simultaneously constructed for supporting different service/traffic types for a UE, PDSCH-HARQ-ACK-Codebook may be separately configured.

In an example, a wireless device may support up to two HARQ-ACK codebooks with different priorities to be simultaneously constructed, including the scenarios where one is slot-based, and one is sub-slot-based; both are slot-based, and both are sub-slot-based.

In an example, a sub-slot PUCCH resource may not be across sub-slot boundaries.

In an example, when a single PDSCH/PUSCH processing timeline is configured in the carrier, at least when only DCI format 0_1/1_1 is configured or only DCI format 0_2/1_2 is configured in UE specific search space (USS) per BWP, a DCI format (e.g., from the formats 0_1/1_1/0_2/1_2) may be used to schedule PDSCH with different HARQ-ACK priorities or PUSCH with different priorities.

In an example, a 1-bit field in DCI may be configured as the PHY identification of the priority.

In an example, to resolve collision between UL transmissions, a UE performs the following: resolve collision between UL transmissions with same priority; and resolve collision between UL transmissions with different priorities.

In an example, when a high-priority UL transmission overlaps with a low-priority UL transmission in a slot, the UE may be expected to cancel the low-priority UL transmission starting from $T_{proc,2}+d1$ after the end of PDCCH scheduling the high-priority transmission, where $T_{proc,2}$ is corresponding to UE processing time capability for the carrier; Value d1 is the time duration corresponding to 0,1,2 symbols reported by UE capability (d_2,1=0 may be for cancellation); the minimum processing time of the high priority channel may be extended by d2 symbols (value d2 may be the time duration corresponding to 0,1,2 symbols reported by UE capability). In an example, the overlapping condition may be per repetition of the uplink transmission.

In an example, when a high-priority UL transmission overlaps with a low-priority UL transmission in a slot, the UE may not be expected to be scheduled to transmit in the non-overlapping canceled symbols.

In an example, the UE may not be expected to be scheduled with two PUCCHs carrying HARQ-ACK with different priorities associated with two DG-PDSCHs scheduled on the same carrier overlapping in the time domain.

In an example, RRC parameter dl-DataToUL-ACK may support a value that may be signaled by PDSCH-to-HARQ-timing-indicator, which indicates that the UE needs to store the HARQ A/N feedback result for the corresponding PDSCH, and which may not provide any timing for the transmission of this HARQ A/N feedback result.

In an example, for enabling multiple opportunities for HARQ A/N transmission and for cross-COT HARQ-ACK feedback, the gNB may request/trigger feedback for PDSCH from earlier COT(s) or additional reporting of earlier HARQ feedback, where the exact HARQ feedback timing and resource may be provided to the UE in another DCI (in the same or in another COT).

In an example, scheduling PUSCH over multiple slots/mini-slots by single DCI may support at least multiple continuous PUSCHs with separate TBs. A TB may be mapped to at most one slot or one mini-slot.

In an example, a non-numerical value may be added to the possible range of PDSCH-to-HARQ-timing-indicator values and may be used to indicate to the UE that the HARQ-ACK feedback for the corresponding PDSCH is postponed until the timing and resource for the HARQ-ACK feedback is provided by the gNB.

In an example, PDSCH grouping by explicitly signaling a group index in DCI scheduling the PDSCH may be used for dynamic HARQ codebook. The gNB may request HARQ-ACK feedback in the same PUCCH for PDSCHs in the same group. In an example, one PUCCH may carry HARQ-ACK feedback for one or more PDSCH groups. The DCI may request HARQ-ACK feedback for one or more PDSCH groups. In an example, C-DAI/T-DAI may be accumulated across multiple PDSCH groups for which feedback is requested in the same PUCCH. In an example, C-DAI/T-DAI may be accumulated only within one PDSCH group. In an example, a ACK-Feedback Group Indicator for each PDSCH Group may be used. In an example, the number of HARQ-ACK bits for one PDSCH group may be constant between a first HARQ-ACK feedback transmission and a HARQ-ACK feedback re-transmission (e.g., the PDSCH group may not be enlarged after the first feedback transmission).

In an example, for operation with dynamic HARQ codebook (type-2 codebook): PDSCH grouping may be by explicitly signaling a group index in DCI scheduling the PDSCH; the number of HARQ-ACK bits for one PDSCH group may change between successive requests for HARQ-ACK feedback for the same PDSCH group; HARQ-ACK feedback for PDSCHs in the same group may be carried in the same PUCCH; one DCI may request HARQ-ACK feedback for one or more PDSCH groups in the same PUCCH; C-DAI/T-DAI may be accumulated only within each PDSCH group; a new ACK-Feedback Group Indicator for each PDSCH Group operates as a toggle bit.

In an example, when configured for operation with enhanced dynamic HARQ codebook (e.g., type-2 codebook), a UE may support 2 PDSCH groups.

In an example, for enhanced dynamic HARQ codebook, NFI and T-DAI are indicated in non-fallback DCI scheduling PDSCH only for the scheduled group.

In an example, for enhanced dynamic HARQ codebook, NFI and T-DAI are indicated in non-fallback DCI scheduling PDSCH for both groups.

In an example, for enhanced dynamic HARQ-ACK codebook when the feedback is triggered by a DL DCI scheduling a PDSCH, a UE may not be expected to be requested in that DL DCI to provide feedback only for a PDSCH group not scheduled in that DL DCI.

In an example, for enhanced dynamic codebook operation, HARQ-ACK timing for a PDSCH scheduled with a non-numerical value for K1 may be derived by the next DL DCI scheduling PDSCH with a numerical value for K1 triggering feedback for PDSCH group(s) including the PDSCH group of this PDSCH.

In an example, for enhanced dynamic HARQ codebook with single or multiple configured DL cells, NFI may be indicated in non-fallback DCI scheduling PDSCH for the scheduled group. T-DAI may be indicated in non-fallback DCI scheduling PDSCH for the scheduled group if more than one DL cell is configured. Indication of NFI and T-DAI in non-fallback DCI for the non-scheduled group with single or multiple configured DL cells may be configured by RRC.

In an example, if the DCI is received that toggles the NFI for a PDSCH group, then the UE may discard the HARQ-ACK feedback for the PDSCH(s) in that PDSCH group including the PDSCH(s) that were associated with a non-numerical K1 value. The UE may expect the DAI values for the PDSCH group to be reset.

In an example, if enhanced dynamic codebook is configured, for a PDSCH scheduled by DL DCI 1_0: the UE may report HARQ-ACK feedback for the corresponding PDSCH as part of the PDSCH group #0. The fallback DCI may not support signaling a non-numerical value of K1.

In an example, a wireless device may support requesting feedback of a HARQ-ACK codebook containing DL HARQ processes (one-shot feedback) for CCs configured for a UE in the PUCCH group.

In an example, the last PDSCH for which A/N decoding result is reported in the HARQ-ACK codebook containing DL HARQ processes (one-shot feedback) is determined as the last PDSCH within the UE Ni processing time capability. In an example, a UE may report HARQ-ACK feedback for earlier PDSCHs scheduled with non-numerical K1.

In an example, if a UE is configured to monitor feedback request of a HARQ-ACK codebook containing DL HARQ processes (e.g., one-shot feedback), the feedback may be requested in a UE-specific DCI. The feedback may be requested for reporting in PUCCH. The feedback may be piggybacked on PUSCH.

In an example, the presence of UL DAI for an additional PDSCH group in the non-fallback DCI may be configured by RRC signaling.

In an example, when more than one PDSCH group exists in a HARQ-ACK feedback report, the placement of HARQ-ACK feedback for the two groups may be ordered based on increasing group index.

In an example, the number of requested groups is indicated in DCI 1_1 by one bit, indicating "0" for only the scheduled group, and "1" for both groups.

In an example, C-DAI and T-DAI may be accumulated within a PDSCH group until NFI for the PDSCH group is toggled. The C-DAI and T-DAI may be reset when the NFI is toggled. C-DAI and T-DAI may not be reset by PUCCH transmission occasions.

In an example, for a PDSCH scheduled by DL DCI 1_0: NFI for group #0 may not be signaled in DCI 1_0; if the UE detects a DCI that indicates an NFI corresponding to group #0 since the last scheduled PUCCH that includes feedback for group #0 and before the PUCCH occasion that includes feedback corresponding to PDSCH scheduled with the DCI 1_0, the UE may follow the indicated NFI (in DCI 1_1) to determine the codebook; if the UE does not detect a DCI that indicates an NFI corresponding to group #0 since the last scheduled PUCCH that includes feedback for group #0 and before the PUCCH occasion that includes feedback corresponding to PDSCH scheduled with the DCI 1_0, the UE may assume that the PDSCHs scheduled by DCI 1_0 since the latest PUCCH occasion do not belong to any group, and the UE may only report HARQ-ACK feedback for the PDSCHs scheduled by DCI 1_0 since the latest PUCCH occasion. If the C-DAI received in the first DCI format 1_0 received after the latest PUCCH occasion is not equal to 1, and if the UE did not detect a DCI format 1_1 since the latest PUCCH occasion, the UE may assume that missed DCIs are DCI formats 1_0.

In an example, if UL DAI is configured to be present in the non-fallback DCI for two groups, these UL DAI fields may apply separately to each group.

In an example, if UL DAI is configured to be present in the non-fallback DCI for only one group, then for a dynamic HARQ-ACK codebook feedback in PUSCH: if feedback is requested for just one group, then this UL DAI may apply to the reported group. If feedback is requested for both groups, the UL DAI may apply to group #0 and the may UE derive the DAI for group #1 by the latest DCI scheduling PDSCH reception for group #1 for this HARQ feedback occasion.

In an example, the HARQ-ACK timing for PDSCH scheduled with non-numerical value for K1 may be derived by the next DCI scheduling PDSCH with a numerical K1 value. The C-DAI may account for the PDSCHs allocated with a non-numerical K1 value.

Figure 19:
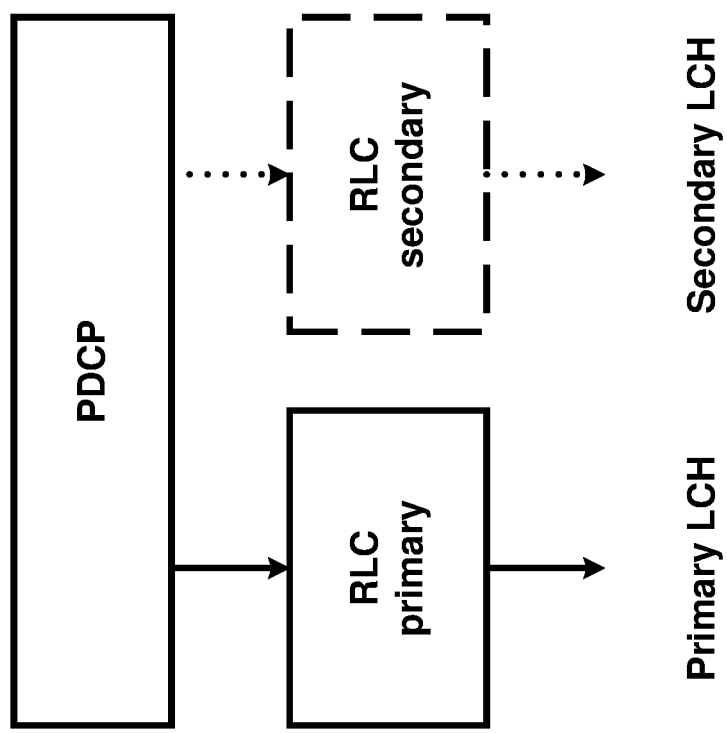
FIG. 19 shows example PDCP duplication in accordance with several of various embodiments of the present disclosure.

In an example, when duplication is configured for a radio bearer by RRC, a secondary RLC entity may be added to the radio bearer to handle the duplicated PDCP PDUs as shown in FIG. 19, where the logical channel corresponding to the primary RLC entity may be referred to as the primary logical channel, and the logical channel corresponding to the secondary RLC entity, the secondary logical channel. The two RLC entities may have the same RLC mode. Duplication at PDCP may comprise submitting the same PDCP PDUs twice: once to the primary RLC entity and a second time to the secondary RLC entity. With two independent transmission paths, packet duplication may increase reliability and may reduce latency and may be beneficial for URLLC services.

In an example, when configuring duplication for a DRB, RRC may set the initial state (either activated or deactivated). After the configuration, the state may be dynamically controlled by means of a MAC control element and in DC, the UE may apply the MAC CE commands regardless of their origin (MCG or SCG). When duplication is configured for an SRB the state may be always active and may not be dynamically controlled.

In an example, when activating duplication for a DRB, NG-RAN may ensure that at least one serving cell is activated for each logical channel of the DRB; and when the deactivation of SCells leaves no serving cells activated for a logical channel of the DRB, NG-RAN may ensure that duplication is also deactivated.

In an example, when duplication is activated, the original PDCP PDU and the corresponding duplicate may not be transmitted on the same carrier. The primary and secondary logical channels may belong to the same MAC entity (e.g., referred to as CA duplication) or to different ones (referred to as DC duplication). In CA duplication, logical channel mapping restrictions may be used in MAC to ensure that the primary and secondary logical channels are not sent on the same carrier. When CA duplication is configured for an SRB, one of the logical channels associated to the SRB may be mapped to SpCell.

In an example, when duplication is deactivated for a DRB, the secondary RLC entity may not be re-established, the HARQ buffers may not be flushed, and the transmitting PDCP entity may indicate to the secondary RLC entity to discard duplicated PDCP PDUs. In case of CA duplication, the logical channel mapping restrictions of the primary and secondary logical channels ay be lifted for as long as duplication remains deactivated.

In an example, when an RLC entity acknowledges the transmission of a PDCP PDU, the PDCP entity may indicate to the other RLC entity to discard it. In case of CA duplication, when an RLC entity restricted to only SCell(s) reaches the maximum number of retransmissions for a PDCP PDU, the UE may inform the gNB but may not trigger RLF.

In an example, an IE PDCP-Config may comprise PDCP configuration parameters of data and signaling radio bearers. The PDCP configuration parameters may comprise a parameter pdcp-Duplication that may indicate whether uplink duplication status at the time of receiving this IE is configured and activated. The presence of this field/IE may indicate that duplication is configured. PDCP duplication may not be configured for CA packet duplication of LTE RLC bearer. The value of this field/IE, when the field/IE is present, may indicate the initial state of the duplication. If set to true, duplication may be activated. The value of this field/IE may always be true, when configured for a SRB.

In an example, if one or more DRB s are configured with PDCP duplication, the network may activate and deactivate the PDCP duplication for the configured DRB(s).

In an example, the PDCP duplication for the configured DRB(s) may be activated and deactivated by: receiving the Duplication Activation/Deactivation MAC CE; indication by RRC.

In an example, for a DRB configured with PDCP duplication: if a Duplication Activation/Deactivation MAC CE is received activating the PDCP duplication of the DRB, the MAC entity may indicate the activation of PDCP duplication of the DRB to upper layers. In an example, if a Duplication Activation/Deactivation MAC CE is received deactivating the PDCP duplication of the DRB, the MAC entity may indicate the deactivation of PDCP duplication of the DRB to upper layers.

In an example, PDCP duplication may support a configuration delivering up to M (e.g., 4) copies. For example, up to M RLC entities/legs per bearer may be possible to configure by RRC for PDCP duplication. The NW may dynamically control (MAC CE or similar) how a set or subset of configured RLC entities or legs may be used by the UE for PDCP duplication. In an example, for PDCP duplication, RLC entities for an RB may be configured using the same RLC mode. The copies may be sent on different legs. The dynamic Network control of DRB duplication may be by MAC CE. In an example, by using the MAC CE, the network may control which of the configured RLC entities is/are active. In an example, a case with no of active RLC entities may be supported. The number of copies generated may be equal to the number of active RLC entities, e.g., one copy per leg/RLC entity, and active/inactive state may be determined by MAC CE. The network may provide in RRC a logical channel cell restriction configuration per logical channel. The changes to logical channel cell restriction configuration may be via RRC. In an example, the MAC CE signaling structure may be per DRB signaling with the activation status of the associated RLC entities. In an example, the MAC CE signaling structure may be for all DRB s with the activation status of the associated RLC entities for each DRB. In an example, the primary path may not be deactivated for data PDUs. For PDCP duplication controlling MAC CE format, per DRB signaling with the activation status of the associated RLC entities may be used. The initial state for a leg may be configured by RRC. When multiple RLC entities are configured for the DRB, and PDCP duplication may be deactivated (e.g., less than 2 RLC entities may be activated for duplication), fallback to Split bearer operation may be supported in Dual Connectivity (2 RLC entities belonging to different cell groups). For fallback to split bearer operation, a pointer to the secondary RLC entity may be introduced in RRC to identify which of the multiple configured RLC entities may be used.

In an example, a PDCP entity may have one primary path.

In an example, the IE LogicalChannelConfig may be used to configure the logical channel parameters. In an example, a parameter allowedSCS-List may indicate that UL MAC SDUs from this logical channel can be mapped to the indicated numerology. Otherwise, UL MAC SDUs from this logical channel may be mapped to any configured numerology. In an example, a parameter allowedServingCells may indicate that UL MAC SDUs from this logical channel can only be mapped to the serving cells indicated in this list. Otherwise, UL MAC SDUs from this logical channel may be mapped to any configured serving cell of this cell group. In an example, a parameter configuredGrantType1Allowed may indicate that UL MAC SDUs from this logical channel can be transmitted on a configured grant type 1. In an example, a parameter logicalChannelGroup may indicate ID of the logical channel group. In an example, a parameter maxPUSCH-Duration may indicate that UL MAC SDUs from this logical channel may be transmitted using uplink grants that result in a PUSCH duration shorter than or equal to the duration indicated by this field. Otherwise, UL MAC SDUs from this logical channel can be transmitted using an uplink grant resulting in any PUSCH duration. In an example, a parameter priority may indicate a logical channel priority. In an example, a parameter schedulingRequestId may indicate the scheduling request configuration applicable for the logical channel.

In an example, an IE LogicalChannendentity may be used to identify a logical channel (LogicalChannelConfig) and the corresponding RLC bearer (e.g., RLC-BearerConfig).

In an example, if a UE is provided DownlinkPreemption, the UE may be configured with an INT-RNTI provided by int-RNTI for monitoring PDCCH conveying DCI format 2_1. The UE may be additionally configured with a set of serving cells by int-ConfigurationPerServingCell that includes a set of serving cell indexes provided by corresponding servingCellId and a corresponding set of locations for fields in DCI format 2_1 by positionInDCI; an information payload size for DCI format 2_1 by dci-PayloadSize; and an indication granularity for time-frequency resources by timeFrequencySet.

In an example, if a UE detects a DCI format 2_1 for a serving cell from the configured set of serving cells, the UE may assume that no transmission to the UE is present in PRBs and in symbols that are indicated by the DCI format 2_1, from a set of PRBs and a set of symbols of the last monitoring period. The indication by the DCI format 2_1 may not be applicable to receptions of SS/PBCH blocks.

In an example, the set of PRBs may be equal to the active DL BWP and may include B INT PRBs.

In an example, if a UE detects a DCI format 2_1 in a PDCCH transmitted in a CORESET in a slot, the set of symbols is the last $N_{symb}^{slot} \cdot T_{INT} \cdot 2^{\mu-\mu_{INT}}$ symbols prior to the first symbol of the CORESET in the slot where $T_{INT}$ is the PDCCH monitoring periodicity provided by the value of monitoringSlotPeriodicityAndOffset, $N_{symb}^{slot}$ is the number of symbols per slot, $\mu$ is the SCS configuration for a serving cell with mapping to a respective field in the DCI format 2_1, $\mu_{INT}$ is the SCS configuration of the DL BWP where the UE receives the PDCCH with the DCI format 2_1. If the UE is provided tdd-UL-DL-ConfigurationCommon, symbols indicated as uplink by tdd-UL-DL-ConfigurationCommon may be excluded from the last $N_{symb}^{slot} \cdot T_{INT} \cdot 2^{\mu-\mu_{INT}}$ symbols prior to the first symbol of the CORESET in the slot. The resulting set of symbols may include a number of symbols that is denoted as $N_{INT}$.

In an example, the UE may not expect to be provided values of $\mu$, $\mu_{INT}$, and $T_{INT}$ resulting to a value of $N_{symb}^{slot} \cdot T_{INT} \cdot 2^{\mu-\mu_{INT}}$ that is not an integer. The UE may not expect to be configured by monitoringSymbolsWithinSlot with more than one PDCCH monitoring occasion for DCI format 2_1 in a slot.

In an example, a UE may be provided the indication granularity for the set of PRBs and for the set of symbols by timeFrequencySet.

In an example, if the value of timeFrequencySet is 0, 14 bits of a field in DCI format 2_1 may have a one-to-one mapping with 14 groups of consecutive symbols from the set of symbols where each of the first $N_{INT}-\lfloor N_{INT}/14 \rfloor \cdot 14$ symbol groups may include $\lceil N_{INT}/14 \rceil$ symbols, each of the last $14-N_{INT}+\lfloor N_{INT}/14 \rfloor$ 14 symbol groups may include $\lfloor N_{INT}/14 \rfloor$ symbols, a bit value of 0 may indicate transmission to the UE in the corresponding symbol group and a bit value of 1 may indicate no transmission to the UE in the corresponding symbol group.

In an example, if the value of timeFrequencySet is 1, 7 pairs of bits of a field in the DCI format 2_1 may have a one-to-one mapping with 7 groups of consecutive symbols where each of the first $N_{INT}-\lfloor N_{INT}/7 \rfloor \cdot 7$ symbol groups may include $\lceil N_{INT}/7 \rceil$ symbols, each of the last $7-N_{INT}+\lfloor N_{INT}/7 \rfloor$ 7 symbol groups may include $\lfloor N_{INT}/7 \rfloor$ symbols, a first bit in a pair of bits for a symbol group may be applicable to the subset of first $\lceil B_{INT}/2 \rceil$ PRBs from the set of B INT PRBs, a second bit in the pair of bits for the symbol group may be applicable to the subset of last $\lfloor B_{INT}/2 \rfloor$ PRBs from the set of B INT PRBs, a bit value of 0 may indicate transmission to the UE in the corresponding symbol group and subset of PRBs, and a bit value of 1 may indicate no transmission to the UE in the corresponding symbol group and subset of PRBs.

In an example, DCI format 2_1 may be used for notifying the PRB(s) and OFDM symbol(s) where UE may assume no transmission is intended for the UE.

In an example, the following information may be transmitted by means of the DCI format 2_1 with CRC scrambled by INT-RNTI: Pre-emption indication 1, Pre-emption indication 2, . . . , Pre-emption indication N. In an example, a size of DCI format 2_1 may be configurable by higher layers up to 126 bits. In an example, a pre-emption indication may be 14 bits.

In an example, PDCCH may be used for UL cancelation indication. Upon detecting an UL cancelation indication, a wireless device may stop the UL transmission without resuming.

In an example, the UL cancellation may be UE-specific. When applicable, a UE may be configured to monitor a second UL grant for the same TB as an earlier PUSCH indicating UL cancellation before the end of the earlier PUSCH transmission. In this case, the UE may follow the UL cancellation indication.

In an example, the UL cancellation may be group common DCI. The UE may be configured to monitor a group common DCI which may indicate the time/frequency region on which the UL cancellation indication applies.

In an example, monitoring periodicity for UL cancellation indication may be symbol-level or slot-level.

In an example, one or more the following UL channel/signals may be cancelled by UL cancelation indication: PUSCH (including DG-, CG- and SP-); SRS; PUCCH and PRACH.

In an example, for UL transmissions with and without associated PDCCH, UE may start monitoring UL CI at least at the latest monitoring occasion ending no later than X symbols before the start of the UL transmission, and X may be related to UL CI processing time.

In an example, a UE may stop monitoring UL CI from X symbols before the end of relevant UL transmission, and X is related to UL CI processing time.

In an example, SRS may be cancelled by UL CI. PUCCH may not be cancelled by UL CI. RACH related UL transmissions may not be cancelled by UL CI, including MSG 1/3 in case of 4-step RACH, MSG A in case of 2-step RACH.

In an example, in case of PUSCH repetitions, UL CI may be applied to each repetition individually that overlaps with the resource (in time and frequency) indicated by UL CI.

In an example, the reference time region where a detected UL CI is applicable may be determined by the following: The reference time region may start from X symbols after the ending symbol of the PDCCH CORESET carrying the UL CI, where X may be at least equal to the minimum processing time for UL cancelation. In an example, X may be configured to be larger than the minimum processing time for UL cancelation. The duration of the reference time region may be configured by RRC. In an example, DL symbols may be excluded from the reference time region.

In an example, the reference frequency region where a detected UL CI is applicable may be configured by RRC.

In an example, an UL cancelation indicator per serving cell may have an RRC configurable field size of X bits. For example, a value of X may be 14.

In an example, the time domain granularity for the reference time region may be configured by RRC.

In an example, the frequency domain granularity may be determined based on the configured time domain granularity and the configured bit field size of each indicator.

In an example, the time and frequency resource for cancellation may be jointly indicated by a 2D-bitmap (e.g., similar as DL PI) over the time and frequency partitions within the reference region.

In an example, the frequency region for UL CI may be derived by the following: A RIV indication configured by RRC; a reference SCS (no RRC configuration) for a serving cell (to handle the case where a UE is configured with multiple BWPs using different SCSs on the serving cell). The wireless device may use the SCS for the DL BWP carrying UL CI as the reference SCS.

In an example, the following parameters may be configured per serving cell: CI-PayloadSize; timedurationforCI; timeGranularityforCI; and frequencyRegionforCI.

In an example, if a serving cell is configured with SUL, an UL carrier (SUL and non-SUL) may be configured with different positionInDCI.

In an example, the DL symbols indicated by tdd-UL-DL-ConfigurationCommon may be excluded from the reference time region for UL CI. The partition of reference time region may be done after excluding the DL symbols. The symbols used for SSB may also be excluded.

In an example, a 2D-bitmap may be use X bits for bitmap indication over a time/frequency region with M partitions in time and N partitions in frequency, and $X = M \times N$ In an example, for configured grant resource configuration in time domain, a bitmap-based approach may be used.

In an example, configured grant uplink control information (CG-UCI) may include one or more of the following information: HARQ ID, NDI, RV, COT sharing information, and UE ID.

In an example, for PUSCH transmitted using CG, a wireless device may perform CBG-based retransmission at least by using dedicated scheduled resource allocated by an UL grant. In an example, a wireless device may perform CBG-based retransmission using a configured grant.

In an example, for initial transmission on a configured grant resource, a wireless device may perform HARQ retransmission on configured grant resource upon configured grant timer expiration (e.g., assuming NACK if no ACK is received).

In example, when a UE initiates a channel occupancy with a transmission using a configured grant, the UE may signal the duration that the gNB may be allowed to transmit in the channel occupancy initiated by the UE.

In an example, a UE may start transmissions accessing transmission opportunities provided by a configured grant at the configured/indicated starting position.

In an example, one or more CG-UCIs may be multiplexed in a PUSCH transmitted using a configured grant resource. In an example, CG-UCI may be included in every CG-PUSCH transmission.

In an example, CG-UCI, CSI-part1, CSI-part 2 may be sent on CG-PUSCH at least when CG-UCI and HARQ-ACK feedback is not multiplexed on a CG-PUSCH.

In an example, for UE initiated COT sharing indication, when ED threshold is configured, the CAPC value may be indicated in CG-UCI.

In an example, RRC configuration may be provided to the UE indicating whether to multiplex CG-UCI and HARQ-ACK. When configured for such multiplexing: in the case of PUCCH overlapping with CG-PUSCH(s) within a PUCCH group, the CG-UCI and HARQ-ACK may be jointly encoded (e.g., CG-UCI may be treated as the same type as a HARQ-ACK). When not configured for such multiplexing: in the case of PUCCH overlapping with CG-PUSCH(s) within a PUCCH group and PUCCH carries HARQ ACK feedback, configured grant PUSCH may be skipped.

Example embodiments may operate considering different types of traffic/service types including enhanced mobile broadband (eMBB) traffic/service type and ultra-reliable low-latency communications (URLLC) traffic/service types. The eMBB traffic/service type may be related to high data rate applications where latency and reliability requirements may not be as strict as the data rate requirements. The URLLC applications may have strict requirements on latency and reliability and may require comparatively lower data rates than the eMBB traffic/service type.

Various PHY and MAC procedures are used to enable URLLC traffic/service type in a wireless communications system. A wireless device may be configured to transmit/receive URLLC traffic over cells in unlicensed spectrum or shared spectrum or a controlled unlicensed environment. Existing PHY and MAC processes for URLLC traffic/service may lead to inefficiency or degradation in wireless device and network performance or may not achieve the strict reliability and latency requirements in URLLC. There is a need to enhance the existing PHY and MAC procedures to enable URLLC traffic/service type in unlicensed spectrum or shared spectrum or a controlled unlicensed environment. Example embodiments enhance the existing PHY and MAC procedures to enable URLLC traffic/service type in unlicensed spectrum or shared spectrum or a controlled unlicensed environment.

In an example, a wireless device may receive one or more messages comprising configuration parameters. The one or more messages may comprise one or more RRC messages. The one or more messages may comprise configuration parameters of one or more cells. The one or more cells may comprise a primary cell. In an example, the one or more cells may comprise a primary cell and one or more secondary cells. In an example, a cell in the one or more cells may be an unlicensed cell. In an example, a cell in the one or more cells may be a licensed assisted access (LAA) cell. An LAA cell may be aggregated, e.g., using carrier aggregation, with at least one licensed cell. A licensed cell may carry control information (e.g., uplink control information) associated with the LAA cell. In an example, a cell in the one or more cells may be a shared licensed spectrum cell, wherein a license for operation on the cell may be available to a plurality of service providers. In an example, a cell in the one or more cells may be an unlicensed cell that operates in a controlled environment. The level of interference for unlicensed cells operating in controlled environments may be limited and/or controlled. For example, in a controlled environment, devices operating on the unlicensed band may be installed by a facility owner and unexpected interference from other systems and/or radio access technology may sporadically happen.

In an example, a wireless device may receive configuration parameters of a plurality of logical channels. The plurality of logical channels may be associated with one or more service/traffic types. In an example, logical channel configuration parameters of a first logical channel in the plurality of logical channels may comprise a first parameter indicating a first traffic/service type and/or a first priority. The first priority may be used for collision handling between a first uplink channel/signal and a second uplink channel/signal wherein the first uplink channel/signal may be associated with the first logical channel/priority and the second uplink channel/signal may be associated with a second logical channel/priority. The wireless device may drop one of the first uplink channel/signal or the second uplink channel/signal based on the first priority and the second priority.

In an example, a wireless device may perform a listen before talk procedure (LBT) before transmission of an uplink signal/channel. The listen before talk procedure may be based on one or more parameters. The one or more parameters may indicate/comprise a contention window (CW) size, a channel access priority class, a duration of listen-before-talk, etc. (see, for example, FIG. 16). In an example, the one or more LBT parameters may be based on a priority associated with the uplink signal/channel. For example, first LBT parameters used for transmission of a first uplink channel/signal associated with a first priority may lead to a higher probability of channel access than second LBT parameters used for transmission of a second uplink channel/signal associated with a second priority if the second priority is higher than the first priority.

In an example, a wireless device may transmit a HARQ feedback codebook comprising HARQ feedback (ACK/NACK) corresponding to one or more downlink transmissions (e.g., corresponding to one or more downlink transport blocks) or corresponding to one or more downlink control information indicating SPS release for one or more SPS configurations via an uplink channel (e.g., via an uplink control channel). The HARQ feedback codebook may correspond to a traffic/service type. The HARQ feedback codebook may correspond to the traffic/service type based on the one or more downlink transmissions or the one or more downlink control information indicating SPS release corresponding to a traffic/service type and/or priority. In an example, one or more first downlink control information indicating downlink assignments for the one or more downlink transport blocks or the one or more downlink control information indicating SPS release for the one or more SPS configurations may indicate the priority. In an example, a field in a DCI of the one or more first downlink control information indicating the downlink assignments or a DCI in the one or more downlink control information indicating the SPS release may indicate the priority.

The wireless device may transmit the HARQ feedback codebook via an uplink control channel. In an example, the wireless device may determine a subslot for transmission of the HARQ feedback codebook. The wireless device may determine the subslot based on the one or more first downlink control information (indicating the downlink assignments for the one or more transport blocks) or the one or more downlink control information (indicating SPS release). For example, a field in a DCI indicating downlink assignment (e.g., a PDSCH to HARQ feedback timing) or a field of a DCI indicating SPS release may indicate the timing of the HARQ feedback. The wireless device may determine the subslot based on a numerology of an uplink control channel. The subslot may comprise one or more symbols associated with the numerology of the uplink channel. In an example, a number of the one or more symbols in a subslot may be configured for the wireless device. The RRC configuration parameters may indicate the number of the one or more symbols.

Figure 20:
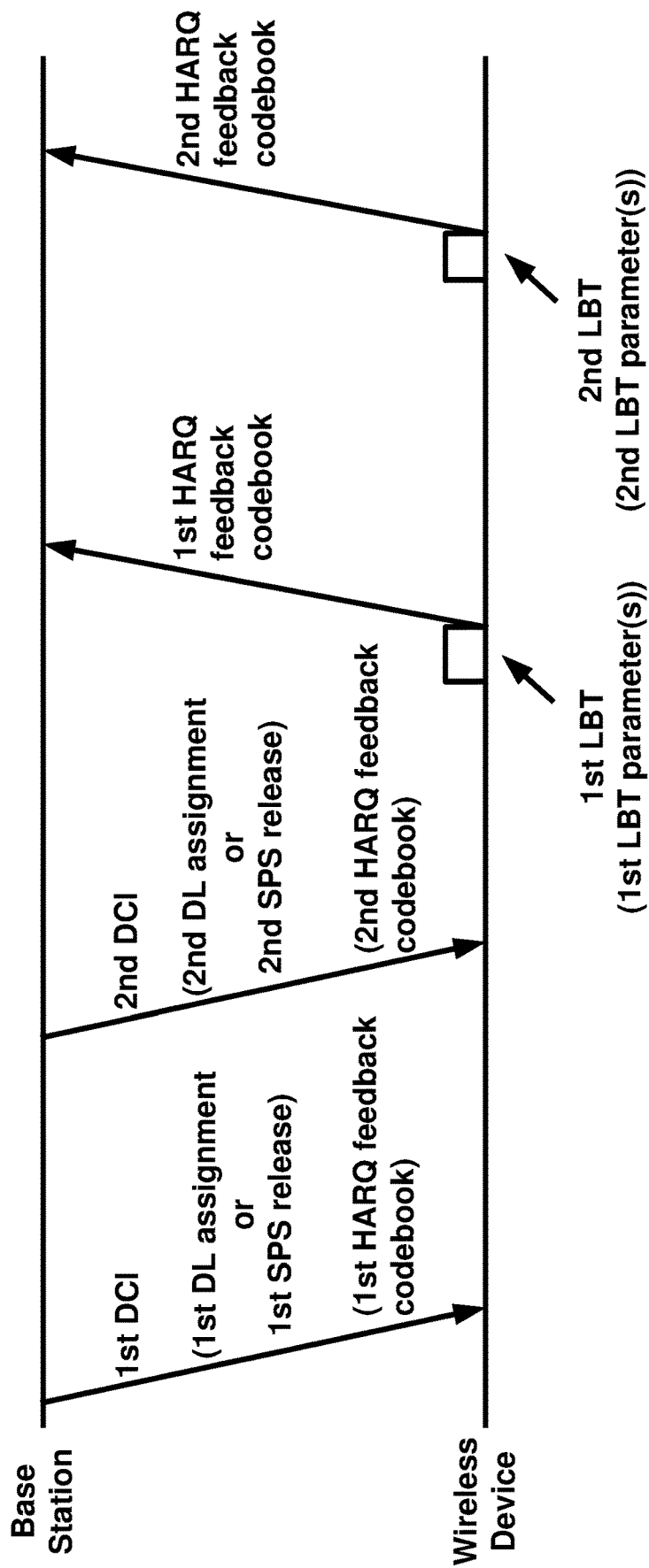
FIG. 20 shows example HARQ feedback transmission in accordance with several of various embodiments of the present disclosure.
Figure 21:
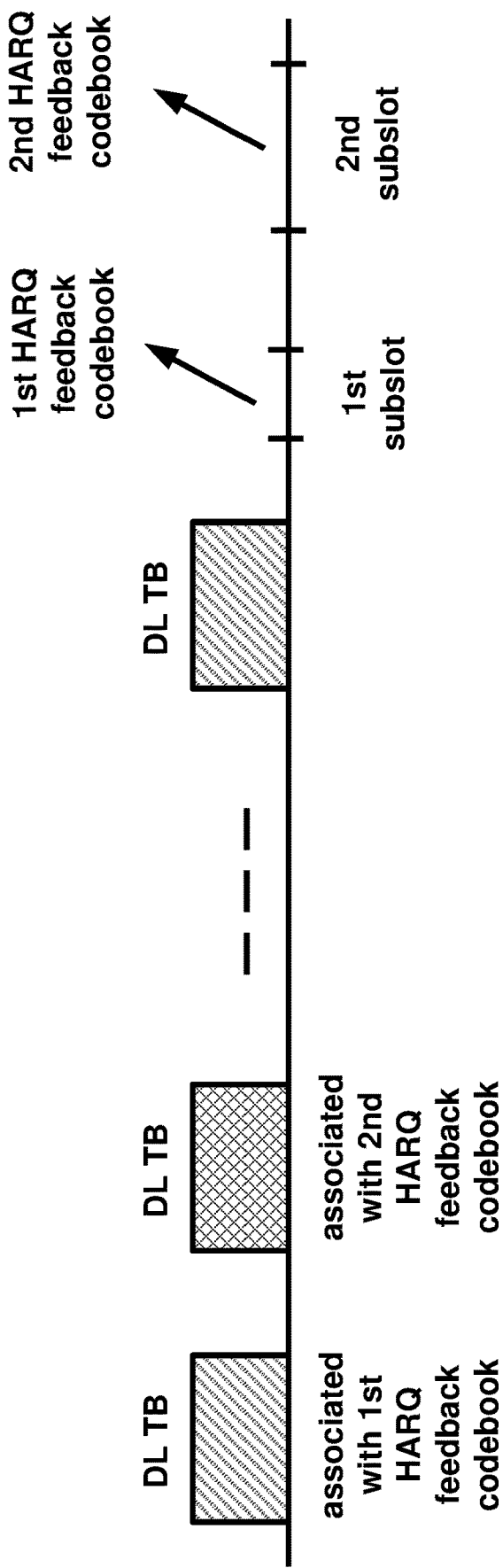
FIG. 21 shows example HARQ feedback transmission in accordance with several of various embodiments of the present disclosure.

In an example embodiment as shown in FIG. 20, a wireless device may determine one or more first LBT parameters for transmission of a first HARQ feedback codebook. The first HARQ feedback codebook may be associated with a first traffic/service type and/or a first priority. In an example as shown in FIG. 21, the first HARQ feedback codebook may comprise HARQ feedback for one or more first downlink transport blocks wherein the one or more first downlink transport blocks are associated with the first priority and/or first traffic/service type. For example, a field of a first DCI indicating a first downlink assignment for a first downlink transport block, of the one or more first downlink transport blocks, may indicate the first traffic/service type and/or priority. For example, the first DCI may comprise a field, a value of the field indicating the first traffic/service type and/or priority. In an example, the first HARQ feedback codebook may comprise HARQ feedback associated with one or more first SPS release, wherein the one or more first SPS release are associated with the first priority and/or service/traffic type. For example, the parameters of the SPS configurations of the one or more first SPS may indicate the first priority and/or traffic/service type. For example, a DCI indicating SPS release for a SPS configuration in the one or more first SPS configurations, may indicate the first traffic/service type and/or priority. The wireless device may determine the one or more first LBT parameters based on the first traffic/service type and/or the first priority associated with the first HARQ feedback codebook. The one or more first LBT parameters may comprise a first CW size, a first channel access priority class, etc. In an example, the one or more first LBT parameters may indicate no LBT based on a traffic/service type and/or priority of the first HARQ feedback codebook.

The wireless may determine one or more second LBT parameters for transmission of a second HARQ feedback codebook. The second HARQ feedback codebook may be associated with a second traffic/service type and/or a second priority. In an example as shown in FIG. 21, the second HARQ feedback codebook may comprise HARQ feedback for one or more second downlink transport blocks wherein the one or more second downlink transport blocks are associated with the second priority and/or second traffic/service type. For example, a field of a second DCI indicating a second downlink assignment for a second downlink transport block, of the one or more second downlink transport blocks, may indicate the second traffic/service type and/or priority. For example, the second DCI may comprise a field, a value of the field indicating the second traffic/service type and/or priority. In an example, the second HARQ feedback codebook may comprise HARQ feedback associated with one or more second SPS release, wherein the one or more second SPS release are associated with the second priority and/or service/traffic type. For example, the parameters of the SPS configurations of the one or more second SPS may indicate the second priority and/or traffic/service type. For example, a DCI indicating SPS release for a SPS configuration in the one or more second SPS configurations, may indicate the second traffic/service type and/or priority. The wireless device may determine the one or more second LBT parameters based on the second traffic/service type and/or the second priority associated with the second HARQ feedback codebook. The one or more second LBT parameters may comprise a second CW size, a second channel access priority class, etc. In an example, the one or more second LBT parameters may indicate no LBT based on a traffic/service type and/or priority of the second HARQ feedback codebook.

In an example, the association between one or more LBT parameters for an uplink transmission (e.g., uplink transmission of an uplink channel/signal) and a priority and/or service/traffic type associated with the uplink transmission may be semi-statically configured and/or dynamically indicated to the wireless device. For example, when the uplink transmission is a HARQ feedback codebook transmission via an uplink control channel, a priority and/or traffic/service type associated with the HARQ feedback codebook may be configured by RRC and/or dynamically indicated (e.g., by DCI). For example, uplink control channel configuration parameters may indicate the one or more LBT parameters (or a first parameter indicating the one or more LBT parameters) for transmission of a HARQ feedback codebook associated with a priority and/or traffic/service type. In an example, the association between one or more LBT parameters for an uplink transmission (e.g., uplink transmission of an uplink channel/signal) and a priority and/or service/traffic type associated with the uplink transmission may be pre-configured. For example, when the uplink transmission is a HARQ feedback codebook transmission via an uplink control channel, a priority and/or traffic/service type associated with the HARQ feedback codebook may be pre-configured Based on the determining the one or more first LBT parameters for the first HARQ feedback codebook, the wireless device may perform a first LBT procedure, using the one or more first LBT parameters and may transmit the first HARQ feedback codebook based on the first LBT procedure indicating clear channel. In an example, the wireless device may transmit the first HARQ feedback codebook in a first subslot and via an uplink control channel. The wireless device may determine the first subslot based on a numerology of an uplink channel (e.g., the uplink channel via which the wireless device transmits the first HARQ feedback codebook, e.g., uplink control channel). For example, the configuration parameters may indicate a first number of one or more symbols (symbols associated with the numerology of uplink channel) of the first subset. The wireless device may determine the first subslot based on indications (e.g., PDSCH to HARQ feedback timing indications) in the one or more DCIs associated with the HARQ feedbacks (e.g., DCI(s) for downlink assignments and/or SPS release).

Based on the determining the one or more second LBT parameters for the second HARQ feedback codebook, the wireless device may perform a second LBT procedure, using the one or more second LBT parameters and may transmit the second HARQ feedback codebook based on the second LBT procedure indicating clear channel. In an example, the wireless device may transmit the second HARQ feedback codebook in a second subslot and via an uplink control channel. The wireless device may determine the second subslot based on a numerology of an uplink channel (e.g., the uplink channel via which the wireless device transmits the second HARQ feedback codebook, e.g., uplink control channel). For example, the configuration parameters may indicate a second number of one or more symbols (symbols associated with the numerology of uplink channel) of the second subset. The wireless device may determine the second subslot based on indications (e.g., PDSCH to HARQ feedback timing indications) in the one or more DCIs associated with the HARQ feedbacks (e.g., DCI(s) for downlink assignments and/or SPS release).

In an example embodiment, a wireless device may receive a first downlink control information comprising a first downlink assignment for a first downlink transport block. The first downlink transport block may be associated with a first HARQ feedback codebook and the first HARQ feedback codebook may correspond to a first traffic/service type and/or priority. For example, the first downlink control information may indicate the first traffic/service type and/or the first priority. The first downlink control information may further indicate a first subslot for transmission of the first HARQ feedback codebook. For example, the first downlink control information may comprise a field (e.g., PDSCH to HARQ feedback timing) field indicating the first subslot. For, example, the wireless device may determine the first subslot based on the value of the field and based on a numerology of an uplink control channel. The wireless device may receive a second downlink control information comprising a second downlink assignment for a second downlink transport block. The second downlink transport block may be associated with a second HARQ feedback codebook and the second HARQ feedback codebook may correspond to a second traffic/service type and/or priority. For example, the second downlink control information may indicate the second traffic/service type and/or the second priority. The second downlink control information may further indicate a second subslot for transmission of the second HARQ feedback codebook. For example, the second downlink control information may comprise a field (e.g., PDSCH to HARQ feedback timing) field indicating the second subslot. For, example, the wireless device may determine the second subslot based on the value of the field and based on a numerology of an uplink control channel. In an example, the first subslot for transmission of the first HARQ feedback codebook and the second subslot for transmission of the second HARQ feedback codebook may be in the same slot.

The wireless device may determine one or more first LBT parameters based on the first traffic/service type and/or priority associated with the first HARQ feedback codebook. For example, the one or more first LBT parameters may comprise a first channel access priority class, a first contention window size, etc. The one or more first LBT parameters may indicate a first LBT duration. The wireless device may determine one or more second LBT parameters based on the second traffic/service type and/or priority associated with the second HARQ feedback codebook. For example, the one or more second LBT parameters may comprise a second channel access priority class, a second contention window size, etc. The one or more second LBT parameters may indicate a second LBT duration.

In an example embodiment, a wireless device may receive a downlink control information. The downlink control information may indicate a downlink assignment for a transport block. The transport block may be associated with a HARQ feedback codebook. The HARQ feedback codebook may correspond to a traffic/service type and/or priority. The downlink control information may further indicate a subslot for transmission of the HARQ feedback codebook. For example, the downlink control information may comprise a field, a value of the field indicating a timing between the transport block (e.g., a PDSCH via which the transport block is received) and the HARQ feedback for the transport block. The wireless device may determine the subslot based on the timing indicated by the downlink control information and a symbol duration associated with a numerology of an uplink control channel. In an example, the downlink control information may indicate the HARQ feedback codebook and/or the traffic/service type and/or priority.

The wireless device may determine one or more LBT parameters based on the traffic/service type/priority. For example, the wireless device may determine the one or more LBT parameters to be one or more first parameters based on the traffic/service type and/or priority being a first traffic/service type and/or priority. The wireless device may determine the one or more LBT parameters to be one or more second parameters based on the traffic/service type and/or priority being a second traffic/service type and/or priority. A first LBT procedure based on the one or more first parameters may be looser than (e.g., lead to a higher probability of channel access) a second LBT procedure based on the one or more second parameters. For example, the first traffic/service type may be ultra-reliable low-latency communications (URLLC) traffic/service type and the second traffic/service type may be enhanced mobile broadband (eMBB) traffic/service type.

The wireless device may transmit the HARQ feedback codebook comprising a HARQ feedback for the downlink transport block. The wireless device may transmit the HARQ feedback codebook in the subslot based on an LBT procedure indicating clear channel. The wireless device may perform the LBT procedure based on the one or more LBT parameters.

In an example, the downlink control information may indicate activation of a downlink semi-persistent scheduling configuration. For example, the wireless device may validate the downlink control information as a validation DCI for activation of the semi-persistent scheduling. The wireless device may compare one or more fields of the downlink control information with one or more pre-defined values to validate the downlink control information as a validation DCI for activation of the semi-persistent scheduling configuration. The downlink assignment may be associated with the downlink semi-persistent scheduling. For example, the wireless device may determine the downlink assignment based on the configuration parameters of the downlink semi-persistent scheduling configuration. The wireless device may receive one or more messages comprising configuration parameters of the downlink semi-persistent scheduling configuration. For example, the configuration parameters of the downlink semi-persistent scheduling configuration may comprise a periodicity parameter, wherein the wireless device may determine the downlink assignment based on the periodicity parameter. The configuration parameters of the downlink semi-persistent scheduling configuration may comprise one or more first configuration parameters indicating the HARQ feedback codebook and/or the traffic/service type and/or the priority.

Figure 22:
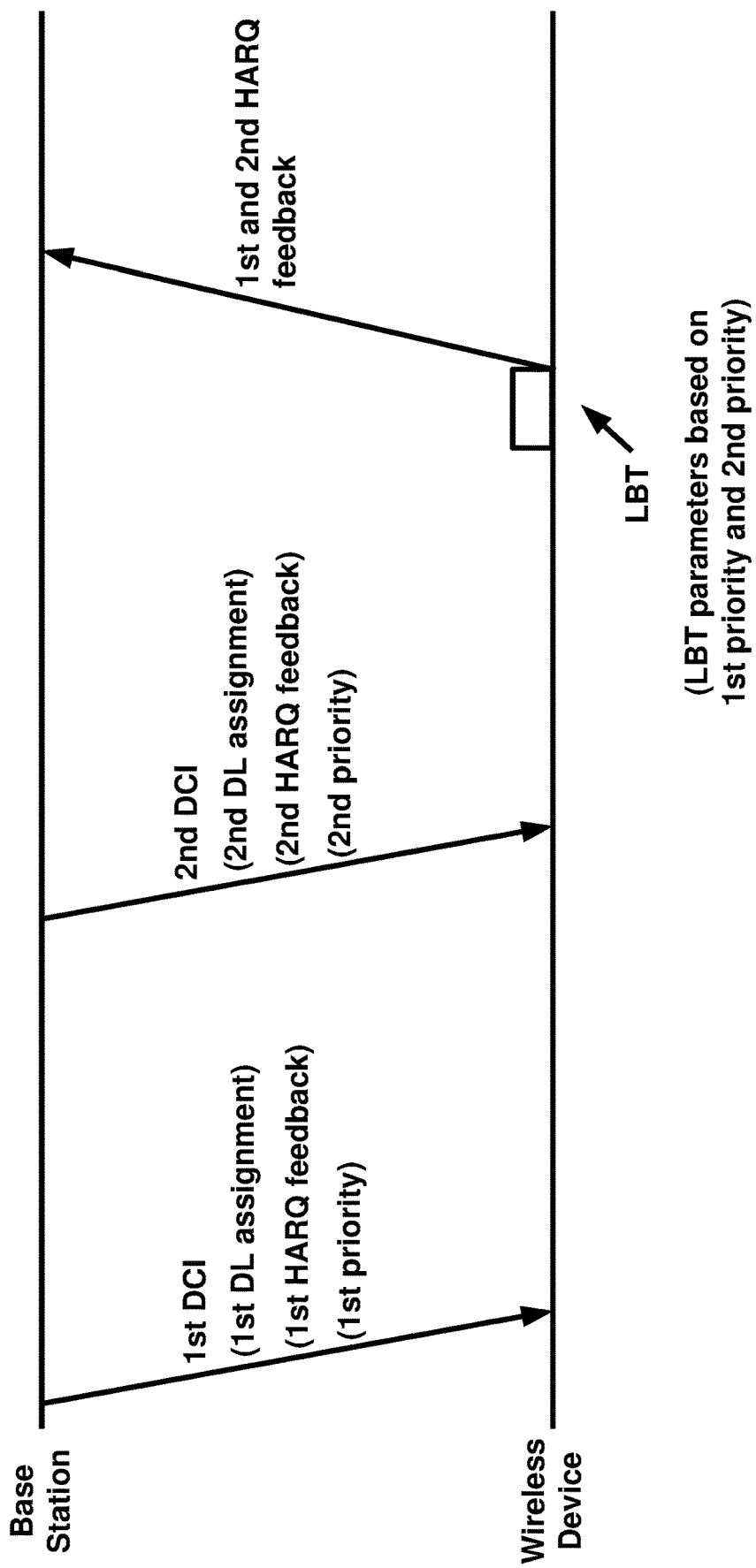
FIG. 22 shows example HARQ feedback transmission in accordance with several of various embodiments of the present disclosure.

In an example embodiment as shown in FIG. 22, a wireless device may receive a plurality of downlink control information comprising a plurality of downlink assignments for a plurality of downlink transport blocks. The plurality of downlink control information and/or the plurality of downlink transport blocks may correspond to a plurality of priorities (e.g., HARQ feedback priorities) and/or a plurality of traffic/service types. For example, a DCI in the plurality of DCIs may comprise a field, a value of the field indicating a priority and/or traffic/service type corresponding to the downlink transport block scheduled by the DCI. In an example, a DCI in the plurality of DCIs may comprise a field indicating a PDSCH group (e.g., a PDSCH group corresponding to the downlink transport block). The plurality of downlink transport blocks may correspond to one or more PDSCH groups. The plurality of DCIs may indicate the plurality of PDSCH groups.

The wireless device may transmit HARQ feedbacks for the plurality of downlink transport blocks. The wireless device may transmit the HARQ feedbacks by multiplexing the HARQ feedbacks in a HARQ feedback codebook and transmitting the HARQ feedback codebook via an uplink control channel. In an example, the HARQ feedback codebook may comprise the HARQ feedbacks for the one or more PDSCH groups. The wireless device may determine one or more LBT parameters and may transmit the HAQR feedbacks based on an LBT procedure, using the one or more LBT parameters, indicating clear channel. The wireless device may determine the one or more LBT parameters based on the plurality of priorities and/or traffic/service types associated with the plurality of downlink transport blocks. For example, a first priority and/or traffic/service type, in the plurality of priorities and/or traffic/service types, may be associated with one or more first LBT parameters (e.g., a first channel access priority class, a first contention window size, etc.). For example, the wireless device may determine the one or more LBT parameters based on a first priority and/or traffic/service types in the plurality of priorities and/or traffic/service types. The first priority may be associated with a first service/traffic type in the plurality of service/traffic types. For example, the first traffic/service type may be a URLLC traffic/service type.

In an example, a DCI scheduling a downlink transport block may comprise a field. A value of the field may indicate a PDSCH group. For example, the wireless device may receive a second DCI indicating a request for HARQ feedback for downlink transport blocks of the PDSCH group. In an example, the second DCI may comprise a bitmap, wherein a bit in the bitmap corresponds to a PDSCH group in a plurality of PDSCH groups and a value of the bit indicates a request for HARQ feedback for the PDSCH group. In an example, the second DCI may comprise a field indicating an identifier of the PDSCH group. In an example, a PDSCH group may be associated with a priority (e.g., a HARQ feedback priority). The priority may be used for determination of one or more LBT parameters and/or for collision handling (e.g., collision between HARQ feedback for the PDSCH group and one or more other uplink signals/channels). In an example, the field of the DCI may be used for indicating the PDSCH group and the priority. In an example, the value of the field may indicate a PDSCH group and a priority associated with the PDSCH group.

In an example, a first HARQ feedback codebook, associated with a first priority may be transmitted in a first subslot and a second HARQ feedback, associated with a second priority, may be transmitted in a second subslot. The wireless device may transmit the first HARQ feedback codebook using a first LBT procedure. The first LBT procedure (e.g., one or more first parameters of the first LBT procedure) may be based on the first priority. The wireless device may obtain a channel occupancy time (COT) based on the performing the first LBT procedure. The second subslot may be within the COT obtained by the wireless device based on performing the first LBT procedure. In an example, the wireless device may perform or may not perform a second LBT procedure for transmission of the second HARQ feedback codebook based on the first priority and the second priority. In an example, the wireless device may perform a first type of LBT (e.g., a short LBT) or a second type of LBT (e.g., a long LBT) for the second LBT procedure based on the first priority and the second priority. For example, if the second priority is the same or higher than the first priority (e.g., the first HARQ feedback codebook associated with eMBB and the second HARQ feedback codebook associated with URLLC), the wireless device may not perform the second LBT procedure or may perform a first type of LBT (e.g., short LBT). In an example, if the second priority is lower than the first priority (e.g., the first HARQ feedback codebook associated with URLLC and the second HARQ feedback codebook associated with eMBB), the wireless device may perform the second LBT procedure (e.g., not based on the first type of LBT but based on the second type of LBT, e.g., long LBT).

In an example, a wireless device may receive one or more messages comprising configuration parameters. The one or more messages may comprise one or more RRC messages. In an example, the one or more messages may comprise configuration parameters of PDCP duplication for a bearer. In an example, the bearer may be data radio bearer (e.g., DRB). In an example, the bearer may be a signaling radio bearer (SRB). In an example, PDCP configuration parameters may indicate whether a bearer is configured with PDCP duplication or not.

Figure 23:
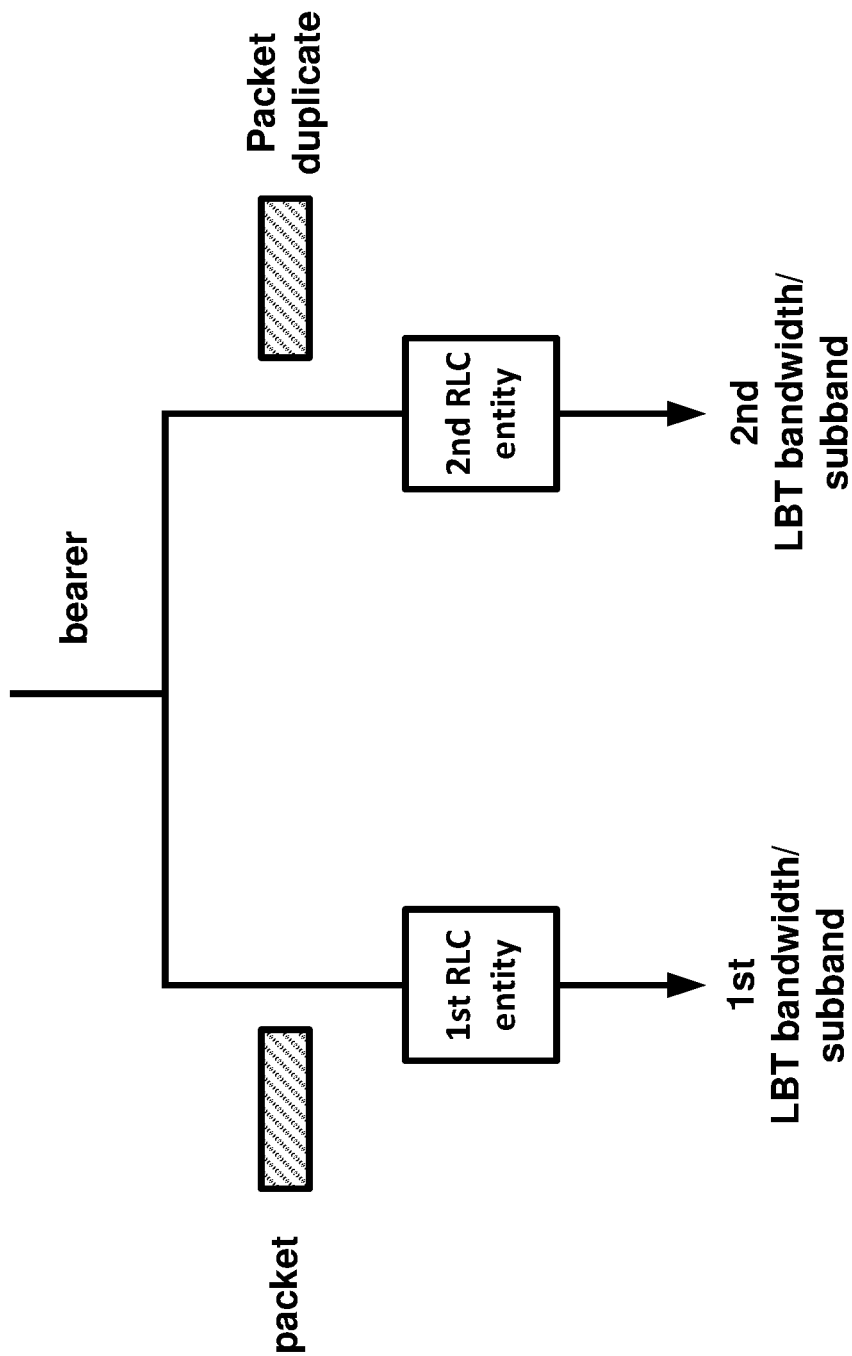
FIG. 23 shows an example PDCP duplication process in accordance with several of various embodiments of the present disclosure.
Figure 24:
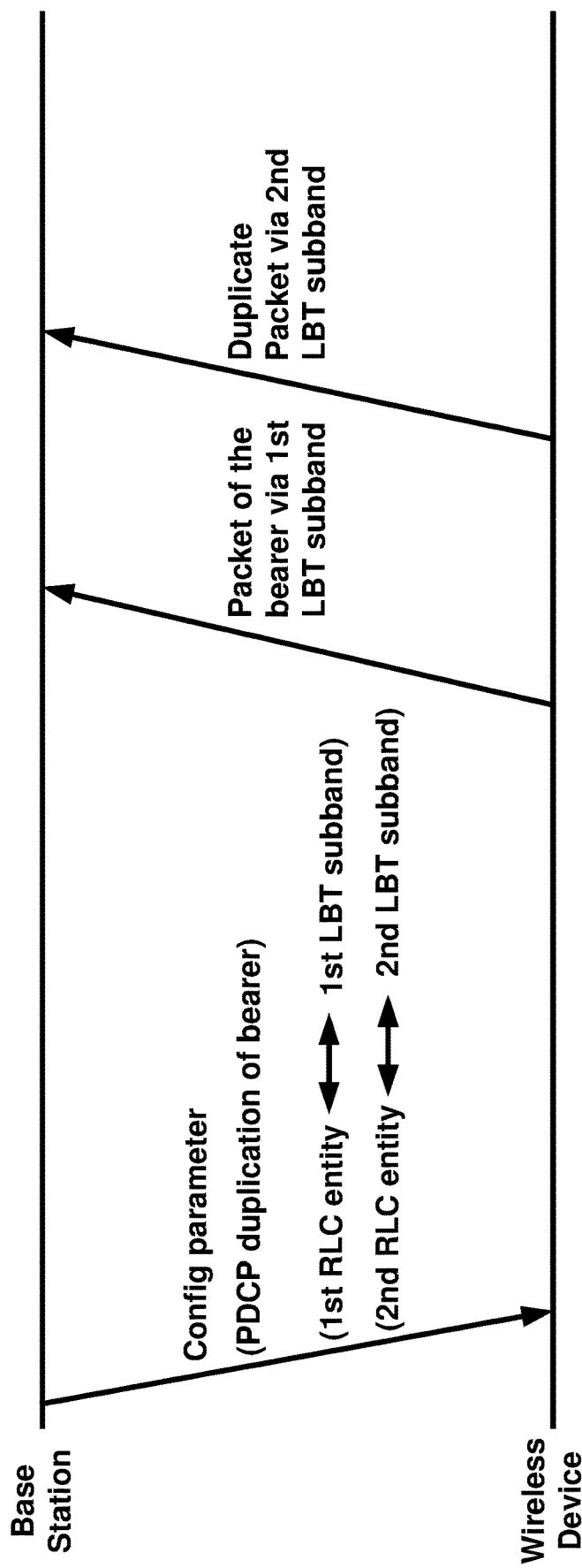
FIG. 24 shows an example PDCP duplication process in accordance with several of various embodiments of the present disclosure.

In an example embodiment as shown in FIG. 23 and FIG. 24, the configuration parameters of the bearer may indicate that a first RLC entity and a second RLC entity are associated with the bearer. In an example, the first RLC entity and the second RLC entity may belong to the same cell group comprising cells provided by one base station (e.g., MCG associated with a master base station or SCG associated with a secondary base station). The In an example, the first RLC entity and the second RLC entity may belong to different cell groups (e.g., a first RLC entity belonging to a first cell group and a second RLC entity associated with a second cell group).

In an example, a bearer configured with PDCP packet duplication may be activated with PDCP packet duplication (e.g., one or more RLC entities associated with the bearer may be activated) based on receiving the configuration parameters of the PDCP duplication indicating configuration of the PDCP duplication for the bearer. In an example, a bearer configured with PDCP duplication may be activated with PDCP duplication (e.g., one or more RLC entities associated with the bearer may be activated) based on receiving a command indicating activation of the PDCP duplication for the bearer and/or indicating activation of the one or more RLC entities. In an example, the command may be a MAC CE. The MAC CE may comprise one or more field, values of the one or more fields indicating activation of the PDCP duplication/one or more RLC entities.

The first RLC entity of the bearer may be associated with a first LBT bandwidth/subband and the second RLC entity may be associated with a second LBT bandwidth/subband. A PDCP PDU, corresponding to a packet of the bearer, may be transmitted via (e.g., duplicated in) the first RLC entity and the second RLC entity. The first RLC entity may be associated with a first logical channel and the second RLC entity may be associated with a second logical channel. The first RLC entity may be associated with one or more first LBT bandwidths/subbands, comprising the first LBT bandwidth/subband, wherein data of the first logical channel may be transmitted via resources of the one or more first LBT bandwidth/subbands. The second RLC entity may be associated with one or more second LBT bandwidths/subbands, comprising the second LBT bandwidth/subband, wherein data of the second logical channel may be transmitted via resources of the one or more second LBT bandwidth/subbands.

In an example, the first LBT bandwidth/subband and the second LBT bandwidth/subband may be in the same BWP of a cell (unlicensed cell). In an example, the first LBT bandwidth/subband may be in a first BWP of a cell (unlicensed cell) and the second LBT bandwidth/subband may be in a second BWP of the cell (unlicensed cell). In an example, the first LBT bandwidth/subband may be in a first BWP of a first cell (unlicensed cell) and the second LBT bandwidth/subband may be in a second BWP of a second cell (unlicensed ell).

In an example embodiment, a wireless device may receive a command indicating activation of a first RLC entity and a second RLC entity. The first RLC entity and the second RLC entity may be for or associated with a bearer (e.g., a bearer configured with PDCP duplication). The first RLC entity, or a first logical channel associated with the first RLC entity, may be associated with and/or mapped to at least one first LBT bandwidth/subband. For example, the configuration parameters (e.g., configuration parameters of the first logical channel) may indicate that the first RLC entity/logical channel is associated with/mapped to the at least one first LBT bandwidth/subband. The second RLC entity, or a second logical channel associated with the second RLC entity, may be associated with and/or mapped to at least one second LBT bandwidth/subband. For example, the configuration parameters (e.g., configuration parameters of the second logical channel) may indicate that the second RLC entity/logical channel is associated with/mapped to the at least one second LBT bandwidth/subband.

The wireless device may transmit a packet of the bearer via the first LBT bandwidth/subband and a duplicate of the packet of the bearer via the second LBT bandwidth/subband. For example, the wireless device may receive one or more uplink grants for transmission of one or more first transport blocks via the first LBT bandwidth/subband and one or more second uplink grants for transmission of one or more second transport blocks via the second LBT bandwidth/subband. The wireless device may transmit the packet of the bearer via the one or more first uplink grants by multiplexing data of the packet of the bearer in the one or more first transport blocks. The wireless device may perform a listen before talk procedure for transmission of a transport block in the one or more first transport block. The wireless device may transmit the duplicate of the packet of the bearer via the one or more second uplink grants by multiplexing data of the duplicate of the packet of the bearer in the one or more second transport blocks. The wireless device may perform a listen before talk procedure for transmission of a transport block in the one or more second transport block.

Figure 25:
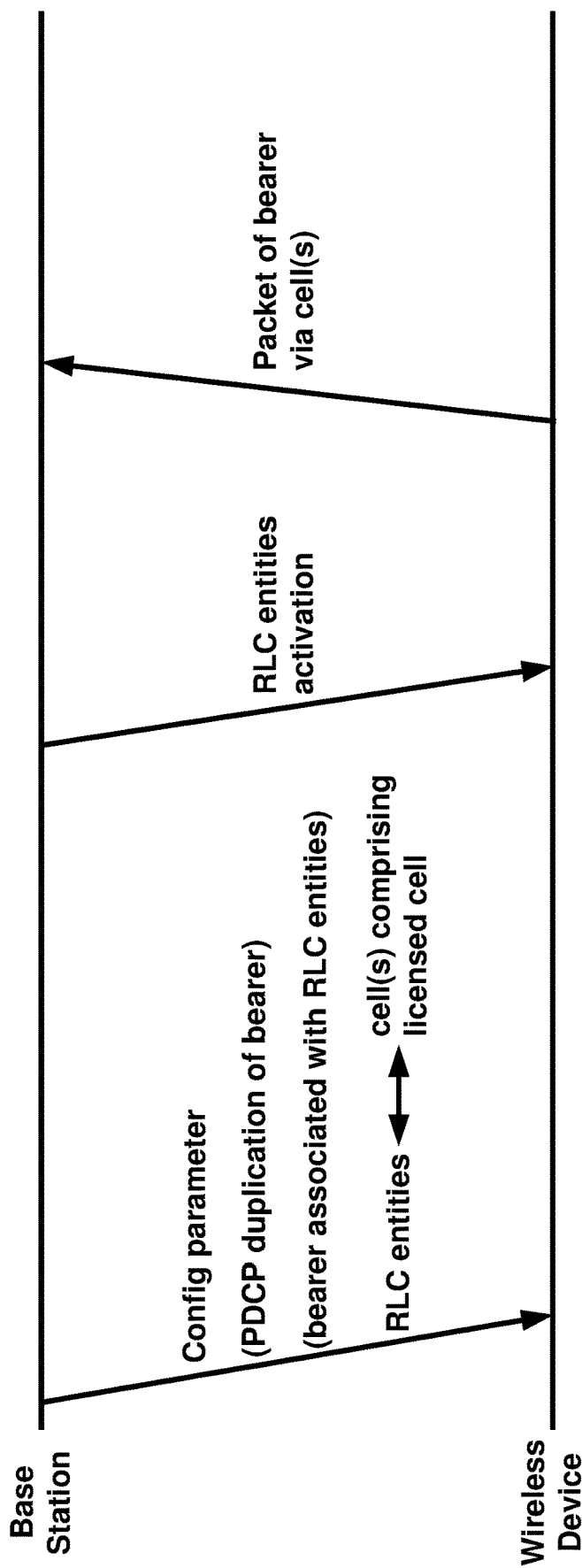
FIG. 25 shows an example PDCP duplication process in accordance with several of various embodiments of the present disclosure.

In an example embodiment as shown in FIG. 25, a wireless device may receive configuration parameters of a bearer. The configuration parameters may indicate that the bearer is configured with PDCP duplication. For example, a first parameter of the configuration parameters of the bearer may be a Boolean parameter indicating whether the bearer is configured with duplication or not. The configuration parameters may further indicate that the bearer is associated with a plurality of RLC entities. For example, a PDCP PDU may be duplicated in and transmitted via the plurality of RLC entities. The plurality of RLC entities may correspond to a plurality of logical channels. An RLC entity, in the plurality of RLC entities, may correspond to a logical channel, in the plurality of logical channels. In an example, the configuration parameters may indicate logical channel mapping restrictions, wherein a logical channel may be mapped to (e.g., allowed to be transmitted on) one or more cells and/or BWPs and/or LBT bandwidths/subbands.

In an example, the wireless device may receive configuration parameters of a plurality of cells comprising at least one licensed cell. The plurality of RLC entities (e.g., the plurality of logical channels associated with the plurality of RLC entities) may correspond to (e.g., be mapped to) one or more cells comprising at least one first cell of the at least one licensed cell. In an example, the wireless device may receive a command indicating the activation of the PDCP duplication and the plurality of the RLC entities. The wireless device may transmit a packet of the bearer and at least one duplicate of the packet of the bearer via the one or more cell.

In an example embodiment, a wireless device may receive configuration parameters indicating that a bearer is configured with PDCP packet duplication. The bearer may be associated with a plurality of RLC entities. A packet of the bearer (e.g., a PDCP PDU corresponding to the bearer) may be mapped to/transmitted via the plurality of RLC entities. The plurality of the RLC entities may be associated with a plurality of logical channels. The configuration parameters may comprise logical channel mapping restrictions indicating that the plurality of RLC entities/the plurality of logical channels may be mapped to one or more cells/BWPs/LBT bandwidths/subbands. The one or more cells/BWPs/LBT bandwidths/subbands may be in one or more unlicensed bands. The wireless device may detect LBT failures (e.g., consistent LBT failures) on the one or more cells/BWPs/LBT bandwidths/subbands. The wireless device may detect the LBT failures (e.g., consistent LBT failures) on the one or more cells/BWPs/LBT bandwidths/subbands based on indications of LBT failures (e.g., physical layer indication of LBT failures).

In an example, the wireless device may transmit a MAC CE (e.g., an LBT failure indication MAC CE) indicating the LBT failure (e.g., consistent LBT failures) on the one or more cells/BWPs/LBT bandwidths/subbands.

In an example, the wireless device may receive a command based on the transmission of the LBT failure indication MAC CE. The command may indicate activation of one or more first RLC entities of the plurality of RLC entities. The one or more first RLC entities may be associated with/mapped to one or more first cells/BWPs/LBT bandwidths. The one or more first RLC entities may be based on the LBT failure indication MAC CE. The base station may determine the one or more first RLC entities based on the indication of LBT failures (e.g., consistent LBT failures) by the LBT failure indication MAC CE. The wireless device may transmit a packet of the bearer and a duplicate of the packet of the bearer via the one or more first cells/BWPs/LBT bandwidths/subbands.

In an example, the wireless device may determine one or more first RLC entities of the plurality of RLC entities, wherein the one or more first RLC entities are associated with one or more first cells/BWPs/LBT bandwidths/subbands. The wireless device may determine the one or more first RLC entities/the one or more first cells/BWPs/LBT bandwidths/subbands based the LBT failures/consistent LBT failures on the one or more cells/BWPs/LBT bandwidths/subbands. The wireless device may autonomously activate the one or more first RLC entities. The wireless device may indicate to the base station the determined one or more first RLC entities/the one or more first cells/BWPs/LBT bandwidths/subbands. In an example, the wireless device may indicate the determined one or more first RLC entities/the one or more first cells/BWPs/LBT bandwidths/subbands using a MAC CE. In an example, the wireless device may indicate the determined one or more first RLC entities/the one or more first cells/BWPs/LBT bandwidths/subbands using RRC signaling and using an RRC message. In an example, the wireless device may indicate the determined one or more first RLC entities/the one or more first cells/BWPs/LBT bandwidths/subbands using RRC signaling and using physical layer signaling (e.g., using PUCCH).

Figure 26:
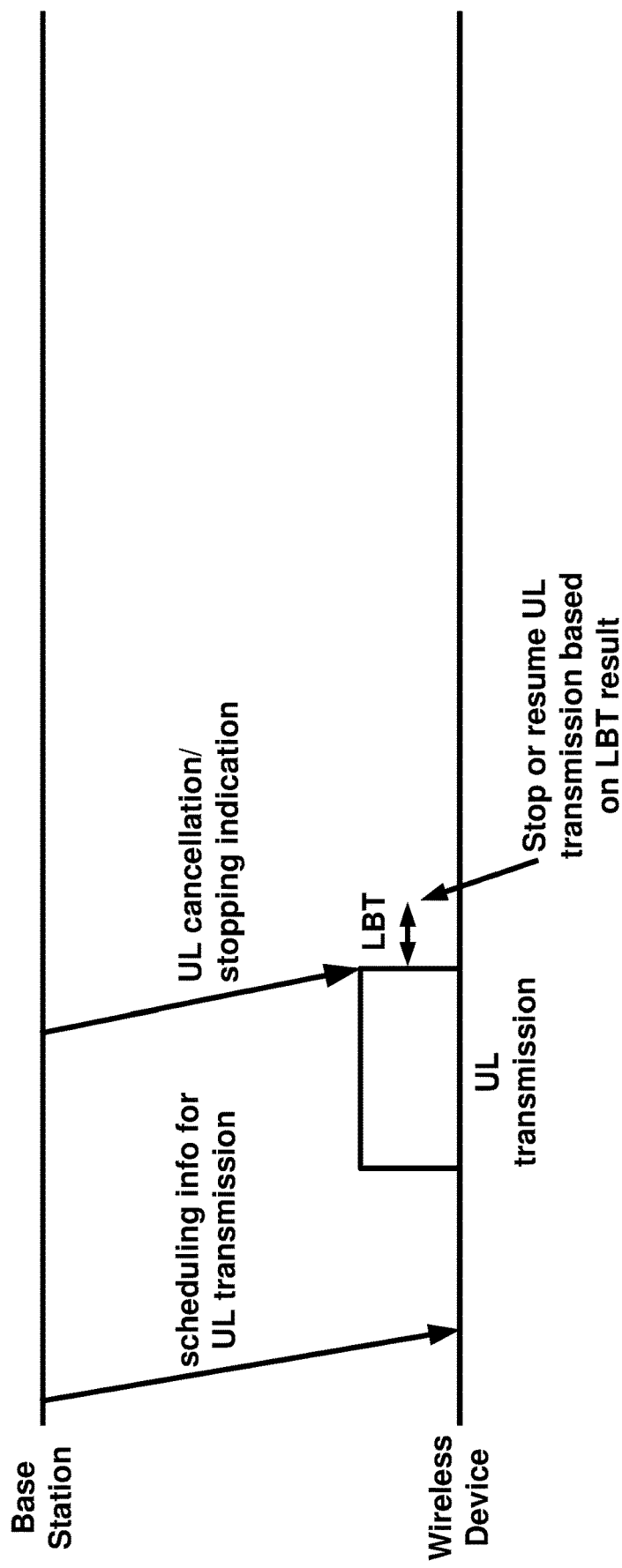
FIG. 26 shows an example uplink cancellation process in accordance with several of various embodiments of the present disclosure.

In an example, embodiment, as shown in FIG. 26, a wireless device may receive scheduling information for an uplink transmission. The uplink transmission may be via an uplink signal or an uplink channel. For example, the scheduling information may be an uplink grant, received via a downlink control information, indicating radio resources and transmission parameters of an uplink transport block and the uplink transmission may be the transmission of the uplink transport block via an uplink shared channel. For example, the scheduling information may be for transmission of one or more uplink control information via an uplink channel (e.g., PUCCH). The scheduling information for transmission of the one or more uplink control information may be received via a DCI. For example, the scheduling information may be an SRS request for transmission of SRS.

The wireless device may receive an indication (e.g., an uplink cancellation indication) for stopping the uplink transmission. The wireless device may receive the indication via a DCI (e.g., a group common DCI). The wireless device may perform a listen before talk procedure in response to receiving the indication. In an example, the wireless device may stop the uplink transmission and may perform the listen before talk procedure in response to receiving the indication. In an example, the wireless device may perform the listen before talk procedure in an LBT bandwidth/subband on which the uplink transmission is scheduled. In an example, the indication may further indicate one or more LBT parameters of the listen before talk procedure. The wireless device may resume the uplink transmission or stop (e.g., continue stopping) the uplink transmission based on the listen before talk procedure indicating clear channel or busy channel. In an example, for resuming the uplink transmission, the wireless device may use an original radio resource mapping that was used when the wireless device started the uplink transmission.

In an example embodiment, a wireless device may create a transport block for transmission via a configured grant resource on an unlicensed cell. The wireless device may determine uplink control information, associated with the transport, for multiplexing in PUSCH and transmission via the configured grant resource. The uplink control information may comprise HARQ related parameters (e.g., HARQ process ID, NDI, RV, etc.). The uplink control information may further comprise one or more COT and/or LBT related information (e.g., LBT to be performed before transmission of the TB and UCI). The wireless device may perform a listen-before-talk procedure before the transmission of the TB and UCI and may start transmission of the TB and/UCI based on the listen before talk procedure indicating clear channel. The wireless device may receive an indication (e.g., an uplink cancellation indication) to stop the transmission via the configure grant resource. Based on the receiving the indication, the wireless device may transmit at least a portion of the UCI (e.g., via an uplink control channel). For example, the wireless device may transmit at least a portion of the UCI which comprises the COT and/or LBT related uplink control information (e.g., via an uplink control channel).

In an example embodiment, a wireless device may be scheduled to transmit an uplink transmission (e.g., a TB) via radio resources (e.g., dynamically scheduled radio resources based receiving an uplink grant or a configured radio resource based on a configured grant). The wireless device may perform an LBT procedure before the uplink transmission and may obtain a COT based on the LBT procedure indicating clear channel. The wireless device may receive an indication for cancellation of the uplink transmission. Based on the wireless device performing the LBT procedure and the LBT procedure indicating clear channel, the wireless device obtains a COT, corresponding to the LBT procedure, regardless of the uplink transmission being cancelled or not. The wireless device may perform a second uplink transmission (e.g., transmit a second transport block) within the COT, wherein the wireless device may perform a second LBT according to a first type of LBT (e.g., short LBT) before performing the second uplink transmission and may perform the second uplink transmission based on the second LBT procedure indicating clear channel.

In an example, a wireless device may receive scheduling information for transmission of a first transport block via radio resources. The wireless device may receive a DCI comprising an uplink grant indicating transmission parameters (e.g., the radio resources) for transmission of the first transport block. The wireless device may create the first transport block based on multiplexing data of one or more logical channels in the transport block. The radio resources for the scheduled transmission of the first transport block may be a first type of radio resources (e.g., unlicensed radio resources). Based on the radio resources being the first type of the radio resources, the wireless device may store the data of the one or more logical channels (e.g., the data of the one or more logical channels included in the first transport block) in a first logical channel/buffer. The wireless device may perform a listen before talk procedure before the scheduled transmission of the first transport block.

Figure 27:
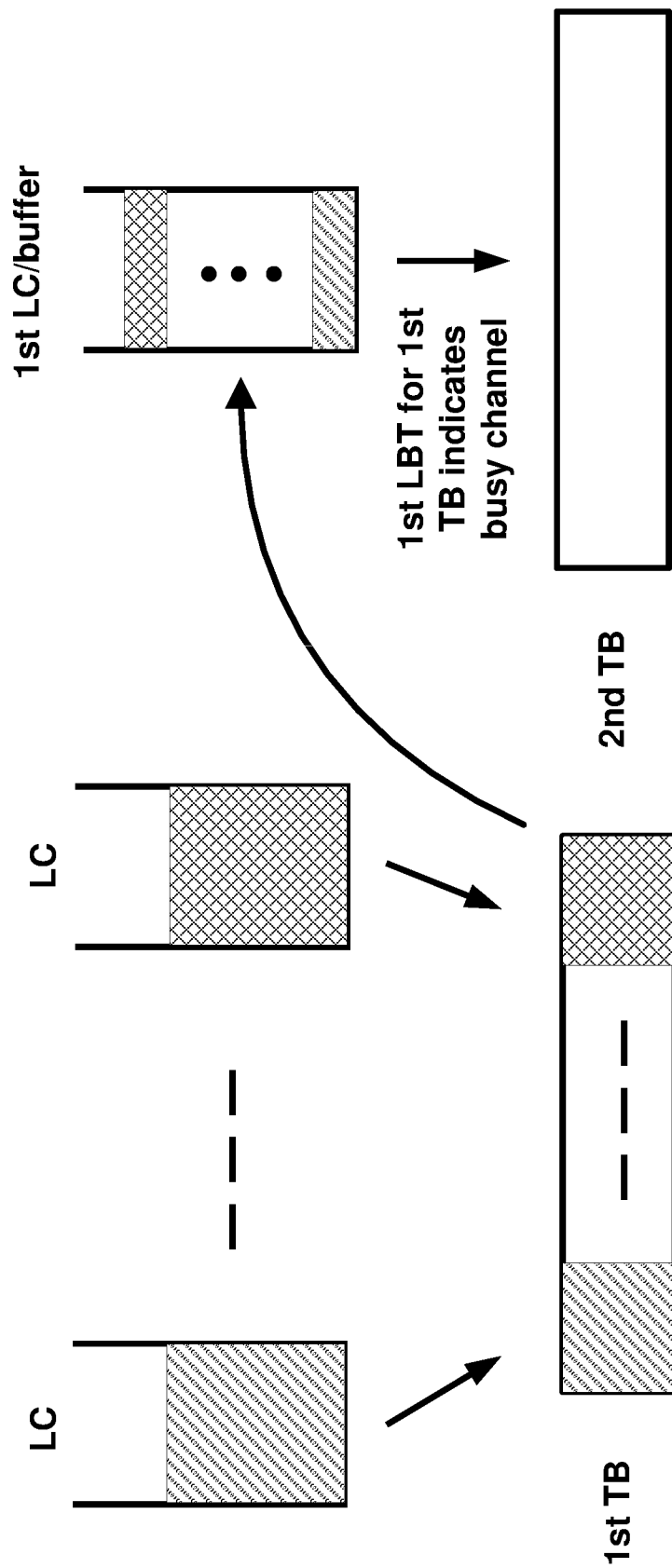
FIG. 27 shows an example process in accordance with several of various embodiments of the present disclosure.

In an example embodiment as shown in FIG. 27, the listen before talk procedure may indicate a busy channel. The wireless device may create a second transport block, wherein the second transport block comprises first data of the first logical channel. The wireless device may create a second transport block, wherein the second transport block comprises first data of the first logical channel based on the listen before talk procedure for transmission of the first transport block indicating a busy channel.

In an example, the wireless device may receive configuration parameters of a plurality of logical channels comprising the one or more logical channels. In an example, the plurality of logical channels may comprise the first logical channel. The configuration parameters may indicate priorities (e.g., priorities for a logical channel prioritization/logical channel multiplexing process). The configuration parameters may indicate that the first logical channel has higher priority for logical channel multiplexing than other logical channels. The configuration parameters may indicate that the first logical channel has higher priority for logical channel multiplexing than the one or more logical channels. In an example, the wireless device may receive a first configuration parameter indicating a first priority, for logical channel multiplexing, for the first logical channel.

The wireless device may transmit the second transport block. In an example, the wireless device may transmit the second transport block based on a second listen before talk procedure before transmission of the second transport block indicating clear channel.

In an example, a wireless device may receive scheduling information for transmission of a transport block via radio resources. The wireless device may receive a DCI comprising an uplink grant indicating transmission parameters (e.g., the radio resources) for transmission of the transport block. The wireless device may create the transport block based on multiplexing data of one or more logical channels in the transport block. The radio resources for the scheduled transmission of the transport block may be a first type of radio resources (e.g., unlicensed radio resources). Based on the radio resources being the first type of the radio resources, the wireless device may store the data of the one or more logical channels (e.g., the data of the one or more logical channels included in the transport block) in a first logical channel/buffer.

Figure 29:
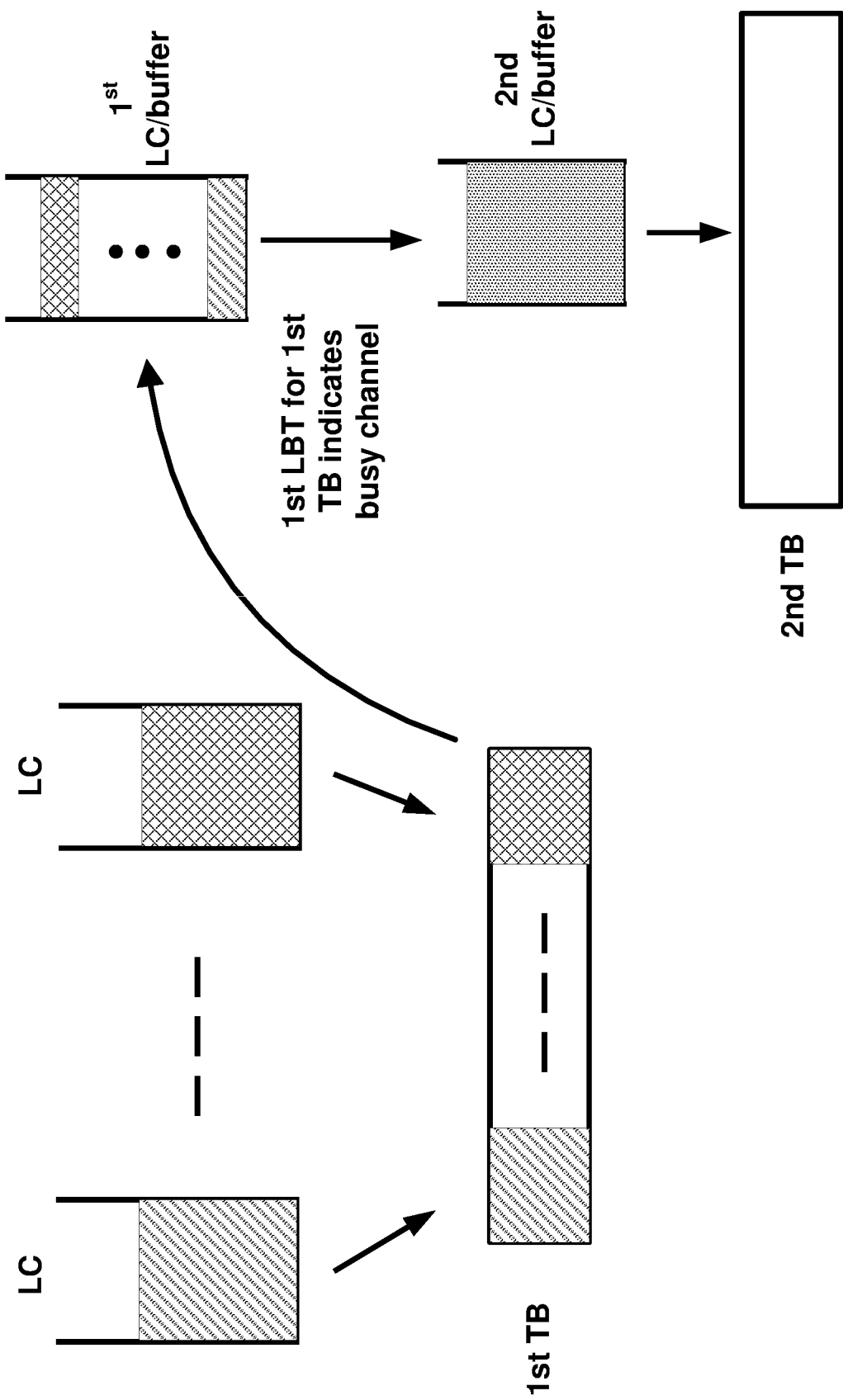
FIG. 29 shows an example process in accordance with several of various embodiments of the present disclosure.

In an example embodiment as shown in FIG. 29, based on a listen before talk procedure for transmission of the first transport block indicating clear channel, the wireless device may flush the first logical channel/buffer. Otherwise, the wireless device may store first data of the one or more logical channels in a second logical channel. The wireless device may create a second transport block comprising second data of the second logical channel.

In an example embodiment, based on a listen before talk procedure for transmission of the first transport block indicating clear channel, the wireless device may flush the first logical channel/buffer. Otherwise, the wireless device may store first data of the one or more logical channels in a second logical channel or a third logical channel. For example, the wireless device may store data of the one or more logical channels in the second logical channel or third logical channel based on one or more priorities associated with the one or more logical channels. For example, the one or more logical channels may be associated with a first priority. The second logical channel may be associated with the first priority. The wireless device may store the first data of the one or more logical channels in the second logical channel. For example, the one or more logical channels may be associated with a second priority. The third logical channel may be associated with the second priority. The wireless device may store the first data of the one or more logical channels in the third logical channel. The wireless device may create a second transport block comprising second data of the second logical channel or third logical channel.

Figure 28:
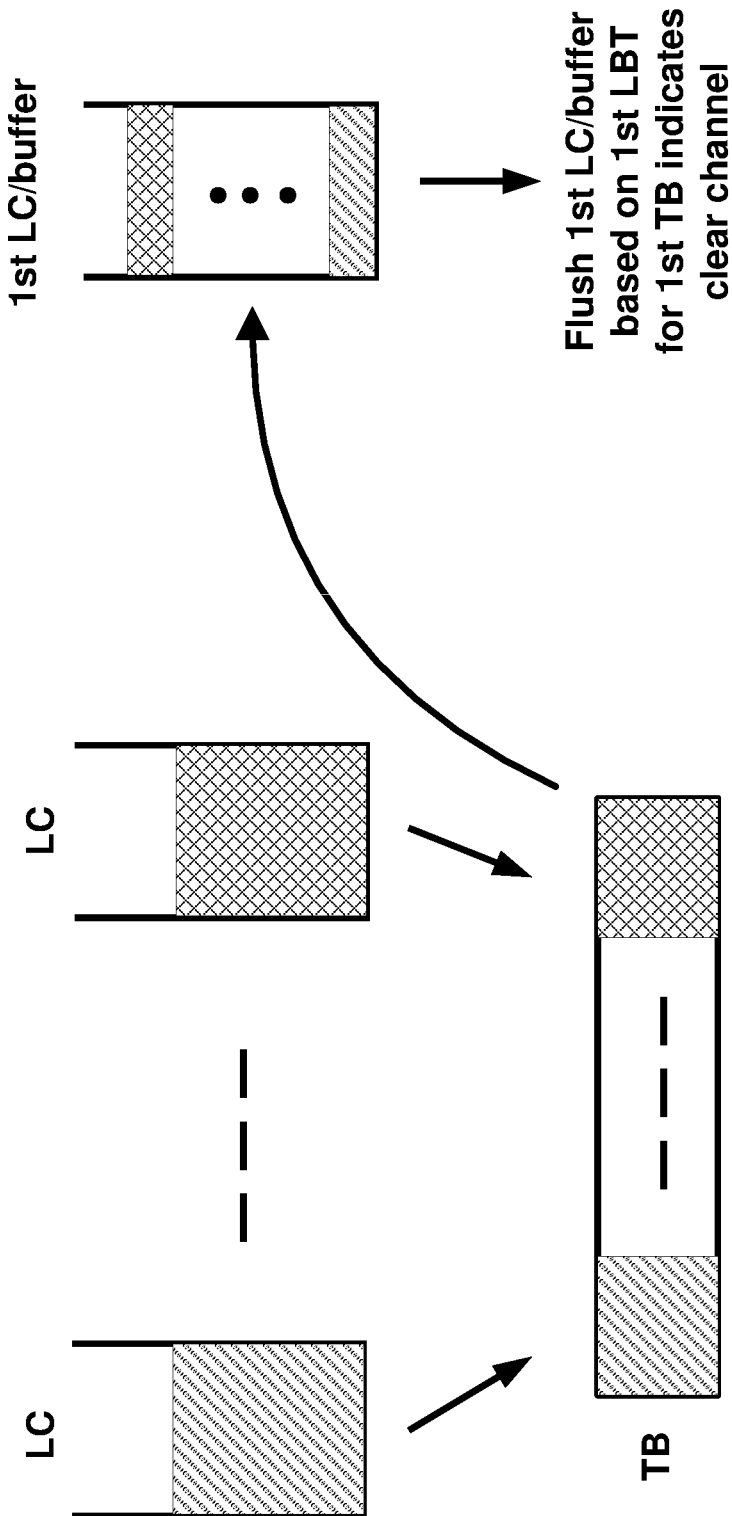
FIG. 28 shows an example process in accordance with several of various embodiments of the present disclosure.

In an example embodiment as shown in FIG. 28, the wireless device may perform a listen before talk procedure before the scheduled transmission of the transport block. The listen before talk procedure may indicate a clear channel. The wireless device may flush a buffer associated with the first logical channel based on the listen before talk procedure for the scheduled transmission indicating clear channel.

In an example embodiment, the wireless device may perform a listen before talk procedure before the scheduled transmission of the transport block. The wireless device may flush or not flush a buffer associated with the first logical channel based on a result of a listen before talk procedure for the scheduled transmission. For example, the wireless device may flush the buffer associated with the first logical channel based on the listen before talk procedure for the scheduled transmission indicating clear channel.

In an example embodiment, a wireless device may determine one or more first LBT parameters for transmission of a first HARQ feedback codebook associated with a first traffic/service type and/or priority. The wireless device may determine one or more second LBT parameters for transmission of a second HARQ feedback codebook associated with a second traffic/service type and/or priority. The wireless device may transmit the first HARQ feedback codebook based on the one or more first LBT parameters. The wireless device may transmit the second HARQ feedback codebook based on the one or more second LBT parameters.

In an example, the first HARQ feedback codebook may comprise one or more HARQ feedback for one or more downlink transport blocks associated with the first traffic/service type. In an example, the wireless device may receive a first downlink control information indicating scheduling information for receiving a first downlink transport block, of the one or more downlink transport blocks, wherein the first downlink control information indicates the first traffic/service type and/or priority. In an example, the first downlink control information may comprise a field, a value of the field indicating the first traffic/service type and/or priority.

In an example, the first HARQ feedback codebook may comprise one or more HARQ acknowledgements in response to one or more downlink control information indicating release of one or more semi-persistent scheduling configurations associated with the first traffic/service type and/or priority. In an example, the wireless device may receive configuration parameters of a first semi-persistent scheduling configuration, of the one or more semi-persistent scheduling configurations, wherein the configuration parameters indicate the first traffic/service type and/or priority. In an example, a first downlink control information, of the one or more downlink control information, may indicate release of a first semi-persistent scheduling configuration, of the one or more semi-persistent scheduling configurations, the first downlink control information indicating the first traffic/service type and/or priority. In an example, the first downlink control information may overwrite a semi-persistently configured traffic/service type and/or priority.

In an example, the second HARQ feedback codebook may comprise one or more HARQ feedback for one or more downlink transport blocks associated with the second traffic/service type. In an example, the wireless device may receive a first downlink control information indicating scheduling information for receiving a first downlink transport block, of the one or more downlink transport blocks, wherein the first downlink control information may indicate the second traffic/service type and/or priority. In an example, the first downlink control information may comprise a field, a value of the field indicating the second traffic/service type and/or priority.

In an example, the second HARQ feedback codebook may comprise one or more HARQ acknowledgements in response to one or more downlink control information indicating release of one or more semi-persistent scheduling configurations associated with the second traffic/service type and/or priority. In an example, the wireless device may receive configuration parameters of a first semi-persistent scheduling configuration, of the one or more semi-persistent scheduling configurations, wherein the configuration parameters indicate the second traffic/service type and/or priority. In an example, a first downlink control information, of the one or more downlink control information, may indicate release of a first semi-persistent scheduling configuration, of the one or more semi-persistent scheduling configurations, the first downlink control information indicating the second traffic/service type and/or priority.

In an example, the transmitting the first HARQ feedback codebook may be via a first subslot of an uplink channel, the first subslot comprising one or more first symbol durations associated with a numerology of the uplink channel; and the transmitting the second HARQ feedback codebook is via a second subslot of the uplink channel, the second subslot comprising one or more second symbol durations associated with the numerology of the uplink channel. In an example, the uplink channel may be an uplink control channel. In an example, the wireless device may receive configuration parameters indicating a first number of the one or more first symbol durations and a second number of the one or more second symbol durations.

In an example, the one or more first LBT parameter may indicate a first duration of a first listen-before-talk for transmission of the first HARQ feedback codebook; and the one or more second LBT parameters may indicate a second duration of a second listen-before-talk for transmission of the second HARQ feedback.

In an example, the one or more first LBT parameters may indicate a first channel access priority class; and the one or more second LBT parameters indicate a second channel access priority class.

In an example, the wireless device may transmit the first HARQ feedback codebook based on a first LBT procedure indicating clear channel; and the first LBT procedure may be based on the one or more first LBT parameters.

In an example, the wireless device may transmit the second HARQ feedback codebook based on a second LBT procedure indicating clear channel; and the second LBT procedure may be based on the one or more second LBT parameters.

In an example, the one or more first LBT parameters may indicate no listen before talk based on one or more conditions. The one or more conditions may comprise the first traffic/service type being URLLC traffic/service type. The one or more conditions may comprise the first priority having a first value.

In an example embodiment, a wireless device may receive a first downlink control information indicating: a first downlink assignment for a first downlink transport block associated with a first HARQ feedback codebook corresponding to a first traffic/service type and/or priority; and a first subslot for transmission of the first HARQ feedback codebook. The wireless device may receive a second downlink control information indicating: a second downlink assignment for a second downlink transport block associated with a second HARQ feedback codebook corresponding to a second traffic/service type and/or priority; and a second subslot for transmission of the second HARQ feedback codebook. The wireless device may determine: one or more first LBT parameters based on the first traffic/service type and/or priority; and one or more second LBT parameters based on the second traffic/service type and/or priority. The wireless device may transmit the first HARQ feedback codebook in the first subslot and via a first uplink control channel and based on the one or more first LBT parameters. The wireless device may transmit the second HARQ feedback codebook in the second subslot and via a second uplink control channel and based on the one or more second LBT parameters.

In an example, the first subslot and the second subslot may be in the same slot.

In an example, the first downlink control information may indicate the first traffic/service type and/or priority.

In an example, the second downlink control information may indicate the second traffic/service type and/or priority.

In an example, a wireless device may receive a downlink control information indicating: a downlink assignment for a downlink transport block associated with a HARQ feedback codebook corresponding to a traffic/service type and/or priority; and a subslot for transmission of the HARQ feedback codebook. The wireless device may determine one or more LBT parameters based on the traffic/service type/priority. The wireless device may transmit the HARQ feedback codebook, comprising a HARQ feedback for the downlink transport block, in the subslot and via an uplink control channel and based on the one or more LBT parameters.

In an example, the downlink control information may indicate activation of a downlink-semi-persistent scheduling configuration. The downlink assignment may be associated with the downlink semi-persistent scheduling configuration. One or more first configuration parameters of the downlink-semi-persistent scheduling configuration may indicate the HARQ feedback codebook and/or the traffic/service type and/or the priority. In an example, the wireless device may receive one or more messages comprising configuration parameters of the downlink-semi-persistent scheduling configuration comprising the one or more first configuration parameters.

In an example, the downlink control information may indicate the HARQ feedback codebook and/or traffic/service type and/or priority.

In an example, the downlink control information may comprise a field indicating a timing between the downlink transport block and the HARQ feedback for the transport block. In an example, the subslot may be based on the timing and a symbol duration associated with the uplink control channel. In an example, the symbol duration may be based on a numerology of the uplink control channel.

In an example, the one or more LBT parameters may be one or more first parameters based on the traffic/service type/priority being a first traffic/service type/priority. The one or more LBT parameters may be one or more second parameters based on the traffic/service type/priority being a second traffic/service type/priority. A first LBT procedure based on the one or more first parameters may be looser than a second LBT procedure based on the one or more second parameters. The first LBT procedure may be looser than the second LBT procedure if the first LBT procedure leads to a higher probability of channel access than the second LBT procedure.

In an example embodiment, a wireless device may receive a plurality of downlink control information for downlink assignments of a plurality of downlink transport blocks, wherein the plurality of downlink control information may indicate a plurality of HARQ feedback priorities. The wireless device may transmit HARQ feedback for the plurality of downlink transport blocks, via an unlicensed cell and based on an LBT procedure indicating a clear channel, wherein the LBT procedure is based on one or more LBT parameters associated with a first priority of the plurality of HARQ feedback priorities.

In an example, the plurality of downlink control information may indicate one or more PDSCH groups.

In an example, the plurality of HARQ feedback priorities may comprise a first HARQ feedback priority associated with a first type of service/traffic; and the first priority may be the first HARQ feedback priority. In an example, the first type of service/traffic may be URLLC.

In an example embodiment, a wireless device may receive configuration parameters of PDCP duplication for a bearer, the configuration parameters indicating: a first RLC entity of the bearer associated with at least a first LBT bandwidth/subband; and a second RLC entity of the bearer associated with at least a second LBT bandwidth/subband. The wireless device may transmit a packet of the bearer via the first LBT bandwidth/subband; and a duplicate of the packet via the second LBT bandwidth/subband.

In an example, the first RLC entity may be associated with a first logical channel; and the second RLC entity may be associated with a second logical channel.

In an example, the first LBT bandwidth/subband and the second LBT bandwidth/subband may be for a BWP of an unlicensed cell.

In an example, the first LBT bandwidth/subband may be for a first BWP of an unlicensed cell; and the second LBT bandwidth/subband may be for a second BWP of the unlicensed cell.

In an example, the first LBT bandwidth/subband may be for a first BWP of a first unlicensed cell; and the second LBT bandwidth/subband may be for a second BWP of a second unlicensed cell.

In an example, the wireless device may receive a command indicating activation of the first RLC entity and the second RLC entity.

In an example, the transmitting the packet and the duplicate of the packet may be based on the receiving the command. In an example, the command may be a MAC CE.

In an example, the PDCP duplication may be activated for the bearer based on the receiving the configuration parameters. In an example, the first RLC entity and second RLC entity are may be may be activated based on the receiving the configuration parameters.

In an example, the first LBT bandwidth/subband and the second LBT bandwidth/subband may be for one or more cells in a cell group, wherein the cell group is one of a MCG and a SCG.

In an example, the first LBT bandwidth/subband may be a for a first cell in a first cell group; and the second LBT bandwidth/subband may be for a second cell in a second cell group. In an example, the first cell group may be MCG; and the second cell group may be SCG.

In an example embodiment, a wireless device may receive command indicating activation of a first RLC entity and a second RLC entity, wherein: the first RLC entity and the second RLC entity are for a bearer; the first RLC entity is associated with/mapped to at least a first LBT bandwidth/subband; and the second RLC entity is associated with/mapped to at least a second LBT bandwidth/subband. The wireless device may transmit, based on the receiving the command: a packet of the bearer via the first LBT bandwidth/subband; and a duplicate of the packet via the second LBT bandwidth/subband.

In an example, the bearer may be configured with PDCP duplication.

In an example, the transmitting the packet via the first LBT bandwidth/subband may be based on a first LBT procedure indicating a clear channel; and the transmitting the packet via the second LBT bandwidth/subband may be based on a second LBT procedure indicating a clear channel.

In an example, wherein the first LBT bandwidth/subband and the second LBT bandwidth/subband may be for the same BWP.

In an example, the first LBT bandwidth/subband and the second LBT bandwidth/subband may be for different BWPs.

In an example, the first LBT bandwidth/subband and the second LBT bandwidth/subband may be for different BWPs of the same cell.

In an example, the first LBT bandwidth and the second LBT bandwidth may be for the same cell.

In an example, the first LBT bandwidth and the second LBT bandwidth may be for different cells.

In an example embodiment, a wireless device may receive configuration parameters of a bearer indicating that: the bearer is configured with PDCP duplication; the bearer is associated with a plurality of RLC entities; and the plurality of RLC entities are associated with/mapped to one or more cells comprising a licensed cell. The wireless device may receive a command indicating activation of one or more first RLC entities of the plurality of RLC entities, wherein the one or more first RLC entities are mapped to one or more cells comprising the licensed cell. The wireless device may transmit, based on the receiving the command, a packet of the bearer and a duplicate of the packet via the one or more cells.

In an example embodiment, a wireless device may receive configuration parameters indicating that: a bearer is configured with PDCP duplication; the bearer is associated with a plurality of RLC entities; and the plurality of RLC entities are associated with/mapped to one or more cells/BWPs/LBT bandwidths/subbands. The wireless device may transmit a first MAC CE based on one or more LBT failures on the one or more cells/BWPs/LBT bandwidths/subbands. The wireless may receive a command indicating activation of one or more first RLC entities of the plurality of RLC entities, wherein: the one or more first RLC entities are associated with/mapped to one or more first cells/BWPs/LBT bandwidths/subbands; and the one or more first RLC entities are based on the first MAC CE. The wireless device may transmit a packet of the bearer and a duplicate of the packet via the one or more first cells/BWPs/LBT bandwidths/subbands.

In an example embodiment, a wireless device may receive scheduling information for an uplink transmission. The wireless device may receive an indication for stopping the uplink transmission. The wireless device may perform a listen before talk procedure based on the receiving the indication. The wireless device may resume or stopping the uplink transmission based on the listen before talk indicating clear channel or busy channel.

In an example, the scheduling information may be in an uplink grant indicating resources for transmission of a transport block. The uplink transmission may be for the transport block.

In an example, the indication for stopping the uplink transmission may be received via a downlink control information. In an example, the downlink control information may be a group common downlink control information.

In an example, the uplink transmission may be via a first LBT bandwidth; and the listen before talk procedure may be for the first LBT bandwidth.

In an example, the indication may indicate one or more LBT parameters of the listen before talk procedure.

In an example, the wireless device may stop the uplink transmission before performing the listen before talk procedure based on the receiving the indication.

In an example, the resuming the uplink transmission may be based on shifting an original radio resource mapping, wherein the shifting may be based on a duration of the listen before talk procedure.

In an example, the resuming the uplink transmission may be based on an original radio resource mapping.

In an example embodiment, a wireless device may create a first transport block comprising data of one or more logical channels for a scheduled transmission via radio resources. The wireless device may, based on the radio resources being unlicensed radio resources, store the data of the one or more logical channels in a first logical channel/buffer. The wireless device may create a second transport block, wherein the second transport block comprises first data of the first logical channel based on a listen before talk procedure for the scheduled transmission indicating a busy channel. The wireless device may transmit the second transport block.

In an example, the wireless device may receive configuration parameters of one or more logical channels, wherein the first logical channel has higher priority than the one or more logical channels.

In an example, the wireless device may receive a first configuration parameter indicating a first priority of the first logical channel.

In an example embodiment, a wireless device may create a transport block comprising data of one or more logical channels for a scheduled transmission via radio resources. The wireless device may, based on the radio resources being unlicensed radio resources, store the data of the one or more logical channels in a first logical channel. The wireless device may flush a buffer associated with the first logical channel based on a success of a listen before talk procedure for the scheduled transmission.

In an example embodiment, a wireless device may create a transport block comprising data of one or more logical channels for transmission via radio resources. The wireless device may, based on the radio resources being unlicensed radio resources, store the data of the one or more logical channels in a first logical channel. The wireless device may flush or not flush a buffer associated with the first logical channel based on a status of listen before talk procedure for transmission of the transport block.

In an example embodiment, a wireless device may create a first transport block comprising data of one or more logical channels for a scheduled transmission via radio resources. The wireless device may, based on the radio resources being unlicensed radio resources, store the data of the one or more logical channels in a first logical channel. The wireless device may create a second transport block, wherein the second transport block comprises first data of the first logical channel. The wireless device may transmit the second transport block.

In an example embodiment, a wireless device may create a first transport block comprising first data of one or more logical channels for a scheduled transmission via radio resources. The wireless device may, based on the radio resources being unlicensed radio resources, store the first data of the one or more logical channels in a first logical channel. The wireless device may, based on a listen before talk procedure for transmission of the first transport block indicating a clear channel, flush the first logical channel, otherwise the wireless device may store the first data of the one or more logical channels in a second logical channel. The wireless device may transmit a transport block comprising second data of the second logical channel.

In an example embodiment, a wireless device may create a first transport block comprising first data of one or more logical channels for a scheduled transmission via radio resources. The wireless device may, based on the radio resources being unlicensed radio resources, store the first data of the one or more logical channels in a first logical channel. The wireless device may, based on a listen before talk procedure for transmission of the first transport block indicating a clear channel, flush the first logical channel, otherwise the wireless device may store the first data of the one or more logical channels in a second logical channel or a third logical channel. The wireless device may transmit a transport block comprising second data of the second logical channel or the third logical channel.

In an example, the one or more logical channels may be associated with a first priority. The second logical channel may be associated with the first priority. The wireless device may store the first data of the one or more logical channels in the second logical channel.

In an example, the one or more logical channels may be associated with a second priority. The third logical channel may be associated with the second priority. The wireless device may store the first data of the one or more logical channels in the third logical channel.

In an example embodiment, a wireless device may receive one or more messages (e.g., one or more RRC messages) comprising configuration parameters of one or more cells comprising an unlicensed cell. The unlicensed cells may be for operation of the wireless device and one or more base stations, in communication with the wireless device, in unlicensed or shared spectrum and/or in a controlled unlicensed environment, e.g., an unlicensed environment with some level of control, either by regulations or by configuration, on the level of the interference. The wireless device and/or the one or more base stations may use channel access procedure using unlicensed parameter(s) to access the unlicensed cell. In an example, the unlicensed parameter(s) may be listen-before-talk (LBT) parameter(s) used in performing an LBT procedure for channel access. Example LBT parameters may include at least one of a contention window size, a channel access priority class, one or more parameter (e.g., a periodicity and/or an offset) for frame-based equipment (FBE) channel access, etc. For example, the one or more unlicensed parameters may indicate whether al LBT procedure is applied for transmission via the unlicensed cell or an LBT procedure is not applied (e.g., in a controlled unlicensed environment). For example, the one or more unlicensed parameters may indicate whether to use a first type of channel access (e.g., a load-based equipment (LBE) channel access) or a second type of channel access (e.g., an FBE channel access). For example, the unlicensed parameters may indicate channel access parameters in an LBE based channel access and or in an FBE based channel access.

Figure 30:
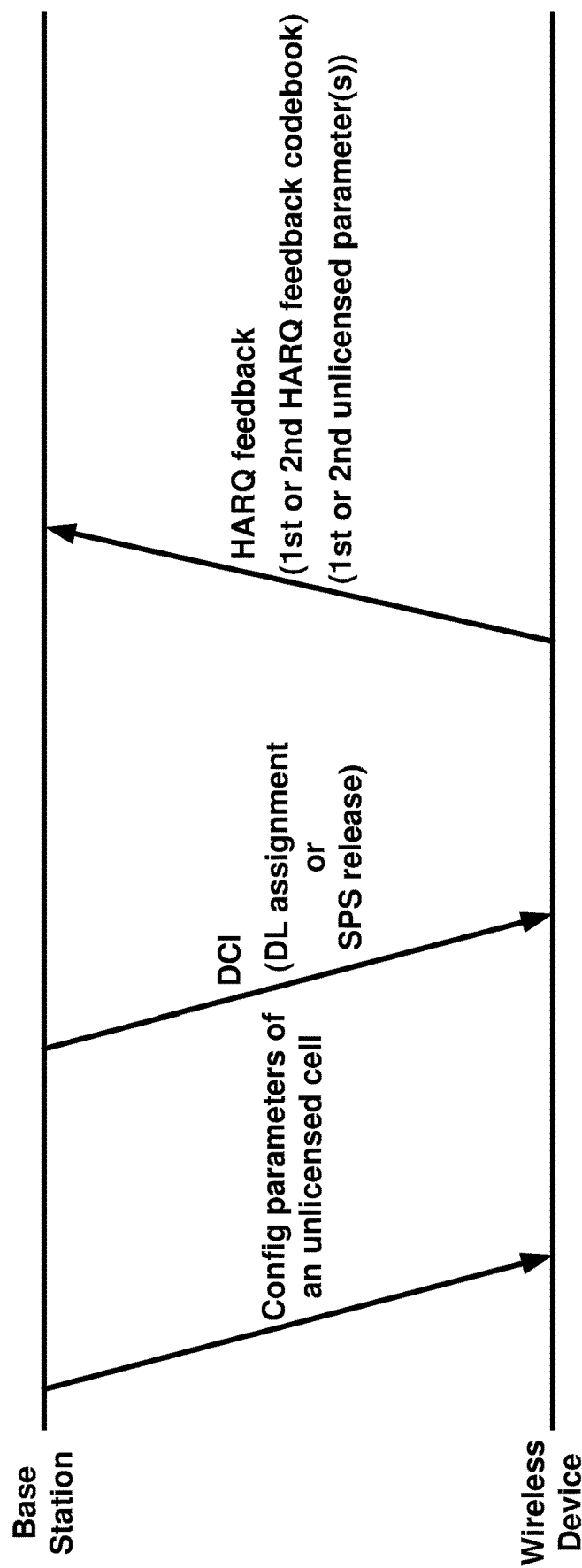
FIG. 30 shows an example process in accordance with several of various embodiments of the present disclosure.

In an example embodiment as shown in FIG. 30, the wireless device may receive a DCI (e.g., a downlink scheduling DCI or a SPS release DCI) that indicates a downlink assignment for reception of a DL TB or indicates a release of a first SPS configuration. For example, in case the DCI is a DL scheduling DCI, the downlink assignment may indicate radio resources, HARQ parameters, etc. and the wireless device may use the indicated radio resources, the HARQ parameters, etc. to receive the DL TB. For example, in case the DCI is a SPS release DCI, indicating release of the first SPS configuration, the wireless device may validate the DCI as a valid SPS release DCI using a validation procedure (e.g., by comparing values of one or more fields of the DCI with pre-determined values). The wireless device may determine a HARQ feedback associated with the DCI. For example, in case the DCI is a DL scheduling DCI, the HARQ feedback may be a HARQ ACK or a HARQ NACK based on whether the DL TB is received correctly/successfully or incorrectly/unsuccessfully. For example, if the DCI is a SPS release DCI indicating release of the first SPS configuration, the HARQ feedback may be a HARQ ACK.

The wireless device may transmit the HARQ feedback via the unlicensed cell. For example, the unlicensed cell may be a cell of the wireless device configured with an uplink control channel (e.g., PUCCH) and the wireless device may transmit the HARQ feedback using the uplink control channel. The unlicensed cell may be a PCell, a PSCell or a PUCCH SCell. In an example, the wireless device may include/multiplex the HARQ feedback in a HARQ feedback codebook comprising a plurality of HARQ feedbacks comprising the HARQ feedback.

The wireless device may transmit the HARQ feedback based on an access procedure using one or more first unlicensed parameters (e.g., one or more first LBT parameters) in response to the DCI being associated with a first priority/service type. In an example, the wireless device may determine that the DCI is associated with the first priority/service type based on a field of the DCI having a first value. In an example, the first priority may be associated with a first service type. For example, the first service type may be one of a URLLC service type and an eMBB service type. For example, the wireless device may include/multiplex the HARQ feedback in a first HARQ feedback codebook. For example, the wireless device may include/multiplex the HARQ feedback in a first HARQ feedback codebook in response in response to the DCI being associated with the first priority/service type. The first HARQ feedback codebook may comprise a first plurality of HARQ feedback associated with the first priority and/or the first service type. The wireless device may transmit the first HARQ feedback codebook using an uplink channel (e.g., a PUCCH) based on a first access procedure (e.g., a first LBT procedure) using the one or more first unlicensed parameters (e.g., the one or more first LBT parameters) in response to the DCI being associated with a first priority/service type. The transmission of the HARQ feedback may be based on the first LBT procedure indicating a clear channel.

The wireless device may transmit the HARQ feedback based on an access procedure using one or more second unlicensed parameters (e.g., one or more second LBT parameters) in response to the DCI being associated with a second priority/service type. In an example, the second priority may be associated with a second service type. For example, the second service type may be one of a URLLC service type and an eMBB service type. In an example, the wireless device may determine that the DCI is associated with the first priority/service type based on a field of the DCI having a second value. For example, the wireless device may include/multiplex the HARQ feedback in a second HARQ feedback codebook. For example, the wireless device may include/multiplex the HARQ feedback in a second HARQ feedback codebook in response in response to the DCI being associated with the second priority/service type. The second HARQ feedback codebook may comprise a second plurality of HARQ feedback associated with the second priority and/or the second service type. The wireless device may transmit the second HARQ feedback codebook using an uplink channel (e.g., a PUCCH) based on a second access procedure (e.g., a second LBT procedure) using the one or more second unlicensed parameters (e.g., the one or more second LBT parameters) in response to the DCI being associated with a second priority/service type. The transmission of the HARQ feedback may be based on the second LBT procedure indicating a clear channel.

The transmission of the HARQ feedback may be in a first timing. The first timing may be based on a value of a PDSCH-to-HARQ-feedback timing field of the DCI. The wireless device may determine the first timing of the HARQ feedback based on the value of a PDSCH-to-HARQ-feedback timing field of the DCI. In an example, the one or more messages may comprise a first configuration parameter indicating a subslot duration. The wireless device may determine the first timing of the HARQ feedback based on the subslot duration and based on a numerology of the uplink channel used for transmission of the HARQ feedback. For example, the first configuration parameter may indicate the subslot duration in number of symbols and the numerology of the uplink channel, used for transmission of the HARQ feedback, may indicate a symbol duration.

In an example, the DCI may be a SPS release DCI indicating release of a first SPS configuration. The one or more messages may comprise first configuration parameters of the first SPS configuration. The wireless device may validate that the DCI is a valid SPS release DCI and may transmit the HARQ feedback (ACK) in response to reception (e.g., correct/successful reception) of the DCI. In an example, the first configuration parameters of the first SPS configuration may indicate that the first SPS configuration is associated with the first priority and/or service type or the second priority and/or the second service type.

In an example, the DCI may be a SPS activation DCI indicating activation of a second SPS configuration. The one or more messages may further comprise the second configuration parameters of the second SPS configuration. The downlink assignment, indicated by the DCI, may be one of a plurality of downlink assignments determined, by the wireless device, based on the second SPS configuration parameters and the DCI. For example, the second configuration parameters may comprise a periodicity parameter and the wireless device may determine the plurality of downlink assignments, including the downlink assignment, based on the periodicity parameter. In an example, the second configuration parameters of the second SPS configuration may comprise a priority parameter and/or a service type parameter indicating one of the first priority and the second priority and/or one of the service type and/or the second service type. In an example, the second configuration parameters of the second SPS configuration may comprise a HARQ feedback codebook parameter indicating one of the first HARQ feedback codebook and the second HARQ feedback codebook for transmission of HARQ feedbacks of the plurality of DL TBs received based on the plurality of downlink assignments.

Figure 31:
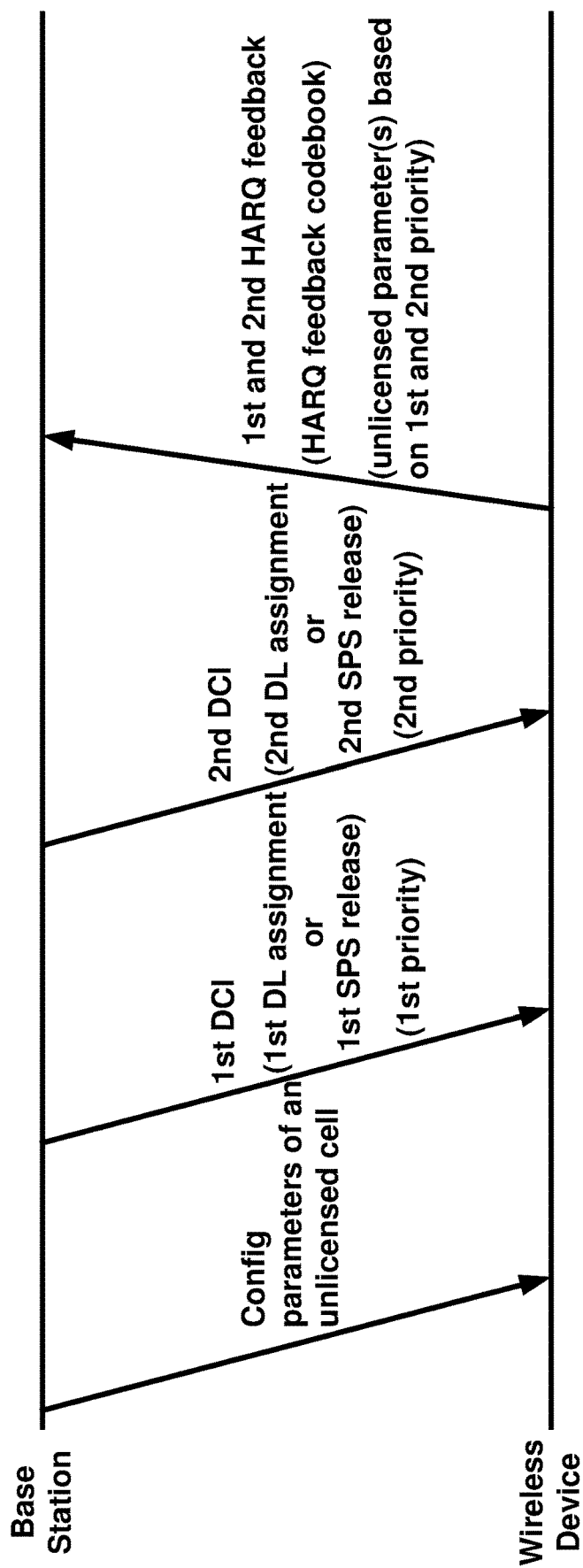
FIG. 31 shows an example process in accordance with several of various embodiments of the present disclosure.

In an example embodiment as shown in FIG. 31, a wireless device may receive a first DCI (e.g., a first downlink scheduling DCI or a first SPS release DCI) that indicates a first downlink assignment for reception of a first DL TB or indicates a release of a first SPS configuration. For example, in case the first DCI is a DL scheduling DCI, the first downlink assignment may indicate first radio resources, first HARQ parameters, etc. and the wireless device may use the indicated first radio resources, the first HARQ parameters, etc. to receive the first DL TB. For example, in case the first DCI is a first SPS release DCI, indicating release of the first SPS configuration, the wireless device may validate the first DCI as a valid SPS release DCI using a validation procedure (e.g., by comparing values of one or more fields of the first DCI with pre-determined values). The wireless device may determine a first HARQ feedback associated with the first DCI. For example, in case the first DCI is a DL scheduling DCI, the first HARQ feedback may be a HARQ ACK or a HARQ NACK based on whether the first DL TB is received correctly/successfully or incorrectly/unsuccessfully. For example, if the first DCI is a SPS release DCI indicating release of the first SPS configuration, the first HARQ feedback may be a HARQ ACK.

The wireless device may receive a second DCI (e.g., a second downlink scheduling DCI or a second SPS release DCI) that indicates a second downlink assignment for reception of a second DL TB or indicates a release of a second SPS configuration. For example, in case the second DCI is a DL scheduling DCI, the second downlink assignment may indicate second radio resources, second HARQ parameters, etc. and the wireless device may use the indicated second radio resources, the second HARQ parameters, etc. to receive the second DL TB. For example, in case the second DCI is a second SPS release DCI, indicating release of the second SPS configuration, the wireless device may validate the second DCI as a valid SPS release DCI using a validation procedure (e.g., by comparing values of one or more fields of the second DCI with pre-determined values). The wireless device may determine a second HARQ feedback associated with the second DCI. For example, in case the second DCI is a DL scheduling DCI, the second HARQ feedback may be a HARQ ACK or a HARQ NACK based on whether the second DL TB is received correctly/successfully or incorrectly/unsuccessfully. For example, if the second DCI is a SPS release DCI indicating release of the second SPS configuration, the second HARQ feedback may be a HARQ ACK.

The wireless device may transmit the first HARQ feedback and the second HARQ feedback via the unlicensed cell. For example, the unlicensed cell may be a cell of the wireless device configured with an uplink control channel (e.g., PUCCH) and the wireless device may transmit the HARQ feedback using the uplink control channel. The unlicensed cell may be a PCell, a PSCell or a PUCCH SCell. In an example, the wireless device may include/multiplex the first HARQ feedback and the second HARQ feedback in a HARQ feedback codebook comprising a plurality of HARQ feedbacks comprising the first HARQ feedback and the second HARQ feedback.

The wireless device may transmit the first HARQ feedback and the second HARQ feedback based on an access procedure using one or more unlicensed parameters (e.g., one or more LBT parameters). The one or more unlicensed parameters (e.g., the one or more LBT parameters) may be based on a first priority/service type, associated with the first DCI, and a second priority/service type associated with the second DCI. For example, based on the first priority/service type and the second priority/service type, the one or more unlicensed parameters (e.g., the one or more LBT parameters) may be one or more first unlicensed parameters (e.g., one or more first LBT parameters) or one or more second unlicensed parameters (e.g., one or more second LBT parameters). For example, the one or more unlicensed parameters (e.g., the one or more LBT parameters) may be the one or more first unlicensed parameters (e.g., the one or more first LBT parameters) based on the first priority being associated with the first service type (e.g., a URLLC service type). In an example, the wireless device may determine the first priority/service type associated with the first DCI based on a value of a field of the first DCI. In an example, the wireless device may determine the second priority/service type associated with the second DCI based on a value of a field of the second DCI. In an example, the first priority may be associated with the first service type and the second priority may be associated with the second service type. For example, the first service type may be one of a URLLC service type and an eMBB service type. For example, the second service type may be one of a URLLC service type and an eMBB service type. For example, the wireless device may include/multiplex the first HARQ feedback and the second HARQ feedback in a HARQ feedback codebook. The wireless device may transmit the HARQ feedback codebook using an uplink channel (e.g., a PUCCH) based on an access procedure (e.g., an LBT procedure) using the one or more unlicensed parameters (e.g., the one or more LBT parameters). The transmission of the HARQ feedback may be based on the LBT procedure indicating a clear channel.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 32:
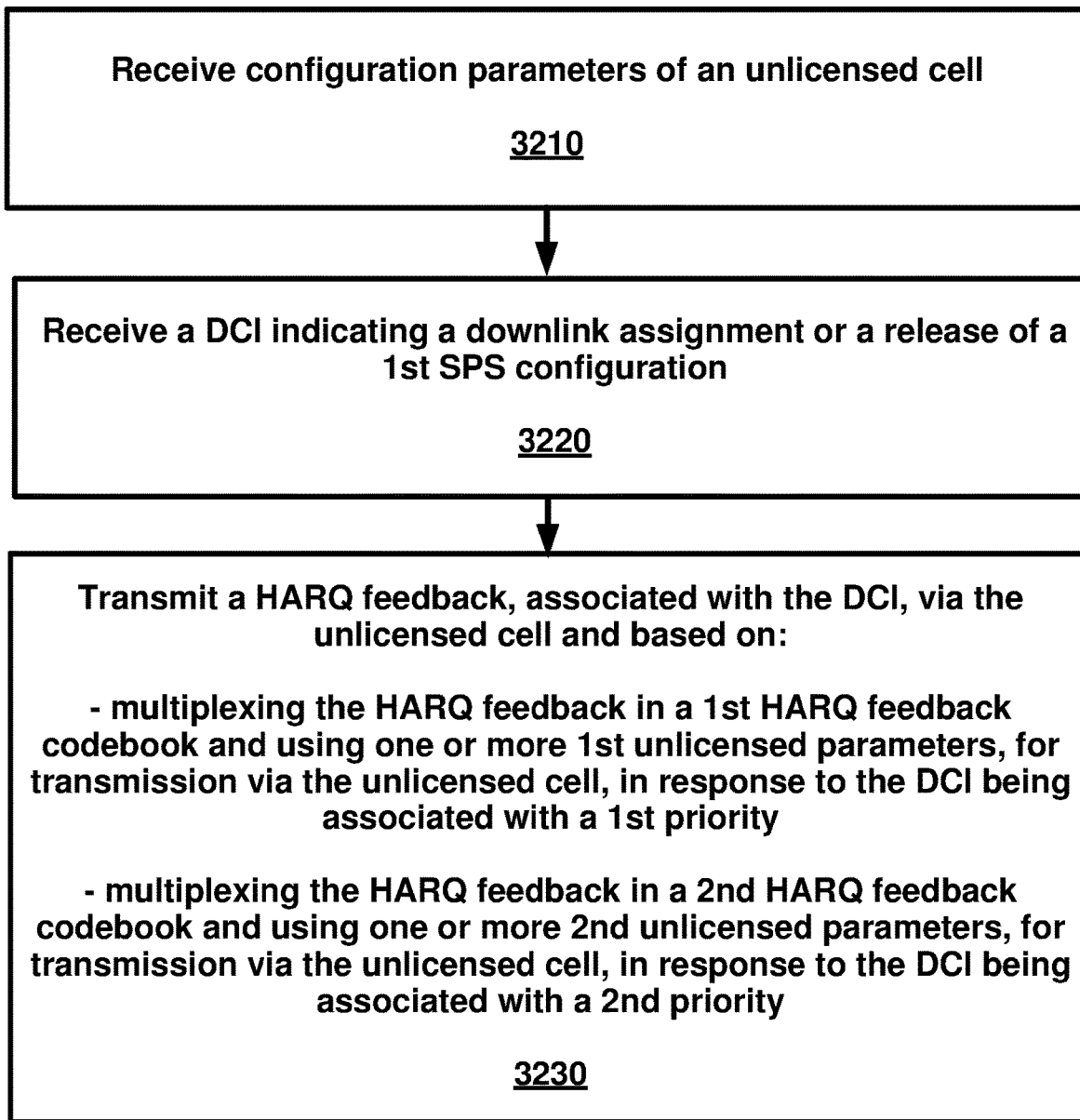
FIG. 32 shows an example flow diagram in accordance with several of various embodiments of the present disclosure.

FIG. 32 shows an example flow diagram in accordance with several of various embodiments of the present disclosure. At 3210, a wireless device may receive configuration parameters of an unlicensed cell. At 3220, the wireless device may receive a downlink control information (DCI) indicating a downlink assignment or a release of a first semi-persistent scheduling configuration. At 3230, the wireless device may transmit a hybrid automatic repeat request (HARQ) feedback, associated with the DCI, via the unlicensed cell. The transmission of the HARQ feedback may be and based on multiplexing the HARQ feedback in a first HARQ feedback codebook and using one or more first unlicensed parameters, for transmission via the unlicensed cell, in response to the DCI being associated with a first priority. The transmission of the HARQ feedback may be and based on multiplexing the HARQ feedback in a second HARQ feedback codebook and using one or more second unlicensed parameters, for transmission via the unlicensed cell, in response to the DCI being associated with a second priority.

In an example embodiment, the one or more first unlicensed parameters, used at 3230 in response to the DCI being associated with the first priority, may comprise one or more first listen-before-talk (LBT) parameters. The one or more second unlicensed parameters, used at 3230 in response to the DCI being associated with the second priority, may comprise one or more second LBT parameters. In an example embodiment, the wireless device may perform an LBT procedure. The transmitting the HARQ feedback, at 3230, may be based on the LBT procedure indicating a clear channel. The LBT procedure may be based on the one or more first LBT parameters in response to the DCI being associated with the first priority. The LBT procedure may be based on the one or more second LBT parameters in response to the DCI being associated with the second priority.

In an example embodiment, the downlink assignment, indicated by the DCI received at 3220, may indicate radio resources for reception of a transport block. The HARQ feedback, transmitted at 3230, may be for the transport block.

In an example embodiment, the DCI received at 3220, may comprise a field. A value of the field may indicate one of the first priority and the second priority.

In an example embodiment, the transmitting the HARQ feedback, at 3230, may be in a first timing. The first timing may be based on a value of a physical downlink shared channel (PDSCH) to HARQ feedback timing field of the DCI received at 3220. In an example embodiment, the wireless device may receive a first configuration parameter indicating a subslot duration. The transmitting the HARQ feedback, at 3230, may be via an uplink channel. The first timing may further be based on a numerology of the uplink channel and the subslot duration. In an example embodiment, the first configuration parameter may indicate the subslot duration in number of symbols. A duration of a symbol may be based on the numerology of the uplink channel.

In an example embodiment, the first priority may be associated with a first service type. The second priority may be associated with a second service type.

In an example embodiment, the wireless device may receive first configuration parameters, of the first semi-persistent scheduling configuration, comprising one or more parameters indicating that the first semi-persistent scheduling configuration is associated with one of the first priority and the second priority.

In an example embodiment, the first HARQ feedback codebook may comprise one or more first HARQ feedbacks associated with the first priority. The second HARQ feedback codebook may comprise one or more second HARQ feedbacks associated with the second priority.

In an example embodiment, the DCI, received at 3220, may indicate activation of a second semi-persistent scheduling configuration. The downlink assignment may be associated with the second semi-persistent scheduling configuration. In an example embodiment, the wireless device may receive second configuration parameters, of the second semi-persistent scheduling configuration, comprising one or more parameters indicating that the second semi-persistent scheduling configuration is associated with one of the first priority and the second priority. In an example embodiment, the one or more parameters may indicate that the second semi-persistent scheduling configuration is associated with one of the first HARQ feedback codebook and the second HARQ feedback codebook. In an example embodiment, the wireless device may validate the DCI, received at 3220, as a valid activation DCI for activation of a plurality of downlink assignments comprising the downlink assignment.

Figure 33:
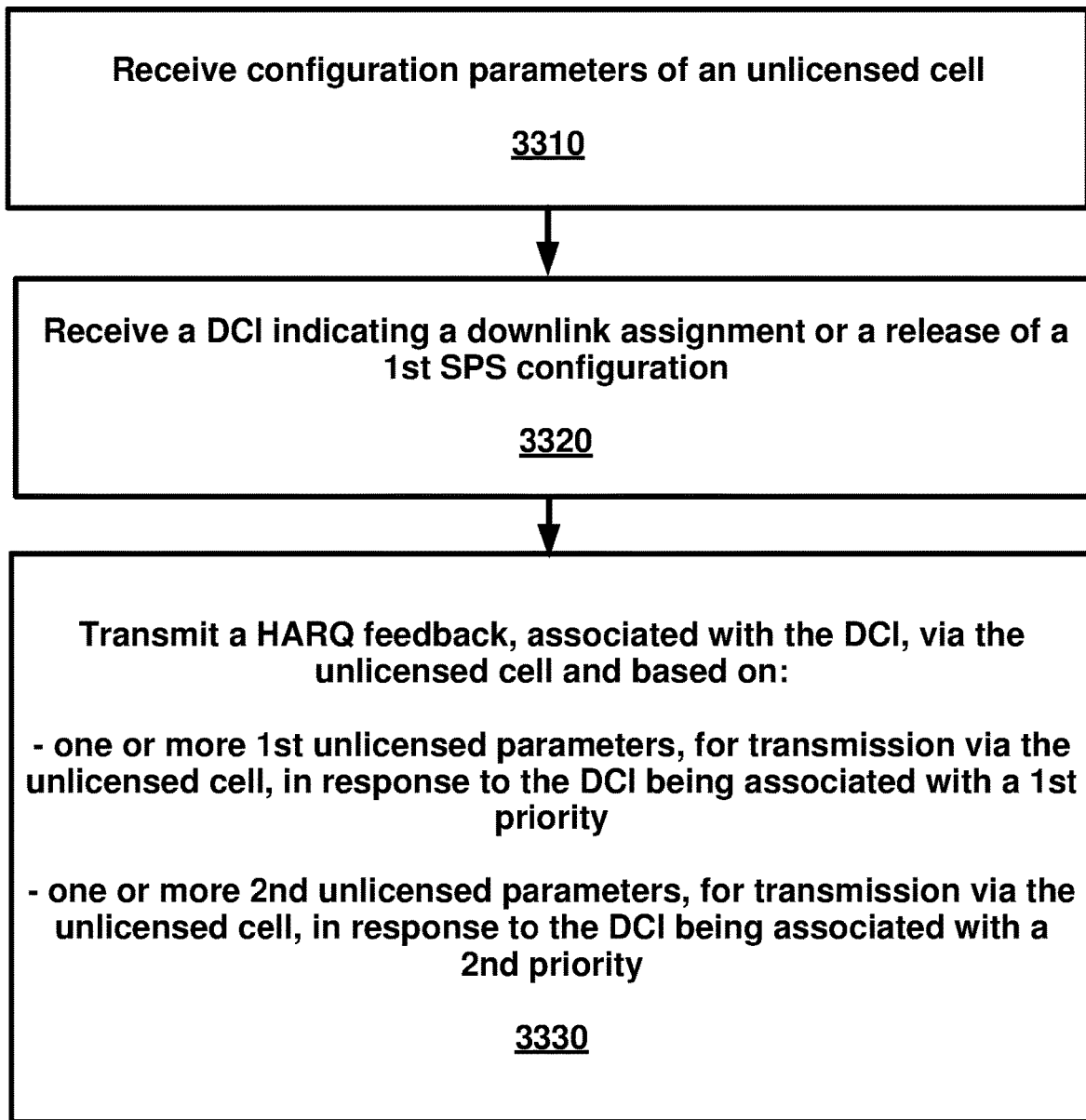
FIG. 33 shows an example flow diagram in accordance with several of various embodiments of the present disclosure.

FIG. 33 shows an example flow diagram in accordance with several of various embodiments of the present disclosure. At 3310, a wireless device may receive configuration parameters of an unlicensed cell. At 3320, the wireless device may receive a downlink control information (DCI) indicating a downlink assignment or a release of a first semi-persistent scheduling configuration. At 3330, the wireless device may transmit a hybrid automatic repeat request (HARQ) feedback, associated with the DCI, via the unlicensed cell and based on: one or more first unlicensed parameters, for transmission via the unlicensed cell, in response to the DCI being associated with a first priority; and one or more second unlicensed parameters, for transmission via the unlicensed cell, in response to the DCI being associated with a second priority.

In an example embodiment, the transmitting the HARQ feedback, at 3330, may be based on transmitting a HARQ feedback codebook comprising the HARQ feedback. In an example embodiment, the HARQ feedback codebook may be a first HARQ feedback codebook in response to the DCI being associated with the first priority. The HARQ feedback codebook may be a second HARQ feedback codebook in response to the DCI being associated with the second priority. In an example embodiment, the transmitting the first HARQ feedback codebook may be based on the one or more first unlicensed parameters. The transmitting the second HARQ feedback codebook may be based on the one or more second unlicensed parameters.

Figure 34:
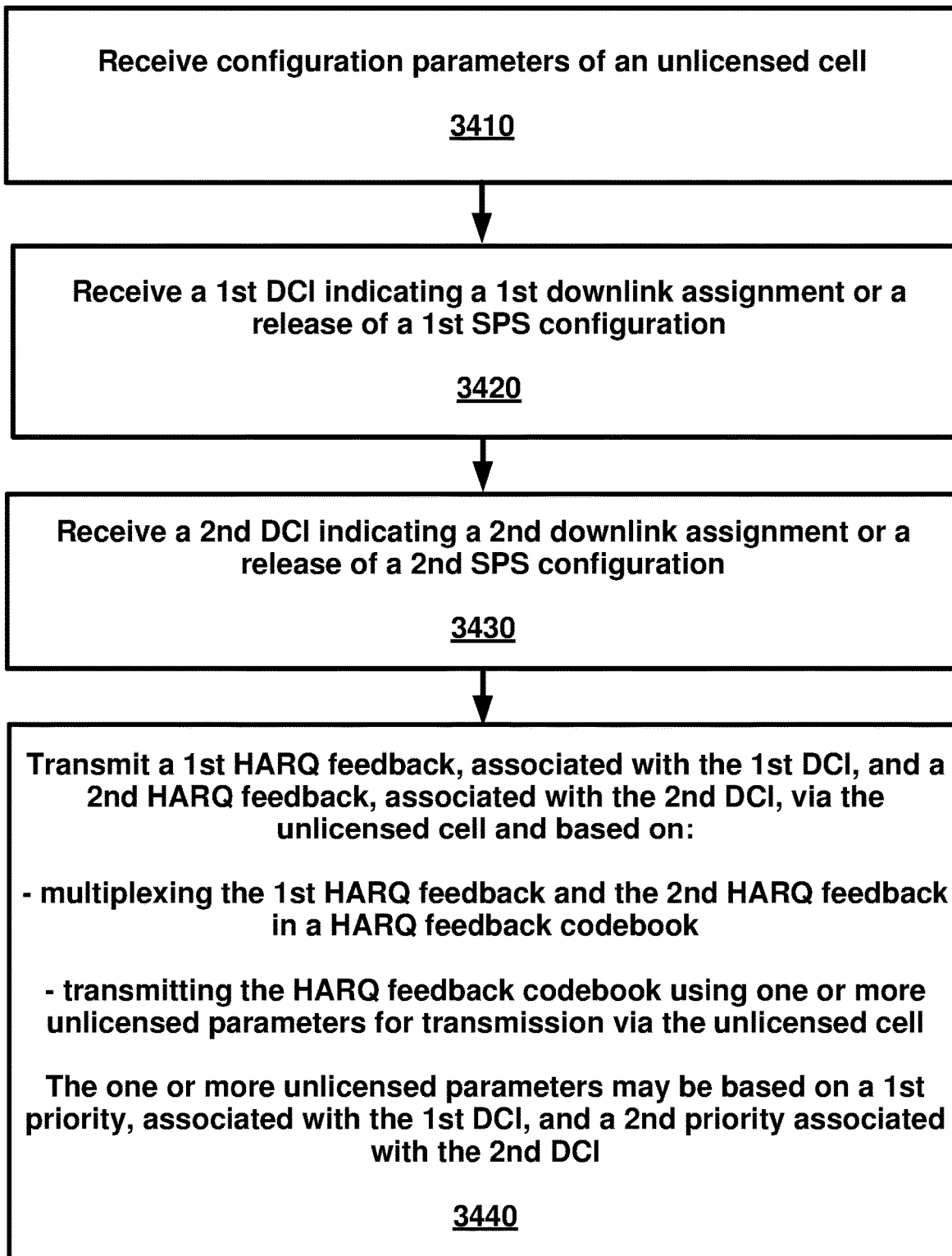
FIG. 34 shows an example flow diagram in accordance with several of various embodiments of the present disclosure.

FIG. 34 shows an example flow diagram in accordance with several of various embodiments of the present disclosure. At 3410, a wireless device may receive configuration parameters of an unlicensed cell. At 3420, the wireless device may receive a first downlink control information (DCI) indicating a first downlink assignment or a release of a first semi-persistent scheduling (SPS) configuration. At 3430, the wireless device may receive a second DCI indicating a second downlink assignment or a release of a second SPS configuration. At 3440, the wireless device may transmit a first hybrid automatic repeat request (HARQ) feedback, associated with the first DCI, and a second HARQ feedback, associated with the second DCI, via the unlicensed cell. The transmission of the first HARQ feedback and the second HARQ feedback may be based on: multiplexing the first HARQ feedback and the second HARQ feedback in a HARQ feedback codebook; and transmitting the HARQ feedback codebook using one or more unlicensed parameters for transmission via the unlicensed cell. The one or more unlicensed parameters may be based on a first priority, associated with the first DCI, and a second priority associated with the second DCI.

In an example embodiment, the one or more unlicensed parameters, used at 3440 for transmitting the HARQ feedback codebook, may comprise one or more listen-before-talk (LBT) parameters. In an example embodiment, the one or more LBT parameters may be one or more first LBT parameters or one or more second LBT parameters. In an example embodiment, the one or more LBT parameters may be the one or more first LBT parameters based on the first priority being associated with a first service type. In an example embodiment, the first service type may be an ultra-reliable low-latency communications (URLLC) service type.

In an example embodiment, the one or more unlicensed parameters, used at 3440 for transmitting the HARQ feedback codebook, may be one or more first unlicensed parameters or one or more second unlicensed parameters. In an example embodiment, the one or more unlicensed parameters may be the one or more first unlicensed parameters based on the first priority being associated with a first service type. In an example embodiment, the first service type may be an ultra-reliable low-latency communications (URLLC) service type.

Figure 35:
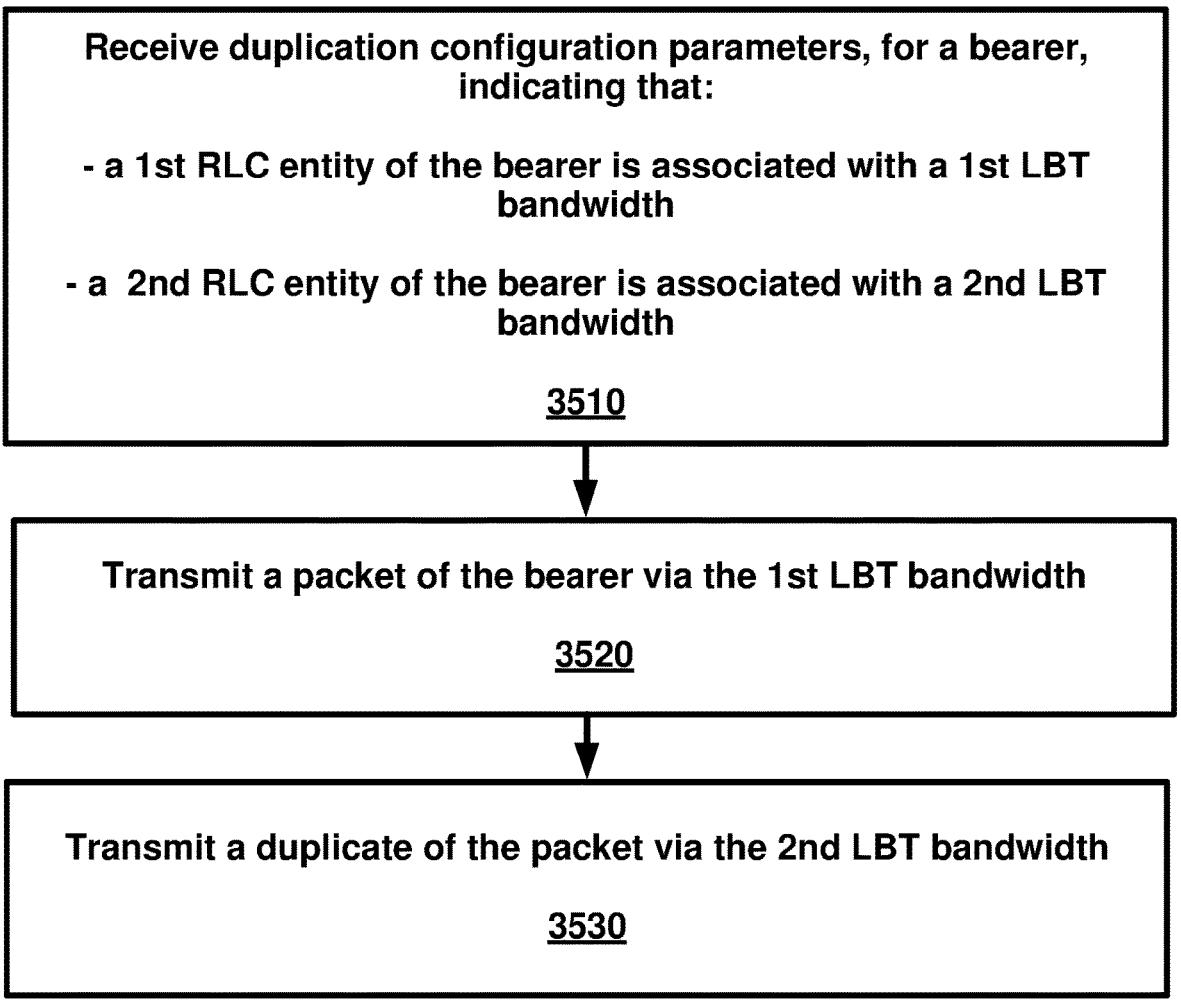
FIG. 35 shows an example flow diagram in accordance with several of various embodiments of the present disclosure.

FIG. 35 shows an example flow diagram in accordance with several of various embodiments of the present disclosure. At 3510, a wireless device may receive duplication configuration parameters for a bearer. The duplication configuration parameters may indicate that: a first radio link control (RLC) entity of the bearer is associated with a first listen-before-talk (LBT) bandwidth; and a second RLC entity of the bearer is associated with a second LBT bandwidth. At 3520, the wireless device may transmit a packet of the bearer via the first LBT bandwidth. At 3530, the wireless device may transmit a duplicate of the packet via the second LBT bandwidth.

In an example embodiment, the first RLC entity, of the bearer for which the duplication configuration parameters are received at 3510, may be associated with a first logical channel. The second RLC entity, of the bearer for which the duplication configuration parameters are received at 3510, may be associated with a second logical channel.

In an example embodiment, the first LBT bandwidth and the second LBT bandwidth may be for a BWP of an unlicensed cell.

In an example embodiment, the first LBT bandwidth may be for a first BWP of an unlicensed cell. The second LBT bandwidth may be for a second BWP of the unlicensed cell.

In an example embodiment, the first LBT bandwidth may be for a first BWP of a first unlicensed cell. The second LBT bandwidth may be for a second BWP of a second unlicensed cell.

In an example embodiment, the wireless device may receive a command indicating activation of the first RLC entity, of the bearer for which the duplication configuration parameters are received at 3510, and the second RLC entity of the bearer for which the duplication configuration parameters are received at 3510. In an example embodiment, the transmitting the packet, at 3520, and the transmitting the duplicate packet, at 3530, may be based on the receiving the command. In an example embodiment, the command may be based on a MAC CE.

In an example embodiment, the duplication may be activated for the bearer based on the receiving the duplication configuration parameters at 3510.

In an example embodiment, the first LBT bandwidth and the second LBT bandwidth may be for one or more cells in a cell group, wherein the cell group may be one of a master cell group and a secondary cell group.

In an example embodiment, the first LBT bandwidth may be a for a first cell in a first cell group. The second LBT bandwidth may be for a second cell in a second cell group. In an example embodiment, the first cell group may be a master cell group and the second cell group may be a secondary cell group.

Figure 36:
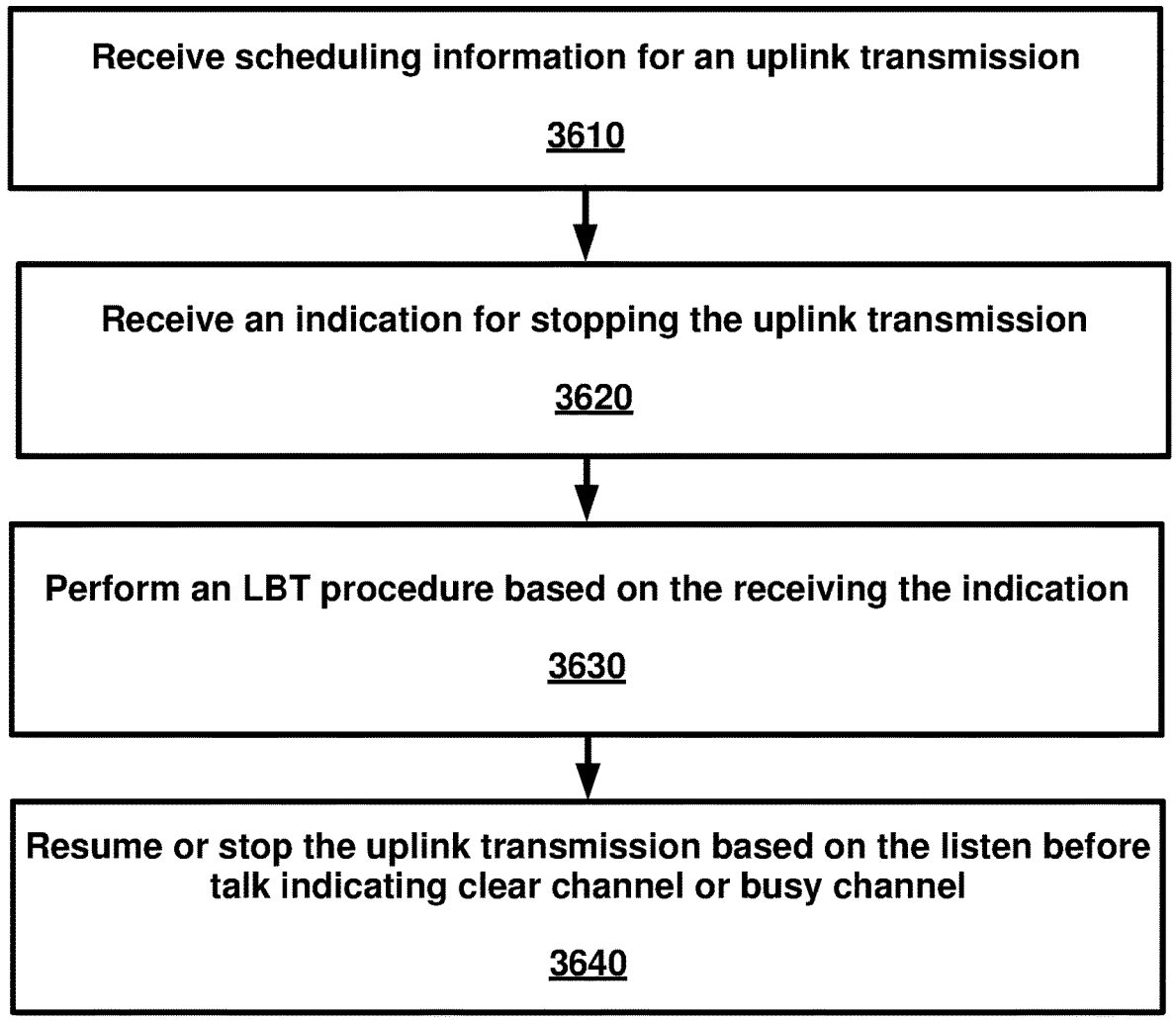
FIG. 36 shows an example flow diagram in accordance with several of various embodiments of the present disclosure.

FIG. 36 shows an example flow diagram in accordance with several of various embodiments of the present disclosure. At 3610, a wireless device may receive scheduling information for an uplink transmission. At 3620, the wireless device may receive an indication for stopping the uplink transmission. At 3630, the wireless device may perform a listen before talk procedure based on the receiving the indication. At 3640, the wireless device may resume or stop the uplink transmission based on the listen before talk indicating clear channel or busy channel.

In an example embodiment, the scheduling information, received at 3610, may be in an uplink grant indicating resources for transmission of a transport block. The uplink transmission may be transmission of the transport block.

In an example embodiment, the indication, at 3620, may be received via a downlink control information. In an example embodiment, the downlink control information may be a group common downlink control information.

In an example embodiment, the uplink transmission, at 3610, may be via a first listen before talk bandwidth. The listen before talk procedure, performed at 3630, may be for the first listen before talk bandwidth.

In an example embodiment, the indication may indicate one or more listen before talk parameters of the listen before talk procedure.

In an example embodiment, the wireless device may stop the uplink transmission before performing, at 3630, the listen before talk procedure based on the receiving the indication.

In an example embodiment, the resuming the uplink transmission, at 3640, may be based on shifting a radio resource mapping, wherein the shifting may be based on a duration of the listen before talk procedure performed at 3630.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
receiving, by a wireless device, a first transport block (TB) associated with a first priority and a second TB associated with a second priority;
transmitting, via an unlicensed cell and based on a listen-before-talk (LBT) procedure, a first feedback associated with the first TB and a second feedback associated with the second TB;
wherein:
the LBT procedure is based on an LBT parameter; and
the LBT parameter is based on the first priority and the second priority.

2. The method of claim 1, wherein the LBT parameter indicates one of a contention window size and a channel access priority class.

3. The method of claim 1, wherein the transmitting is based on the LBT procedure indicating a clear channel.

4. The method of claim 1, further comprising receiving a first downlink control information (DCI) and a second DCI, wherein:
the receiving the first TB is based on the first DCI; and
the receiving the second TB is based on the second DCI.

5. The method of claim 4, wherein:
the first DCI comprises a first field and the second DCI comprises a second field; and
a first value of the first field indicates the first priority and a second value of the second field indicates the second priority.

6. The method of claim 1, wherein:
a hybrid automatic repeat request (HARQ) feedback codebook comprises the first feedback and the second feedback; and
the transmitting the first feedback and the second feedback is based on transmitting the HARQ feedback codebook.

7. The method of claim 1, wherein:
the first priority is associated with a first traffic type or a first service type; and
the second priority is associated with a second traffic type or a second service type.

8. A wireless device comprising:
one or more processors; and
memory storing instructions that, when executed by the one or more processors, cause the wireless device to:
receive a first transport block (TB) associated with a first priority and a second TB associated with a second priority;
transmit, via an unlicensed cell and based on a listen-before-talk (LBT) procedure, a first feedback associated with the first TB and a second feedback associated with the second TB;
wherein:
the LBT procedure is based on an LBT parameter; and
the LBT parameter is based on the first priority and the second priority.

9. The wireless device of claim 8, wherein the LBT parameter indicates one of a contention window size and a channel access priority class.

10. The wireless device of claim 8, wherein the transmitting is based on the LBT procedure indicating a clear channel.

11. The wireless device of claim 8, wherein the instructions, when executed by the one or more processors, further cause the wireless device to receive a first downlink control information (DCI) and a second DCI, wherein:
receiving the first TB is based on the first DCI; and
receiving the second TB is based on the second DCI.

12. The wireless device of claim 11, wherein:
the first DCI comprises a first field and the second DCI comprises a second field; and
a first value of the first field indicates the first priority and a second value of the second field indicates the second priority.

13. The wireless device of claim 8, wherein:
a hybrid automatic repeat request (HARQ) feedback codebook comprises the first feedback and the second feedback; and
the transmitting the first feedback and the second feedback is based on transmitting the HARQ feedback codebook.

14. The wireless device of claim 8, wherein:
the first priority is associated with a first traffic type or a first service type; and
the second priority is associated with a second traffic type or a second service type.

15. A system comprising:
a base station; and
a wireless device comprising: one or more processors; and memory storing instructions that, when executed by the one or more processors, cause the wireless device to: receive, from the base station, a first transport block (TB) associated with a first priority and a second TB associated with a second priority; transmit, via an unlicensed cell and based on a listen-before-talk (LBT) procedure, a first feedback associated with the first TB and a second feedback associated with the second TB;
wherein: the LBT procedure is based on an LBT parameter; and the LBT parameter is based on the first priority and the second priority.

16. The system of claim 15, wherein the LBT parameter indicates one of a contention window size and a channel access priority class.

17. The system of claim 15, wherein the transmitting is based on the LBT procedure indicating a clear channel.

18. The system of claim 15, wherein the instructions, when executed by the one or more processors, further cause the wireless device to receive a first downlink control information (DCI) and a second DCI, wherein:
receiving the first TB is based on the first DCI; and
receiving the second TB is based on the second DCI.

19. The system of claim 18, wherein:
the first DCI comprises a first field and the second DCI comprises a second field; and a first value of the first field indicates the first priority and a second value of the second field indicates the second priority.

20. The system of claim 15, wherein:
the first priority is associated with a first traffic type or a first service type; and
the second priority is associated with a second traffic type or a second service type.

* * * * *